United States Patent
Qu et al.

(10) Patent No.: US 11,985,391 B2
(45) Date of Patent: May 14, 2024

(54) DISPLAY DEVICE AND VOLUME CONTROL METHOD

(71) Applicant: JUHAOKAN TECHNOLOGY CO., LTD., Shandong (CN)

(72) Inventors: Xiaokui Qu, Shandong (CN); Guangqiang Wang, Shandong (CN); Jing Ning, Shandong (CN); Xiaozong Chen, Shandong (CN); Chao Wu, Shandong (CN); Jingang Liu, Shandong (CN); Jiayi Ding, Shandong (CN)

(73) Assignee: JUHAOKAN TECHNOLOGY CO., LTD., Qingdao (CN)

(*) Notice: Subject to any disclaimer, the term of this patent is extended or adjusted under 35 U.S.C. 154(b) by 0 days.

(21) Appl. No.: 17/955,482

(22) Filed: Sep. 28, 2022

(65) Prior Publication Data

US 2023/0089118 A1    Mar. 23, 2023

Related U.S. Application Data

(63) Continuation of application No. PCT/CN2021/100769, filed on Jun. 18, 2021.

(51) Int. Cl.
*H04N 21/439* (2011.01)
*A63B 71/06* (2006.01)
(Continued)

(52) U.S. Cl.
CPC ..... *H04N 21/4852* (2013.01); *A63B 71/0622* (2013.01); *H04N 21/42206* (2013.01);
(Continued)

(58) Field of Classification Search
None
See application file for complete search history.

(56) References Cited

U.S. PATENT DOCUMENTS

| 6,262,713 | B1* | 7/2001 | Brusky | H04N 21/426 345/158 |
| 2012/0020649 | A1* | 1/2012 | Vanderkaden | G11B 27/034 386/E5.028 |
| 2017/0178595 | A1 | 6/2017 | Kim et al. | |

FOREIGN PATENT DOCUMENTS

| CN | 103491447 A | 1/2014 |
| CN | 105872589 A | 8/2016 |

(Continued)

OTHER PUBLICATIONS

First Chinese Office Action and Search Report regarding Application No. 202110097107.2 dated Jul. 6, 2022. English translation provided by Chinable IP.

*Primary Examiner* — Samira Monshi
(74) *Attorney, Agent, or Firm* — ANOVA LAW GROUP, PLLC

(57) ABSTRACT

A display apparatus includes a display; a remote controller; a controller. The controller is configured to receive a first command for fitness training, cause the display to present one or more modes including a follow-up mode and an exercising-while-watching mode for selection; in response to selection of the follow-up mode, cause the display to show a first window and a second window disposed on a first user interface for receiving a focus move command from the remote control, with the first window displaying a first video associated with fitness training and the second window displaying a second video associated with image data from a camera; receive a volume adjustment command; in response to the focus being on a volume control for the first or second video, adjust a volume of the first or second video in response to the volume adjustment command. A method for controlling the apparatus is disclosed.

18 Claims, 43 Drawing Sheets

(51) Int. Cl.
    *H04N 21/422*     (2011.01)
    *H04N 21/431*     (2011.01)
    *H04N 21/472*     (2011.01)
    *H04N 21/478*     (2011.01)
    *H04N 21/485*     (2011.01)

(52) U.S. Cl.
    CPC ..... *H04N 21/4316* (2013.01); *H04N 21/4396* (2013.01); *H04N 21/472* (2013.01); *H04N 21/478* (2013.01); *A63B 2071/0625* (2013.01); *A63B 2071/0638* (2013.01)

(56) References Cited

FOREIGN PATENT DOCUMENTS

| | | | |
|---|---|---|---|
| CN | 105898378 A | 8/2016 | |
| CN | 107734121 A | 2/2018 | |
| CN | 109168074 A | 1/2019 | |
| CN | 110336968 A | 10/2019 | |

* cited by examiner

DISPLAY DEVICE AND VOLUME CONTROL METHOD

This application a continuation application of PCT/CN2021/100769 filed on Jun. 18, 2021, which claims the priority to the Chinese Patent Application No. 202010851417.4, filed on Aug. 21, 2020, No. 202011389672.8, filed on Dec. 1, 2020, and No. 202110097107.2, filed on Jan. 25, 2021, which are incorporated herein by reference in their entirety.

FIELD OF THE INVENTION

The present disclosure relates to the technical field of display apparatuses, and in particular, to a display apparatus and a control method.

BACKGROUND OF THE INVENTION

Smart televisions are important display apparatuses in home life, on which people can watch television dramas, variety shows, cartoons, fitness videos, and other media resources. With more attention paid to healthy living concept and wide diversity of choices for fitness videos, more and more people choose to do fitness training while watching fitness videos on their smart TVs. However, an effective fitness training is usually time-consuming, and people tend to get distracted and tired during training. As a result, many people lose interests after exercising for several times and therefore stop exercising, thus failing to achieve an ideal fitness effect. Therefore, how to improve fitness experience of a user becomes an important issue for fitness popularization.

SUMMARY OF THE INVENTION

According to a first aspect, the present disclosure provides a display apparatus, including: a display configured to display video or an interface; and a remote controller comprising a plurality of keys configured to move a focus on the interface or video; a controller in connection with the display and the remote controller, wherein the controller is configured to: receive a first command for fitness training from a user, cause the display to present one or more modes for selection, wherein the one or more modes comprises a follow-up mode and an exercising-while-watching mode; in response to a selection of the follow-up mode, cause the display to show a first window and a second window disposed different from the first window on a first user interface, wherein the first user interface is configured to receive the focus move command via a key on the remote control, wherein the first window is configured to display a first video associated with fitness training and the second window is configured to display a second video associated with image data from a camera; while the first video is displaying in the first window and the second video is displaying in the second window, receive a volume adjustment command from the user; in response to the focus of the display apparatus being on a volume control for the second video, adjust a volume of the second video in response to the volume adjustment command; and in response to the focus being on a volume control of the first video, adjust a volume of the first video in response to the volume adjustment command.

According to a second aspect, the present disclosure provides a method for controlling a display apparatus, wherein the display apparatus includes a display configured to display video or an interface, and a remote controller comprising a plurality of keys configured to move a focus on the interface or video, the method including: displaying a video or an interface on the display; receiving a first command for fitness training from a user, causing the display to present one or more modes for selection, wherein the one or more modes comprises a follow-up mode and an exercising-while-watching mode; in response to a selection of the follow-up mode, causing the display to show a first window and a second window disposed different from the first window on a first user interface, wherein the first user interface is configured to receive the focus move command via a key on the remote control, wherein the first window is configured to display a first video associated with fitness training and the second window is configured to display a second video associated with image data from a camera; while the first video is displaying in the first window and the second video is displaying in the second window, receiving a volume adjustment command from the user; in response to the focus of the display apparatus being on a volume control for the second video, adjusting a volume of the second video in response to the volume adjustment command; and in response to the focus being on a volume control of the first video, adjusting a volume of the first video in response to the volume adjustment command.

DETAILED DESCRIPTION OF THE EMBODIMENTS

Some embodiments of the present disclosure will be described hereinafter with reference to the accompanying drawings of some embodiments of the present disclosure. Obviously, the described embodiments are merely some embodiments of the present disclosure and are not all embodiments.

Figure 1:
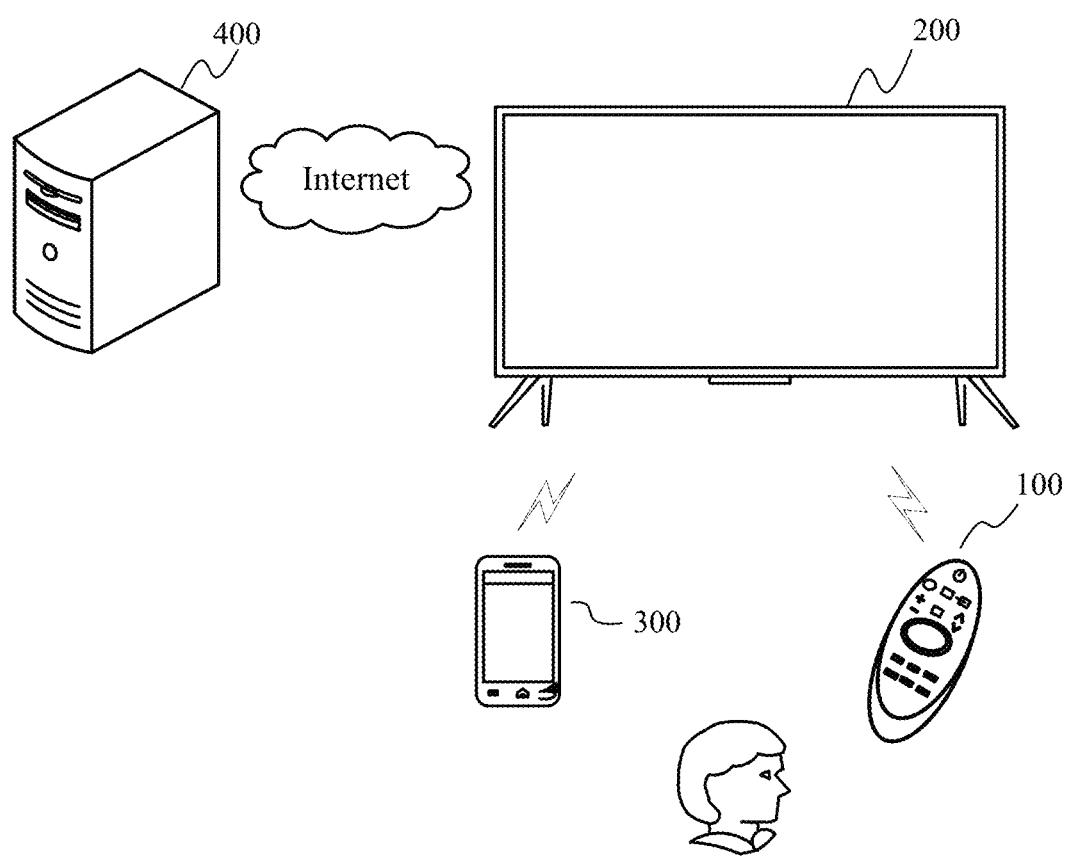
FIG. 1 is a schematic diagram illustrating an operation scenario between a display apparatus and a control device according to some embodiments of the present disclosure.

FIG. 1 is a schematic diagram illustrating a scenario of a display apparatus according to some embodiments of the present disclosure. As shown in FIG. 1, a display apparatus 200 also performs data communication with a server 400. A user can operate the display apparatus 200 via a smart device 300 or a control device 100.

In some embodiments, the control device 100 may be a remote control. Communication between the remote control and the display apparatus may include at least one of infrared protocol communication, Bluetooth protocol communication, and other short-distance communication manners. The display apparatus 200 can be controlled in a wireless manner or a wired manner. A user may input user commands via at least one of buttons on the remote control, voice input, and control panel, so as to control the display apparatus 200.

In some embodiments, the smart device 300 may include any one of a mobile terminal, a tablet, a computer, a notebook computer, and an AR/VR device.

In some embodiments, the display apparatus 200 can also be controlled via the smart device 300. For example, the display apparatus 200 is controlled via an application running on the smart device.

In some embodiments, the smart device 300 can also be used to perform data communication with the display apparatus.

In some embodiments, the display apparatus 200 can also be controlled in a manner other than the control device 100 and the smart device 300. For example, the display apparatus 200 can be controlled by directly receiving a voice command from a user via a module for obtaining the voice command that is provided within the display apparatus 200, or can be controlled by receiving a voice command from the user via a voice control device provided outside the display apparatus 200.

In some embodiments, the display apparatus 200 also performs data communication with a server 400. The display apparatus 200 may establish communication connections via a local area network (LAN), a wireless local area network (WLAN), and other networks. The server 400 can provide various contents and perform interactions with the display apparatus 200.

Figure 2:
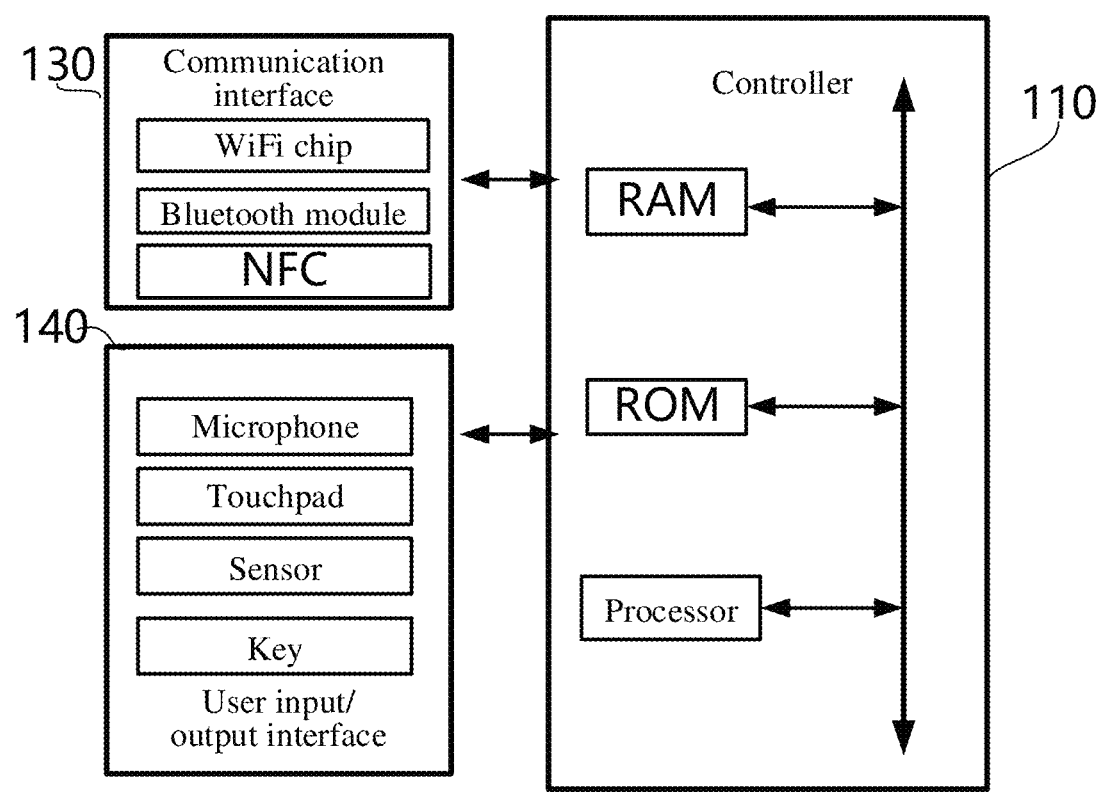
FIG. 2 is a block diagram illustrating a hardware configuration of a display apparatus according to some embodiments of the present disclosure.

FIG. 2 is a block diagram illustrating a configuration of a control device 100 according to some embodiments. As shown in FIG. 2, the control device 100 includes a controller 110, a communication interface 130, a user input/output interface 140, a memory, and a power supply. The control device 100 can receive an operation command input from the user, and convert the operation command into an instruction that can be recognized and responded by the display apparatus 200, serving as an interaction medium between the user and the display apparatus 200.

Figure 3:
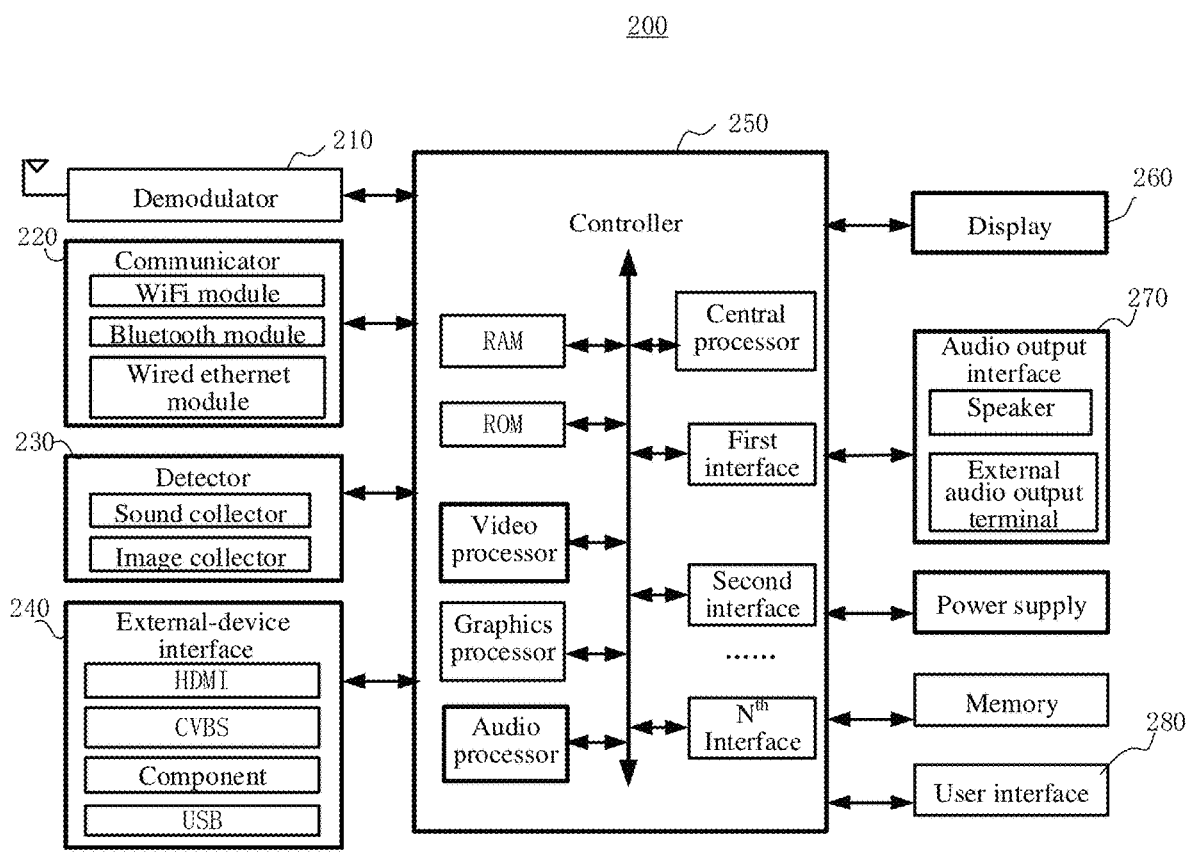
FIG. 3 is a block diagram illustrating a hardware configuration of a control device according to some embodiments of the present disclosure.

FIG. 3 is a block diagram illustrating a hardware configuration of a display apparatus 200 according to some embodiments.

In some embodiments, the display apparatus 200 includes at least one of a demodulator 210, a communicator 220, a detector 230, an external-device interface 240, a controller 250, a display 260, an audio output interface 270, a memory, a power supply, and a user input interface 280.

Figure 4:
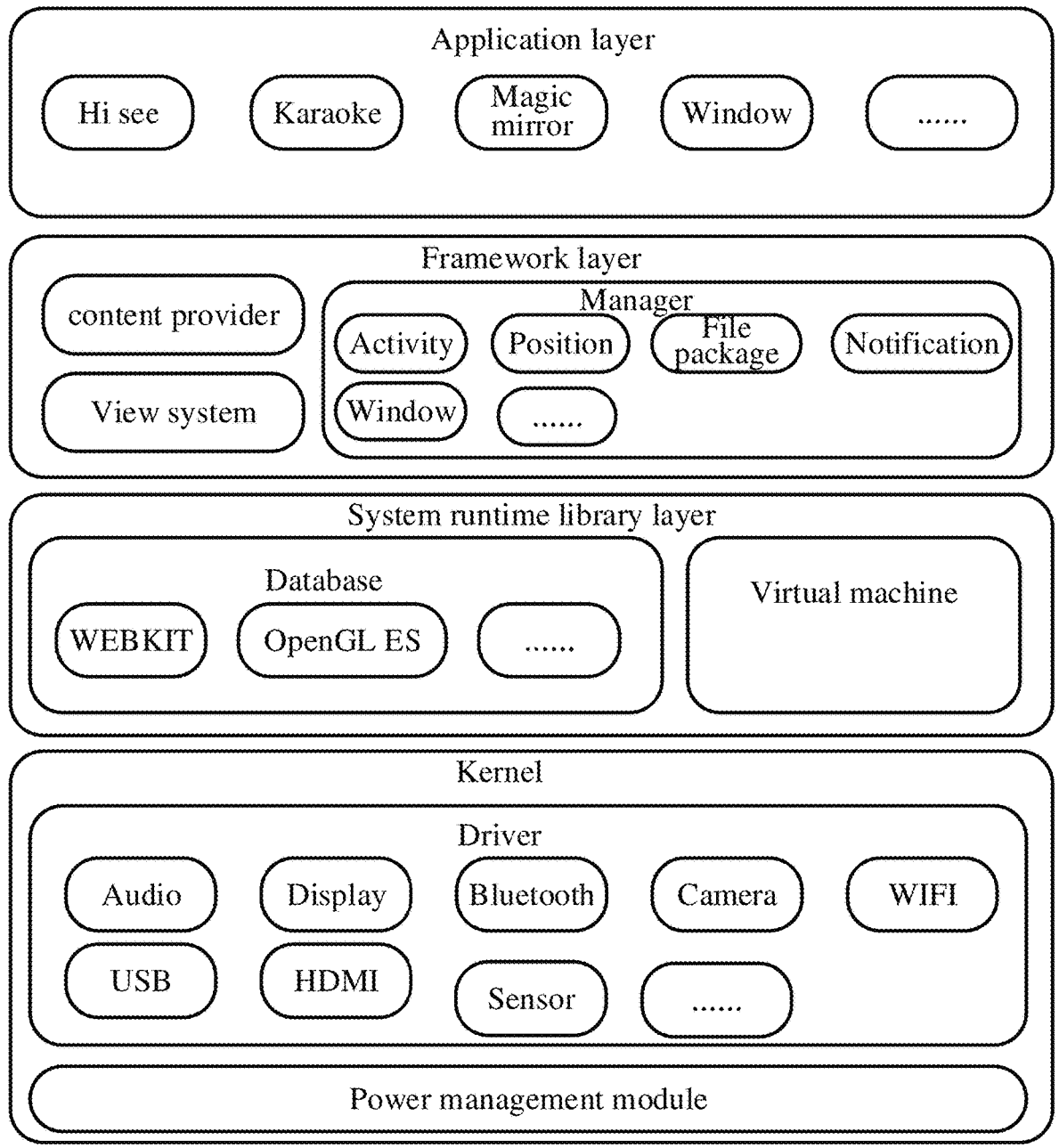
FIG. 4 is a schematic diagram illustrating a software configuration in a display apparatus according to some embodiments of the present disclosure.

Referring to FIG. 4, in some embodiments, a system is divided into four layers, which from top to bottom respectively are an application (Applications) layer ("application layer" for short), an application framework (Application Framework) layer ("framework layer" for short), an Android runtime (Android runtime) and system library layer ("system runtime library layer" for short), and a kernel layer.

In some embodiments, the kernel layer is a layer between hardware and software. As shown in FIG. 4, the kernel layer at least includes at least one of the following drivers: an audio driver, a display driver, a Bluetooth driver, a camera driver, a WIFI driver, a USB driver, an HDMI driver, a sensor driver (such as a fingerprint sensor, a temperature sensor, or a pressure sensor), and a power driver.

In some embodiments, a hardware or software architecture can be configured based on the foregoing embodiments as described. In some embodiments, the implementations of the present disclosure can be achieved based on other similar hardware or software architectures.

As more and more people pay attention to fitness, a lot of fitness videos have appeared on the Internet. As a playback device, the display apparatus can play fitness videos, so that a user may perform exercise at home. However, during learning, people may feel tired and time consuming while watching the fitness video. As a result, many people lose interests after exercising for several times and therefore stop exercising, thus failing to achieve an ideal fitness effect.

In view of the above issues, the present disclosure may improve the interests of the user in fitness and improve a fitness effect by setting a plurality of fitness modes for a user, and can improve fitness experiences of the user through volume control.

Figure 5:
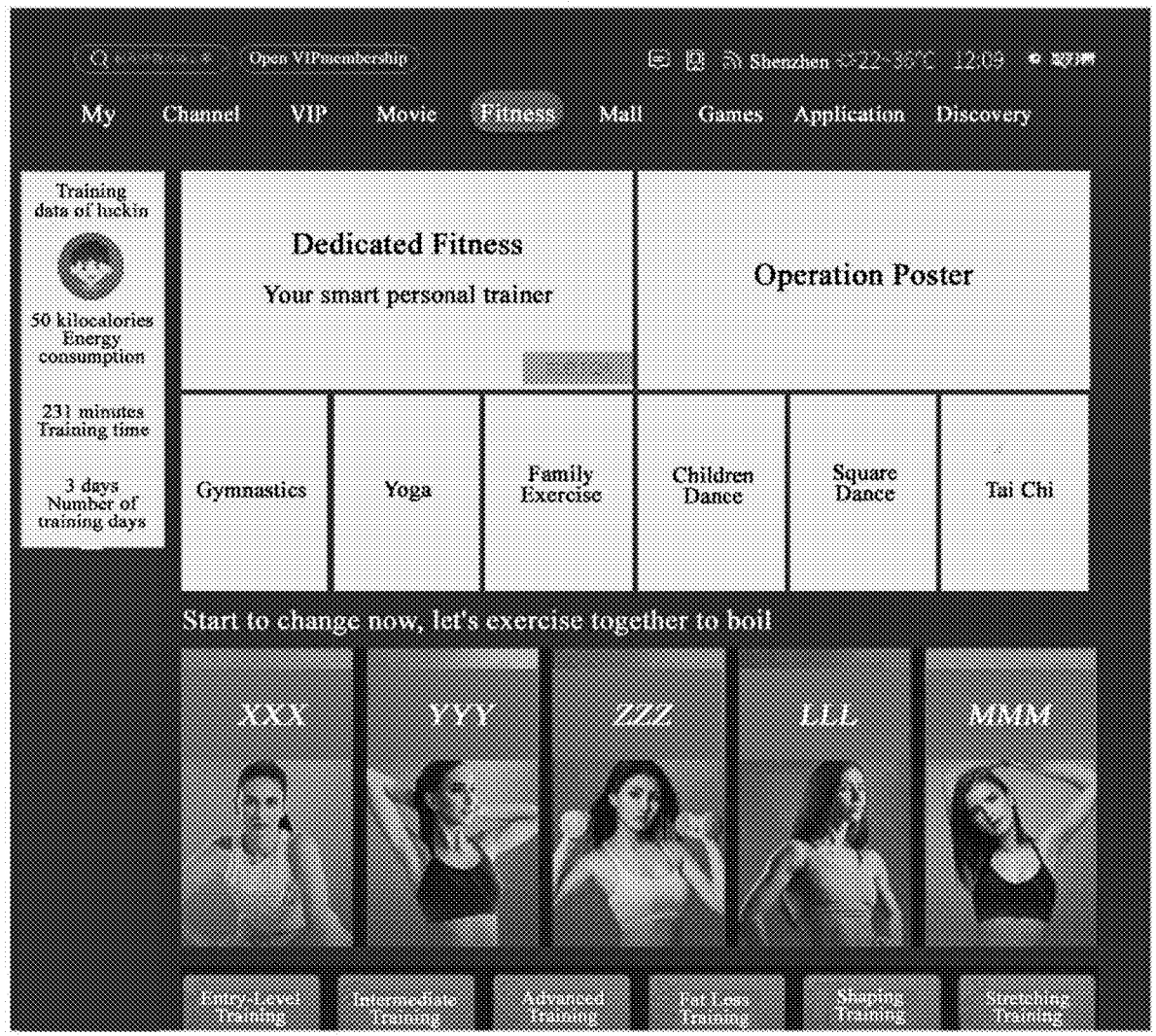
FIG. 5 is a schematic diagram illustrating a home page of a display apparatus according to some embodiments of the present disclosure.

In some embodiments, after the display apparatus is started by the user, the display apparatus receives an input signal, and can display a home page first. Referring to FIG. 5, the home page may be configured to include a bar area and a content area. The bar area may be configured to include a plurality of bars, such as "My", "Channel", "VIP", "Fitness", "Mall", "Games", "Application", and "Discovery", where each bar is configured as a control available for selection and operate. Below the bar area may be a content area of a currently selected bar. When a bar is selected, the bar can be highlighted to remind the user that this bar is the currently selected bar. When switching is performed between different bars, the content area can be updated to display contents corresponding to selected bar.

Specifically, a display process can be that after a bar has been selected, the display apparatus obtains display content data corresponding to said bar from local or the server, and then loads the display content data into a display area.

In some embodiments, when the display apparatus goes to the home page for the first time after being started, the column "My" can be selected by default, that is, the control of "My" is set as a default focus position. The user can select different bars via direction keys on the remote control, for example, select the bar of "Fitness". Other controls can also be set as the default focus position.

In some embodiments, when the display apparatus returns to the home page from another page, the bar selected last time can be selected by default. As an alternative, the control at the default focus position can also be selected.

In some embodiments, when the user selects the bar of "Fitness", an interface corresponding to the "Fitness" bar may be displayed in the content area. This page may be configured to include a control for showing personal-record items and a control for showing recommendation items. Both the control for showing personal-record items and the control for showing recommendation items are controls which can be operated and selected.

The control for showing personal-record items can be disposed at a side of the content area. After the user logs in, the control for showing personal-record items can display the overall training data of the user. When the user is not logged in, the control for showing personal-record items can display a login control. When user clicks the login control, the display apparatus can pop up a login page on top of the current page to let the user enter an account ID and the password to log in. After the user logs in, the display apparatus can dismiss the login page and change the control for showing personal-record items to a control for displaying the overall training data of the user. Content displayed by the control for the overall training data can include at least one of a user name, a user avatar, accumulated energy consumption, accumulated training time, and accumulated training days. The user name can be training data of XXX, the accumulated energy consumption can be an integer in kilocalories, the accumulated training time can be an integer in minutes, and the accumulated training days can be an integer in days.

The control for showing recommendation items can be a media-resource control for displaying a media resource, and there may be a plurality of recommendation items. Recommended contents can include, for example, any combination of "Exclusive Fitness", "Operation Poster", "Gymnastics", "Yoga", "Family Sports", "Child Dance", "Square Dance", "Tai Chi", "Fat Losing Challenge in Spring", "Soothing and Relaxing Exercises for White-collars", "Immunity Enhancement Programs", "Beauty Training Camp", "Becoming a Fairy", "Entry-level Training", "Intermediate Training", "Advanced Training", "Fat Loss Training", "Shaping Training", "Stretching Training", and the like. The control of "Exclusive Fitness" can display information about a customized fitness service for the user. When the user is not logged in, or has logged in but has no customized fitness service, or has logged in and has customized fitness service, "Exclusive Fitness" can display different background pictures.

Figure 6:
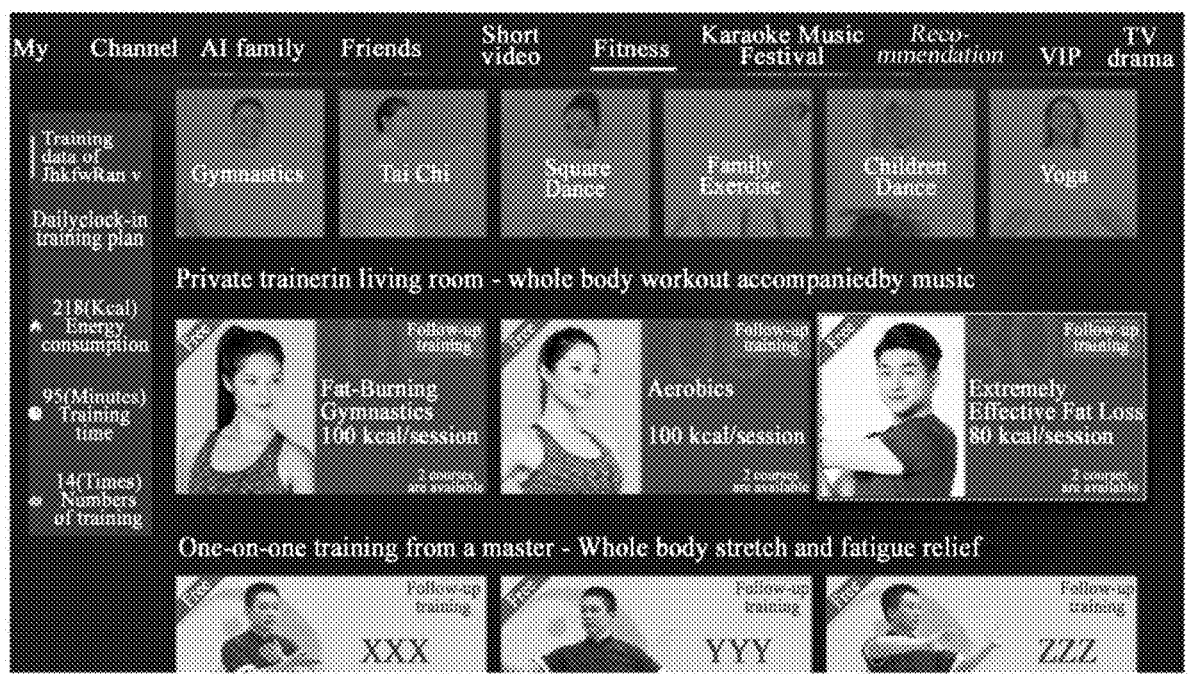
FIG. 6 is a schematic diagram illustrating a home page of a display apparatus according to some embodiments of the present disclosure.

In some embodiments, the home page can also be another interface. Referring to FIG. 6, the bar area and the content area can be updated to be different from those in FIG. 5. The media-resource control in the content area can display recommendation items that are different from those in FIG. 5, such as "Fat-burning Gymnastics", "Aerobic Dance", and "Extreme Fat Loss".

Figure 7:
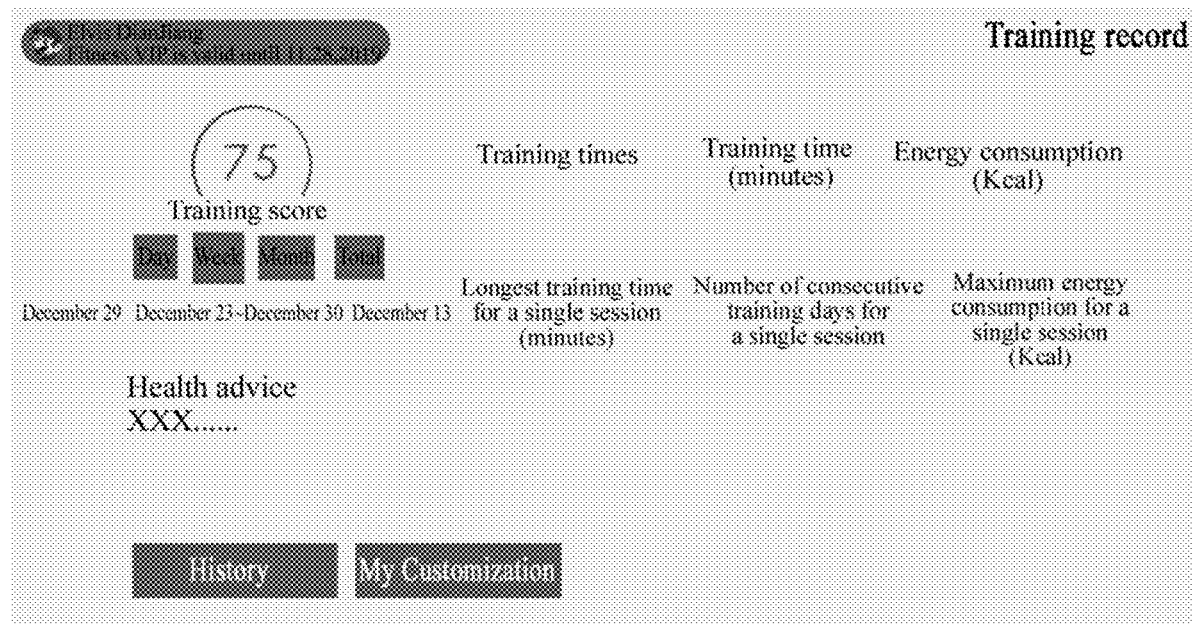
FIG. 7 is a schematic diagram illustrating a training record according to some embodiments of the present disclosure.

In the column of fitness in the home page, after the control for showing the personal-record items is clicked by the user, the display apparatus can skip from the current page to a page about the training records. Referring to FIG. 7, the page about the training records can display detailed training data of the user. The detailed training data can include the following contents:

1. Training Score:

The score is calculated and displayed according to day, week, month, and total, and the data format is integer.

Score formula for scoring: 40*(actual duration of finished follow-up training time/a fixed numerical value)+60*(average accuracy rate/1)

Fixed values: day: 30; week: 150; month: 600; total: 7200

In the score formula, if 40*(actual duration of finished follow-up training/a fixed numerical value)>40, it is calculated as 40.

2. Training Times, Training Time, and Energy Consumption:

All training data is calculated according to day, week, month, and total accumulation, and accumulated data is displayed in a format of an integer.

Scope of data sources—healthy and beneficial media resources+self-owned media resources (normal mode, follow-up mode, and exercising-while-watching mode), and exclusive fitness (customized plan).

3. Longest Training Time for a Single Session, a Number of Consecutive Training Days, and Maximum Energy Consumption for a Single Session:

All training data is ranked according to week, month, and total data, and data ranked first is displayed in a format of an integer.

Scope of data sources—healthy and beneficial media resources+self-owned media resources (a normal mode, a follow-up mode, and an exercising-while-watching mode), and exclusive fitness (a customized plan).

In the column of fitness in the home page, after the control for showing recommendation items is selected, a page about fitness details can be entered.

Figure 8:
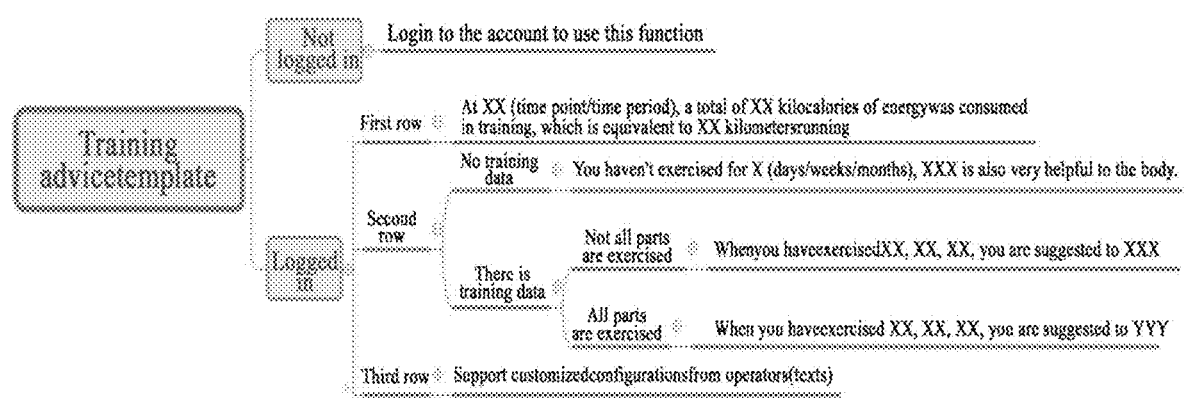
FIG. 8 is a schematic diagram illustrating a training advice according to some embodiments of the present disclosure.

4. Health Advice:

The health advice can be a training advice, and for content thereof, reference can be made to FIG. 8. Different contents can be displayed depending on whether the user is logged in or not.

In some embodiments, the page about the training record can also display a control of "History" and a control of "My Customization". After the user clicks the control of "History", the display apparatus can display historical fitness data of the user. After the user clicks the control of "My Customization", the display apparatus can display a user-customized fitness service.

In the column of fitness in the home page, after the control for showing recommendation items is selected by a user, the display apparatus can skip from the current page to the page about fitness details corresponding to the recommendation items. A fitness video corresponding to the recommendation item is played on the page about fitness details. An interface about a list of fitness videos or a playback interface of the fitness video can also be displayed.

Figure 9:
FIG. 9 is a schematic diagram illustrating a detail page of a fitness video according to some embodiments of the present disclosure.

Referring to FIG. 9, a detail page of the fitness video can display detailed information about the fitness video, and the detailed information can include a profile, episodes, related recommendations, and operation controls. The profile can be used to display corresponding information about the fitness video, and can also include a video playback window for playing a preview of the fitness video. The episodes and the related recommendations can be operation controls, and the user can click different episodes to practice different trainings. Operation controls other than the episodes and the related recommendations can include "Start Training", "Activate VIP", "Like", "Favorites", and "Share". The focus can be set on the control of "Start training" by default. When the user clicks different operation controls, different functions can be implemented.

Figure 10:
FIG. 10 is a schematic diagram illustrating a detail page of a fitness video according to some embodiments of the present disclosure.

In some embodiments, the page about fitness details can also be other interfaces. Referring to FIG. 10, the page about fitness details can be updated to be different from that in FIG. 9.

Figure 11:
FIG. 11 is a schematic diagram illustrating a detail page of a fitness video according to some embodiments of the present disclosure.

In some embodiments, different fitness videos are provided with different viewing modes, such as a normal mode, a follow-up mode, and a watching mode. When the fitness video supports the follow-up mode, the page about fitness details can be as shown in FIG. 11. As shown in FIG. 11, the control of "Like" can display a quantity of likes for a course. Logic for a parameter optimization algorithm of the quantity of likes for the course is as follows:
  a. Not display when a quantity X of users that click like satisfies X<10; or
  b. Display X when a quantity X of users that click like satisfies 10<X.

Further, when the quantity of users that click like is in different regions, the controls are displayed with different appearances. The control appearance can include at least one of a color of the control, a loaded character, a shape of the control, and the like.

Figure 12A:
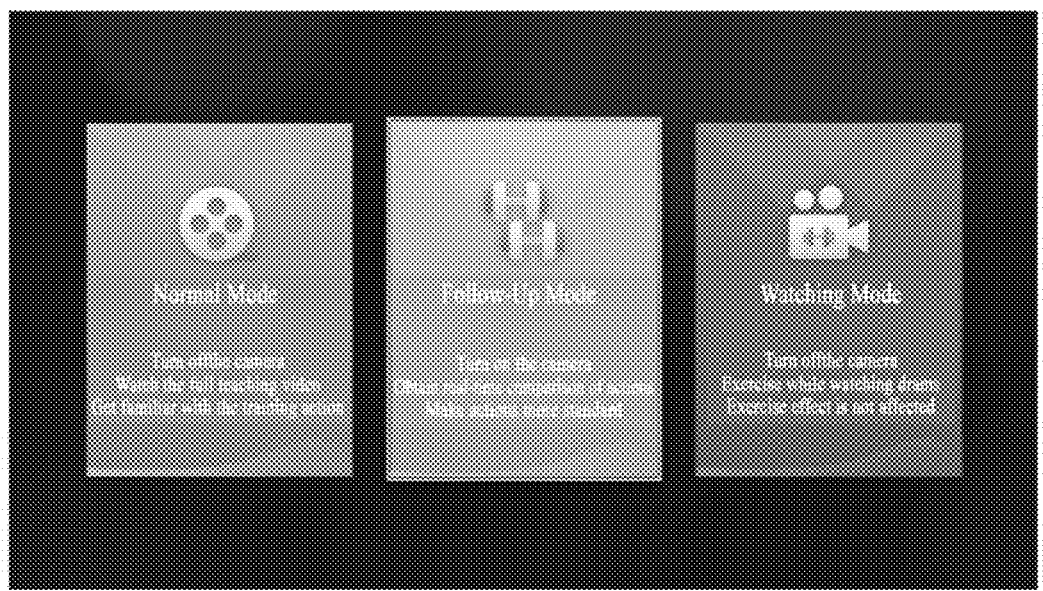
FIG. 12A is a schematic diagram illustrating a mode selection interface according to some embodiments of the present disclosure.

In some embodiments, after the user clicks a certain episode or a related recommendation or the control of "Start Training", the display apparatus can directly play the fitness video, or a mode selection interface can be popped up. Referring to FIG. 12A, the mode selection interface can be provided with at least one of three viewing modes, which respectively are: the normal mode, the follow-up mode, and the watching mode. The watching mode can also be referred to as an exercising-while-watching mode. Each viewing mode can be configured with a background image and is provided with a corresponding prompt, so that the user can easily understand characteristics of different viewing modes. For example, the normal mode can be provided with the following prompts: "Close the camera Watch the full teaching video Be familiar with the training action". The follow-up mode can be provided with the following prompts: "Turn on the camera Obtain real-time comparison of the action Make the action more standard". The watching mode can be provided with the following prompts: "Close the camera Exercise while watching the drama Exercise effect is not affected" or "Exercise while watching the drama Exercise effect is not affected". The specific prompt can be set as required.

In some embodiments, the mode selection interface is a floating layer on a details interface, and transparency of the floating layer can be set as required.

In some embodiments, in response to a selection for a media resource from a user, whether the media resource is a media resource for follow-up training is determined. The media resource for follow-up training is a media resource for training in which key frames with marked skeleton points are provided. Skeleton points in an image collected by the camera can be compared with the skeleton points in the key frames for action matching and recognition. Regarding matching with the media resource for follow-up training, several solutions have been disclosed in previous patents of the applicant, and details are not described herein.

In some embodiments, the display apparatus can determine whether the media resource is a media resource for follow-up training through a label of the video resource, and can also determine whether the media resource is a media resource for follow-up training by detecting whether there is skeleton point data.

In some embodiments, after it is determined that a medium resource for fitness is a medium resource for follow-up training, the displayed mode selection interface will include at least a control of the follow-up mode and a control of another mode (for example, at least one of a control of the normal mode and/or a control of the watching mode), as shown in FIG. 12A.

Figure 12B:
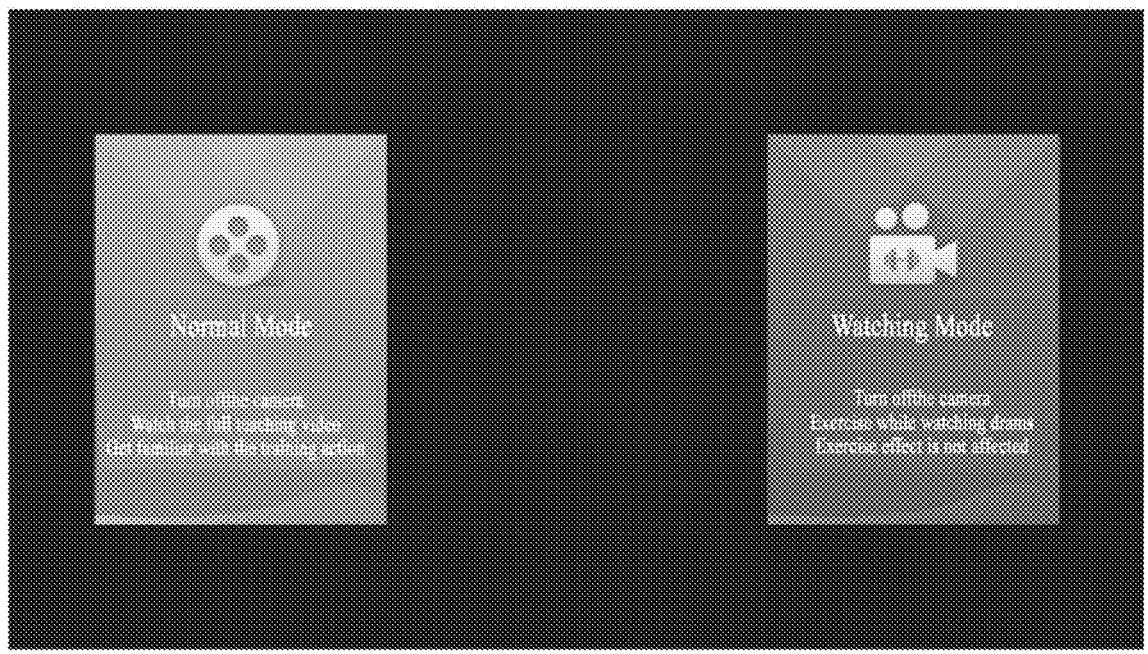
FIG. 12B is a schematic diagram illustrating a mode selection interface according to some embodiments of the present disclosure.

In some embodiments, after it is determined that a medium resource for fitness is not a medium resource for follow-up training, the displayed mode selection interface will include the control of the follow-up mode, but displays at least one of controls of other modes, as shown in FIG. 12B.

In some embodiments, according to the media-resource control selected by the user, a request for obtaining the media resource is sent to the server. The request includes a media-resource identifier corresponding to the media-resource control. Media-resource data of the media resource that is determined by the server based on the media-resource identifier is received, and a detail page/list page is loaded based on the media-resource data.

In some embodiments, the media-resource data includes a confirmation label that indicates whether the media resource is a media resource for follow-up training. A type of the confirmation label is determined after the user selects a playback control. Different mode selection interfaces are displayed when the confirmation labels represent different types of media resources.

In some embodiments, after a playback selection for the media resource is received, whether the media resource is a media resource for follow-up training is determined based on an identifier parameter of follow-up training of the media resource. The parameter of follow-up training of the media resource can be included in the media-resource data downloaded from the server when the media-resource control as shown in FIG. 6/the interface of the detail page as shown in FIG. 10 is displayed, or can be obtained from the server in a real-time after the playback selection for the media resource is received.

In some embodiments, after the playback selection for the media resource is received, it is determined whether the user has permission to play the media resource based on a user identifier. If the user does not have the permission, a permission purchase interface or a permission prompt interface is popped up, while the mode selection interface is not popped up.

In some embodiments, after the playback selection for the media resource is received, the display apparatus generates a request for playing the media resource based on a media-resource ID and an account ID, and sends the request to the server. The server performs authentication based on the account ID, and issues the media-resource data and a marker for indicating playback permission to the display apparatus when there is a playback permission. The display apparatus displays the mode selection interface based on the received data. When a user corresponding to the account ID does not have the permission to play, the video data is not issued to the display apparatus or only video data with limited duration is issued, and meanwhile, a marker for indicating that there is no playback permission is issued to the display apparatus. On this basis, the display apparatus displays the permission purchase interface but does not display the mode selection interface. After the user purchases the permission, the permission purchase interface or a subsequent interface will be canceled and the mode selection interface will be displayed to the user, thereby avoiding inconvenience of the user to return to the list page and re-enter the detail page.

Figure 12C:
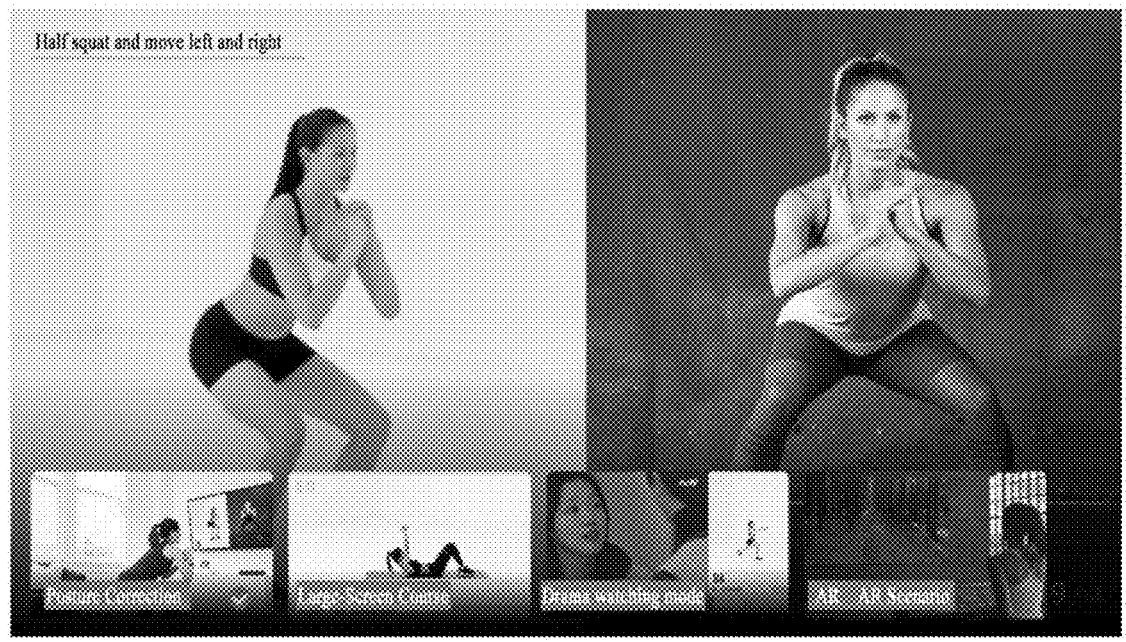
FIG. 12C is a schematic diagram illustrating a mode selection interface according to some embodiments of the present disclosure.

In some embodiments, the mode selection interface can also be disposed at a bottom portion of the current interface, as shown in FIG. 12C. The mode selection interface can also be provided with four viewing modes: posture correction, large-screen course, binge mode, and AR mode. The posture correction is similar to the follow-up mode in FIG. 12A, both for playing a user action and the fitness video at the same time. The large-screen course is similar to the normal mode in FIG. 12A, both for displaying the fitness video in full screen. The binge mode is similar to the normal mode in FIG. 12A, both for playing a movie resource and the fitness video at the same time. In an AR mode, through a 3D camera provided in the display apparatus, an image matting will be carried out and the user can be virtualized into a fitness scenario.

In some embodiments, there is such a mode that after a corresponding mode control is selected by the user, the display apparatus presents an interface including a playback window of the media resource for follow-up training and a playback window for showing a local video. The playback window of the media resource for follow-up training and the playback window of the local video are arranged side by side along a length direction of the display apparatus. The playback window of the media resource for follow-up training is configured to play a fitness media resource, and the playback window of the local video is configured to play the image collected by the camera. The playback window of the media resource for follow-up training and the playback window of the local video can be set on a same layer on the display.

In some embodiments, there is such a mode that after a corresponding mode control is selected by the user, the display apparatus shows an interface including a playback window of the media resource for follow-up training and a movie playback window. A layer where the playback window of the media resource for follow-up training is located is below a layer where the movie playback window is located, and the movie playback window covers a portion of the playback window of the media resource for follow-up training. The playback window of the media resource for follow-up training is configured to play a fitness media resource, and the movie playback window is configured to play other media resources other than the fitness media resource selected by the user.

In some embodiments, there is such a mode that after a corresponding mode control is selected by the user, the display apparatus shows a playback interface including a video playback window only. The playback window can be a playback window of the media resource for follow-up training, and is configured to display a fitness media resource.

Figure 13:
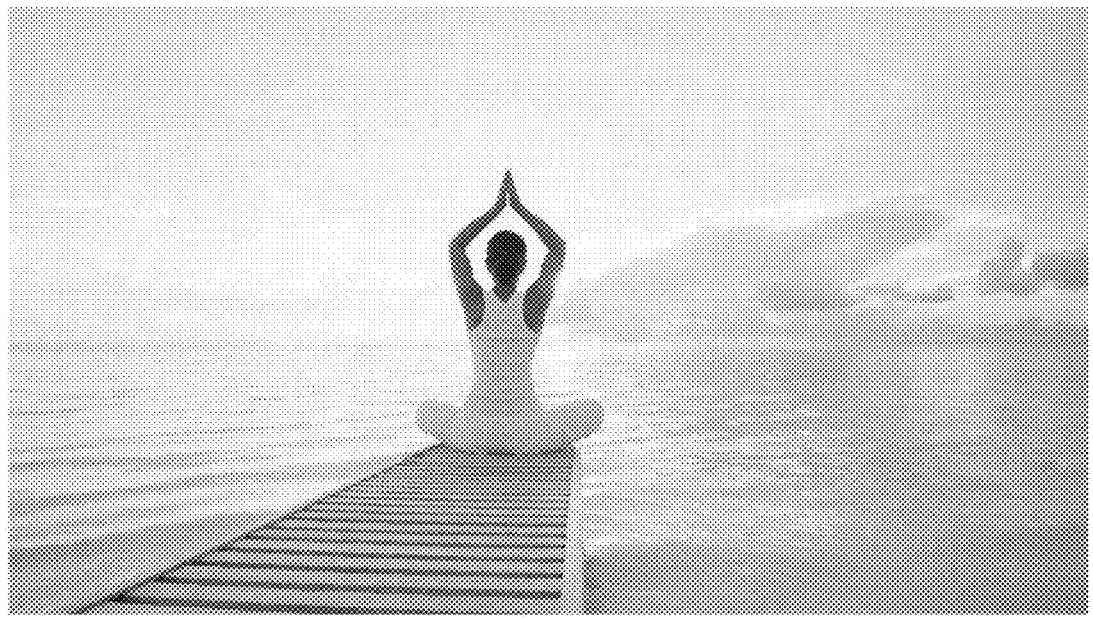
FIG. 13 is a schematic diagram illustrating a playback interface in a normal mode according to some embodiments of the present disclosure.

In some embodiments, after the normal model is selected by the user, the display plays the media resource in full-screen (as shown in FIG. 13).

Figure 15:
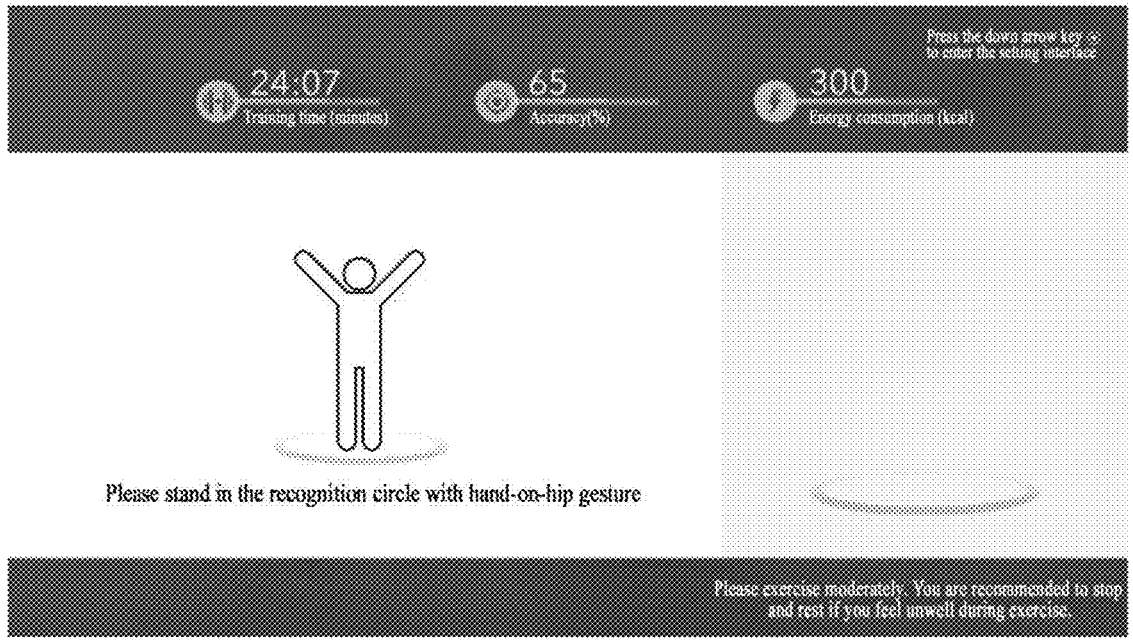
FIG. 15 is a schematic diagram illustrating a posture guidance according to some embodiments of the present disclosure.

In some embodiments, after the follow-up mode is selected by the user, the display goes to a gesture-recognition interface. The gesture-recognition interface includes a window for displaying a guided action and a window for a local video. The window for displaying the guided action is configured to display a recognition action that needs to be followed by the user, and the window for the local video displays a local image that is obtained by the camera in a real-time. After it is recognized that a person in the local image performs the recognition action, the video starts to be played (as shown in FIG. 15).

In some embodiments, the window for displaying the guided action is located above the playback window of the media resource for follow-up training. After the display apparatus recognizes that the user carries out the guided action correctly, the layer of the window for displaying the guided action is canceled, and the playback window of the media resource for follow-up training is triggered to play image data corresponding to an ID of the media resource for follow-up training.

Figure 41:
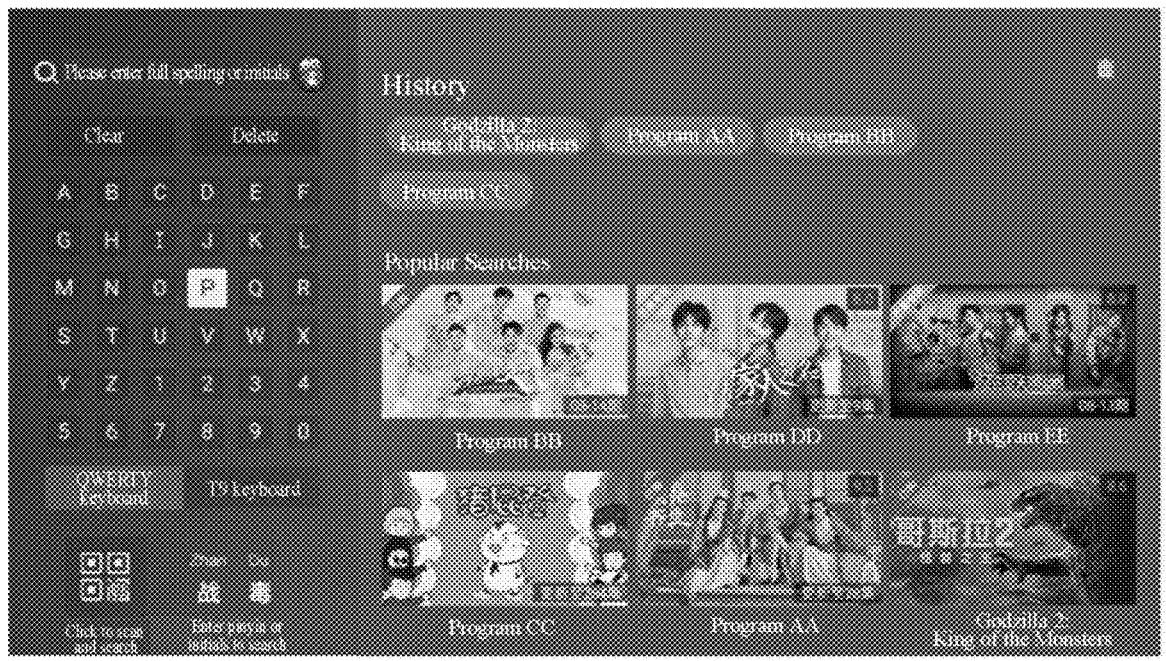
FIG. 41 is a schematic diagram illustrating a movie search page according to some embodiments of the present disclosure.

In some embodiments, after the watching mode control is selected by the user, a movie search page is first entered (the movie search page can be as shown in FIG. 41). In some embodiments, a movie search interface is provided above the original interface.

In some embodiments, when a fitness video corresponding to a certain episode or a related recommendation or the control of "Start Training" is a smart fitness media resource, the mode selection interface can display the three viewing modes that are described above, and the focus is the follow-up mode by default. In some embodiments, when a fitness video corresponding to a certain episode or a related recommendation or the control of "Start Training" is a common fitness media resource, the mode selection interface will only display two viewing modes, that is, the normal mode and the watching mode, and the focus is on the normal mode by default.

In some embodiments, each viewing mode is an operation control available for selection and operation. The normal mode and the watching mode support use of a logged in user and a non-logged-in user, and the follow-up mode supports the use of a logged in user. If the user is not logged in, the display apparatus may pop up a login interface when the user clicks the follow-up mode control, to guide the user to use the follow-up mode after logging in.

In some embodiments, when the user enters any one of the normal mode, the follow-up mode, and the watching while practicing for the first time, the display apparatus can display a guide map. After the guide map is displayed, for returning, reference can be made to the following:

1. Return to the video playback interface after introducing the normal mode.

2. Return to a playback interface of follow-up training after introducing the follow-up mode.
3. Return to a selection interface of the primary video after introducing the exercising-while-watching mode. The selection interface of the primary video can be a search interface.

In some embodiments, the secondary video refers to a target video selected by the user in an exercise interface. The user can watch in the follow-up mode based on the video, or can exercise in the watching mode based on the video. Demonstration actions for exercise are displayed in the secondary video for the user to follow.

In some embodiments, the primary video refers to, under a selection made by the user in the watching mode, the audio and video content presented to the user for viewing while the secondary video is presented. There is no video action for exercise in the primary video.

In some embodiments, the primary video and the secondary video are audio and video contents corresponding to different media resources.

In some embodiments, after the user clicks a certain episode or a related recommendation or the control of "Start Training", the display apparatus can pop up the mode selection interface or directly enter the viewing mode according to default mode selection logic. The default mode selection logic can be as follows:
  a. When the user enters a certain course for the first time, the mode selection page is displayed, and a function of the corresponding mode can be used after selection of the user;
  b. When the user enters the course not for the first time, the follow-up mode is entered by default if the course has the follow-up mode; or the normal mode is entered by default if the course does not have the follow-up mode; and
  c. An abnormal scenario: the user enters the normal mode if he entered the follow-up training mode last time but the current course is a normal course.

In some embodiments, when the user clicks the control of "Normal Mode" or enters the normal mode according to the default mode selection logic, the display apparatus plays the fitness video in the normal mode.

Referring to FIG. 13, FIG. 13 is a schematic diagram of a normal mode according to some embodiments. In the normal mode, the user can perform the following operations:
  1. Press a down direction key to invoke an episode functional area, and the focus is on a current episode in the [playlist] by default; and
  2. Press a menu key, and the focus is on a current mode of [mode switching] by default.

After the user performs mode switching, the display apparatus pauses play of a current playback interface and loads a display interface corresponding to the mode after switching. For example, when it is switched from the normal mode to the follow-up mode, a current playback interface for follow-up training is paused, and playback information (including at least one of the media-resource identifier, the play time, and other data) of the media resource for follow-up training is recorded, so as to start an interface for follow-up training. In the playback window of the media resource for follow-up training, media-resource data played in the normal mode is loaded based on the playback information. Data of the local image obtained by the camera is loaded in a local video window.

In some embodiments, the mode selection interface may not be provided. After the playback control is selected by the user, the display apparatus directly plays the media resource for follow-up training according to a preset playback mode.

In some embodiments, when the user clicks the control of "Follow-up Mode" or enters the follow-up mode according to the default mode selection logic, the display apparatus can display the guide map based on the follow-up mode to which the user enters for the first time or the first few times. In follow-up mode, the guide map can be a guide map for a gesture operation.

Figure 14:
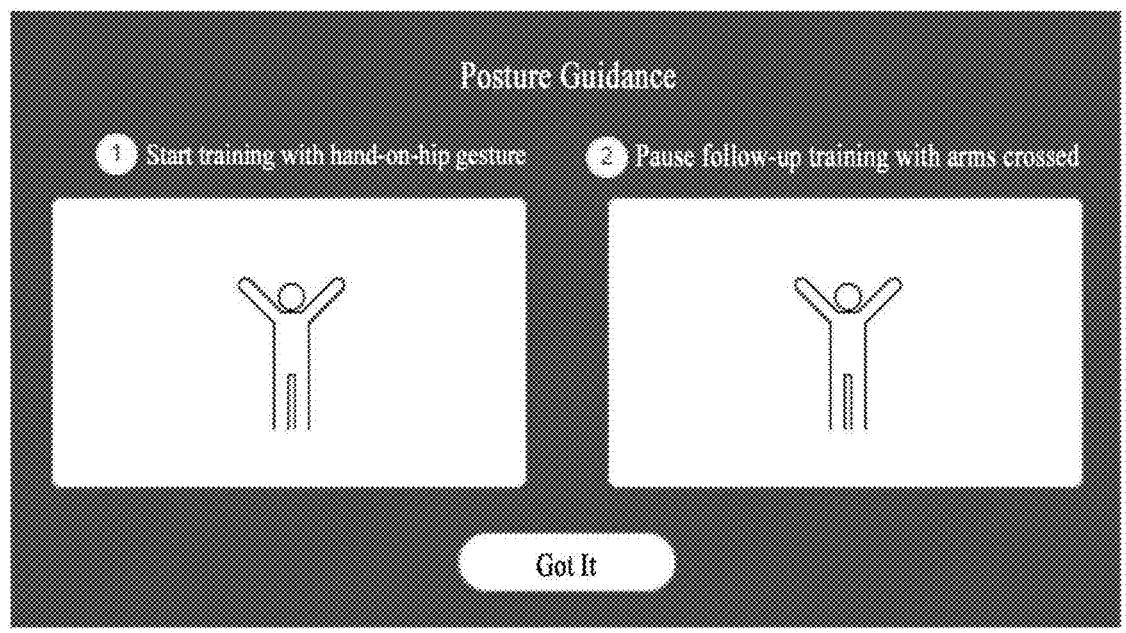
FIG. 14 is a schematic diagram illustrating a posture guidance according to some embodiments of the present disclosure.

In some embodiments, referring to FIG. 14, the guide map for the gesture operation includes a guide map for gesture recognition and a guide prompt. When the user enters the follow-up mode for the first time, a reminder of gesture guidance shown in FIG. 14 is displayed; and when it is not for the first time that the user enters the follow-up mode, the reminder to the gesture guidance is not displayed. In the guide map for gesture recognition, the focus is on the control of "Got It" by default. If this control is clicked by the user, the display image may skip to a next guide map, such as a guide map for guiding a user in certain area. If the user clicks back, the display apparatus goes back a previous image, such as the page about fitness details.

In some embodiments, referring to FIG. 15, in a body recognition interface, the display apparatus needs to determine an object of the action detection. For example, when there is a single person or more persons, the guiding action is done by following the one or more objects in the camera area, and skeleton point data of the one or more objects that matches the guided action is determined, and action detection and recognition in subsequent image frames are performed based on the determined skeleton point data.

In some embodiments, the object recognition interface includes at least two windows, where one window is configured to display a demonstration picture of the guide action, and the other is configured to display real-time body data obtained by the camera. In some embodiments, the action demonstration picture is displayed on the left side, an image captured by the camera is displayed on the right side, and an AR recognition circle is displayed in the middle.

In some embodiments, when the user enters the follow-up mode for the first time, data about duration, accuracy, and energy consumption that are in a top portion are all empty.

In some embodiments, a guide-position icon is preset on an upper layer of a window for displaying the local image obtained by the camera, so that the user can move/change his actual position with reference to the image in the local image window and a relative position of the guide-position icon.

In some embodiments, when the user does not enter the follow-up mode for the first time but checks the guide map for the gesture operation again during the training process, data about duration, accuracy, and energy consumption can be displayed in a top portion of a guide map for body recognition. In some embodiments, during the training process, the user can enter a setting interface through a direction key, and enter an interface of the guide map for the gesture operation from the setting interface. When the display apparatus displays the guide map for guiding the user in certain area, the user can make a corresponding action according to the action demonstration picture. In some embodiments, after a period of time, a display image may skip to a next guide map. In some embodiments, for the display apparatus, display image can skip to a next guide image based on that an action of the user is consistent with the action demonstration picture.

Figure 16:
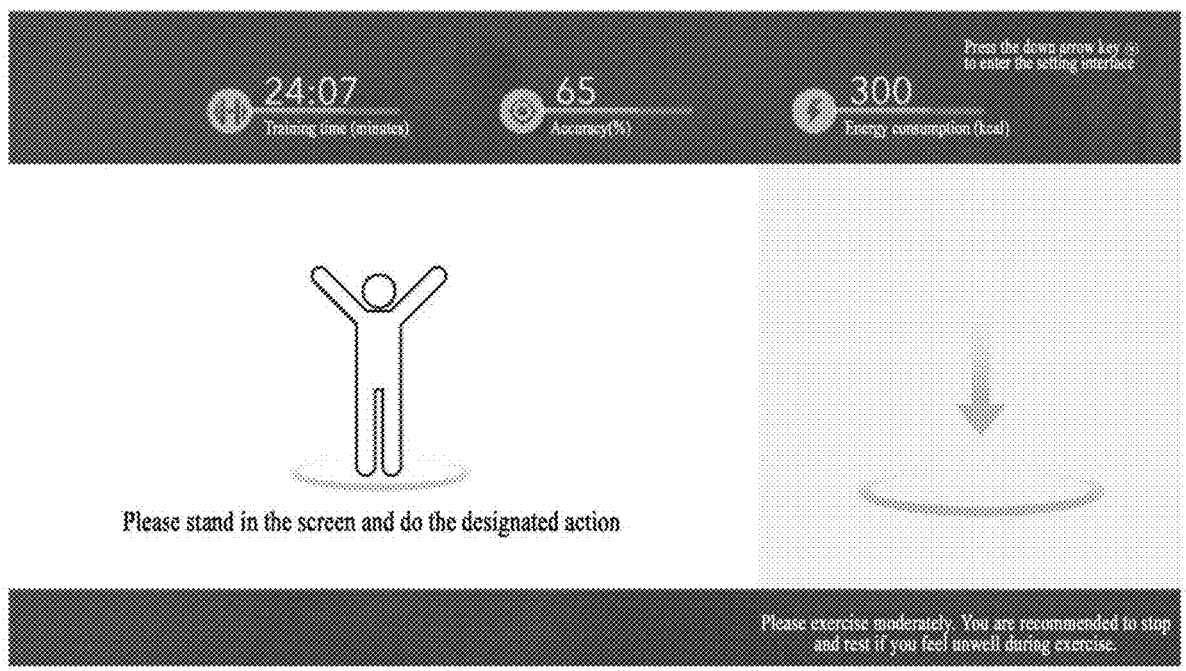
FIG. 16 is a schematic diagram illustrating a posture guidance according to some embodiments of the present disclosure.

Referring to FIG. 16, in some embodiments, a guide map next to the guide map is the guide map for body recognition. After entering an object guide map, the user can make a corresponding action according to the action demonstration picture. The display apparatus displays image data captured by the camera in a window for displaying a local image, and determines whether the image data matches with the action in the action demonstration picture, so as to determine whether the user completes the guide action.

In some embodiments, the display apparatus can perform the following based on the image captured by the camera:
I. No one is in the screen
  1. The above prompt is displayed if no one is in the screen for 3 s. Voice prompt: Stand in the screen and do the designated action to start the follow-up training.
  2. The voice prompt is repeated every 3 s.
  3. The camera slowly rolls to a position at the center, and the circle moves accordingly to maintain the relative position of the circle to the local image window.
II. Someone is in the screen
  1. When the camera can move, the position of the person is recognized. The circle falls at the feet of the current person, and the camera is slowly rolled to ensure that the person stands in the middle of the image. The circle and the camera move with the movement of the person.
  2. When the camera cannot move, there is no need to move the camera that does not support movement. Further, the user can be prompted to move to the middle of the window.
III. someone in the screen but does not act
  1. If there is a recognized person in the screen and there is no action for more than 5 s, there is a voice prompt: Follow the picture to do the designated action to start the follow-up training.
  2. The voice prompt is repeated every 3 s.
IV. state changes
  1. The arrow prompt is canceled if the state is changed from no one to someone. For other processing, reference can be made to "II".
  2. If the state is changed from someone to no one, reference can be made to "I" for the processing.

Further, an interaction between automatic focus tracking and camera settings of the whole apparatus is also included.
  1. The camera settings in a fitness application may be stored locally, and the camera is at a default position when being turned on next time.
  2. When an initial value is empty, it is the camera position of the whole apparatus by default.

In some embodiments, if the user clicks back, the apparatus goes back to a previous image, such as the page about fitness details.

Figure 17:
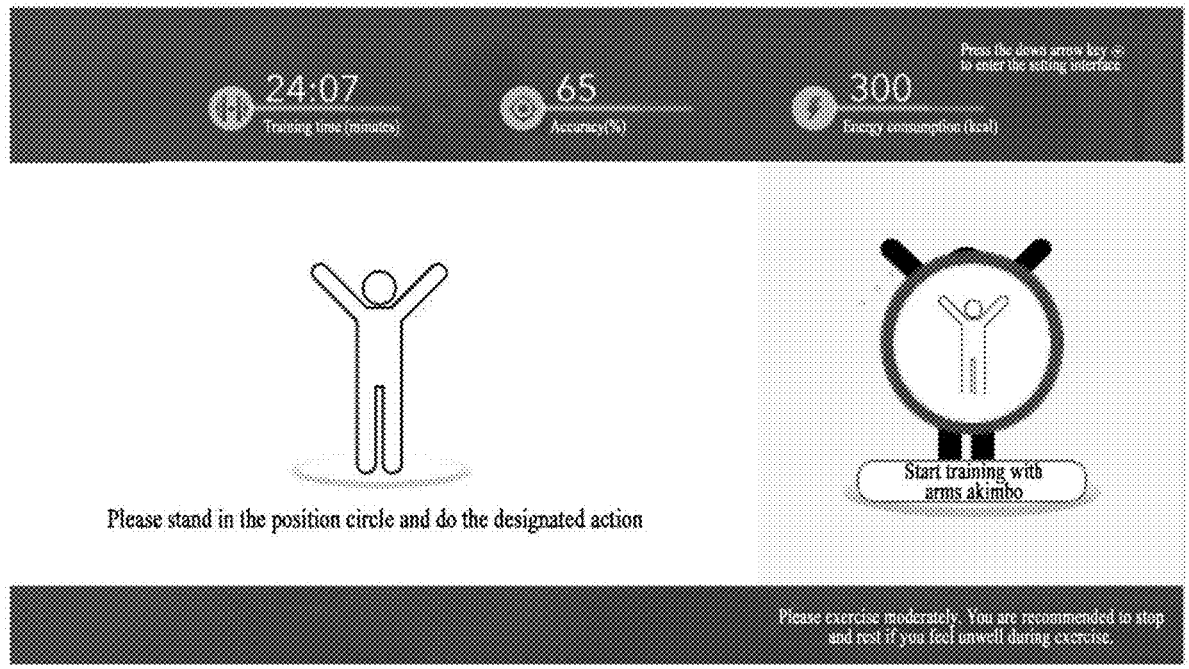
FIG. 17 is a schematic diagram illustrating a posture guidance according to some embodiments of the present disclosure.

In some embodiments, guiding the user to enter into a designated position and prompting the user to do the designated action can be performed in different steps or at the same time. Referring to FIG. 17, after the person stands at the designated position, a guide map next to the guide map for body recognition can be a guide map for action recognition. After entering the guide map for action recognition, the user can perform a corresponding action according to the action demonstration picture. In some embodiments, the display apparatus can perform the following based on the image captured by the camera:
  1. When the user performs an action according to the demonstration picture, what is displayed is as shown in FIG. 17. The follow-up training is started 2 s later.
  2. When the user abandons the action during the action display process, the process will be paused. Other situations are described as follows:
    a. When the user continues to perform the designated action, the progress bar will continue.
    b. If the user walks out of the position circle, the final result will be the same as that the interface is entered for the first time.
  3. After the action is completed normally, the mask on the left will be removed, and a countdown will be displayed. At this time, a video starts to be loaded, and playback is started after the countdown ends. The prompt in the camera interface on the right disappears. Voice prompt: Ready, training will start immediately.

Figure 18:
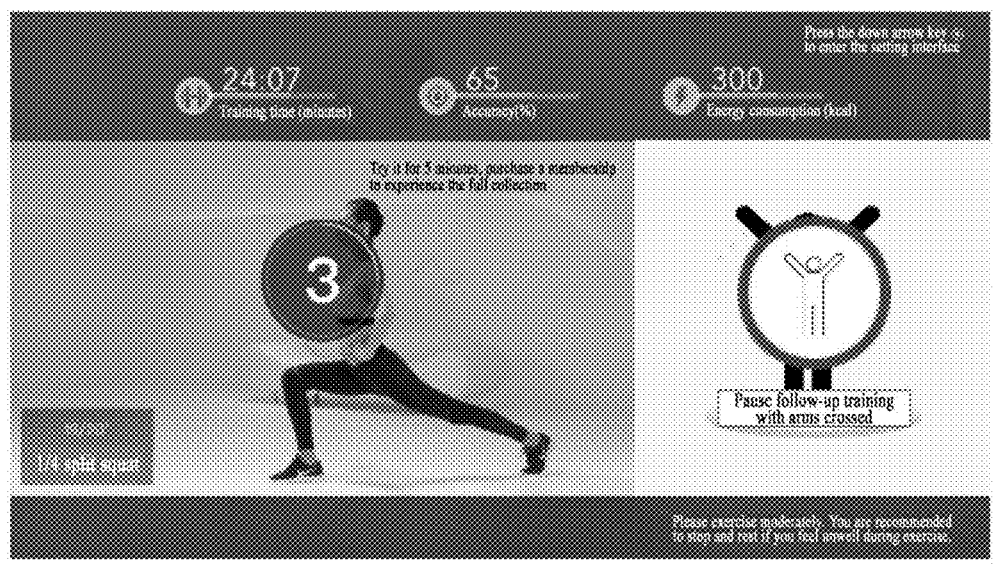
FIG. 18 is a schematic diagram illustrating a posture guidance according to some embodiments of the present disclosure.

Referring to FIG. 18, a guide map next to the guide map for action recognition can be a pause guide map for crossed arms. After entering the pause guide map for crossed arms, the user can make a corresponding action according to the action demonstration picture.

In some embodiments, the display apparatus can perform the following based on the image captured by the camera:
  1. After a crossed arm gesture lasts for 1 s, recognition of the countdown for pause is started.
  2. After the crossed arm gesture lasts for 2 s, pause is triggered and the display apparatus enters a pause state.
  3. If the action quits during a process of performing the action, the progress of pause ends. The progress starts from the beginning again when the action is performed the next time.
  4. Press the OK key on the remote control to enter the pause state directly.
  5. During the follow-up training, the position circle changes with the movement of the user. The training is paused if the user leaves a display area of the camera.

Figure 19:
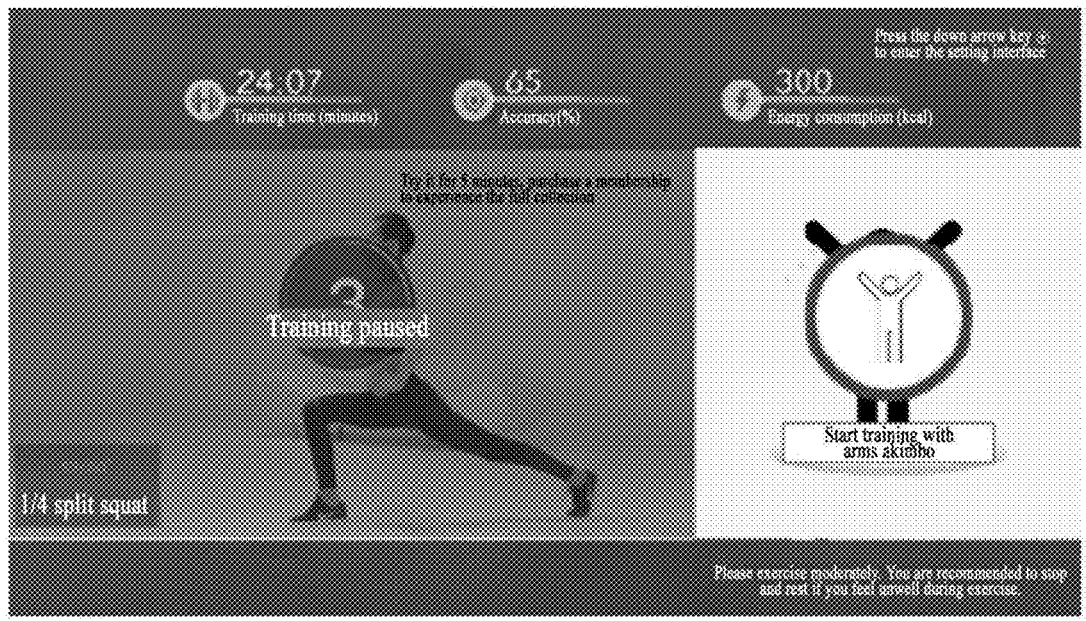
FIG. 19 is a schematic diagram illustrating a posture guidance according to some embodiments of the present disclosure.

In some embodiments, referring to FIG. 19, a guide map next to the pause guide map for crossed arms can be a guide map for a pause state. After entering the guide map for the pause state, the user can perform a corresponding action according to the action demonstration picture. In some embodiments, the display apparatus can use perform following based on the image captured by the camera:
  1. after the hand-on-hip gesture lasts for 1 s, recognition of the countdown for pause is started.
  2. After the hand-on-hip gesture lasts for 2 s, playback is triggered to and a playback state will be entered.
  3. If the action quits during a process of performing the action, the progress of start training ends. The progress starts from the beginning again when the action is performed the next time.
  4. If the OK key on the remote control is pressed, the countdown to 3, 2, and 1 starts on the left window, and the pop-up window on the right disappears. After the countdown ends, playback starts from where it was last played.

In some embodiments, after a pause action is detected, a similarity between an action in a video frame of a demonstration action at a close time point and a standard pause action is obtained. An operation of pausing the training is not triggered when the video frame of the demonstration action at the close time point has an image frame action similar to the standard pause action. Otherwise, the operation of pausing the training is triggered. This is to avoid a situation where actions in a video frame for follow-up training have a pause action during the follow-up training, and false pause is caused after the follow-up training of the user.

In some embodiments, whether the video frame of the demonstration action at the close time point contains an image frame action similar to the standard pause action can be determined based on a match score in an action comparison that has been made. A high match score for the follow-up training indicates that there is a similar action in a video for follow-up training. A low match score for the follow-up training indicates that there is no similar action in the video for follow-up training.

Figure 20:
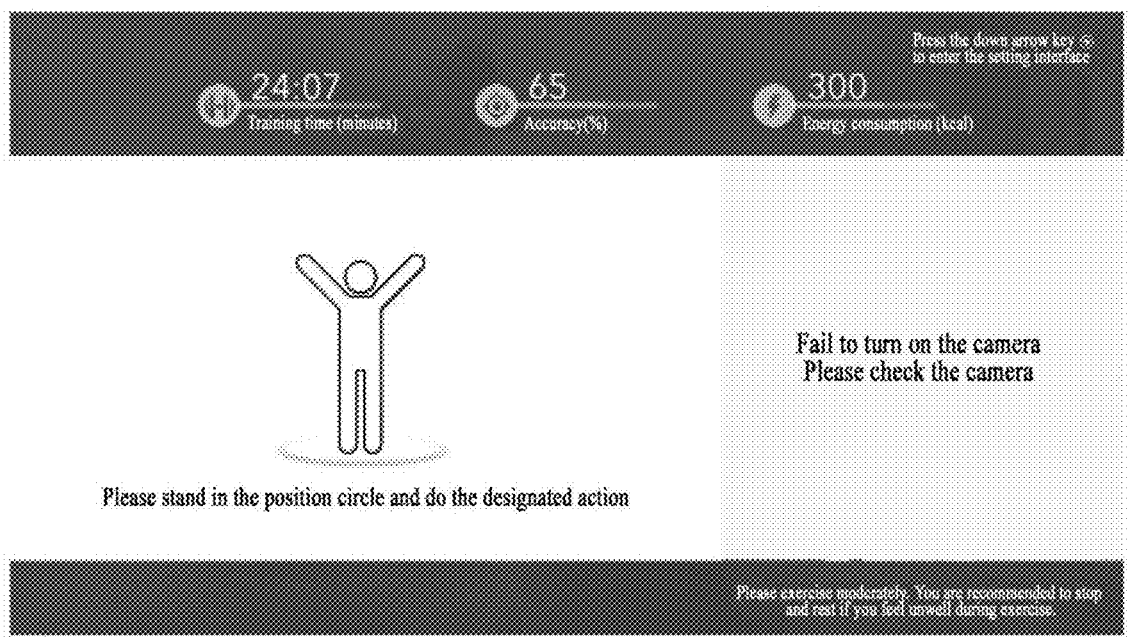
FIG. 20 is a schematic diagram illustrating a posture guidance according to some embodiments of the present disclosure.

Referring to FIG. 20, in some embodiments, a guide map next to the guide map for the pause state can be a guide map for indicating that there is a camera but the camera cannot be invoked. A prompt image is set in the guide map for indicating that there is a camera but the camera cannot be invoked, to prompt the user to check the camera.

Figure 21:
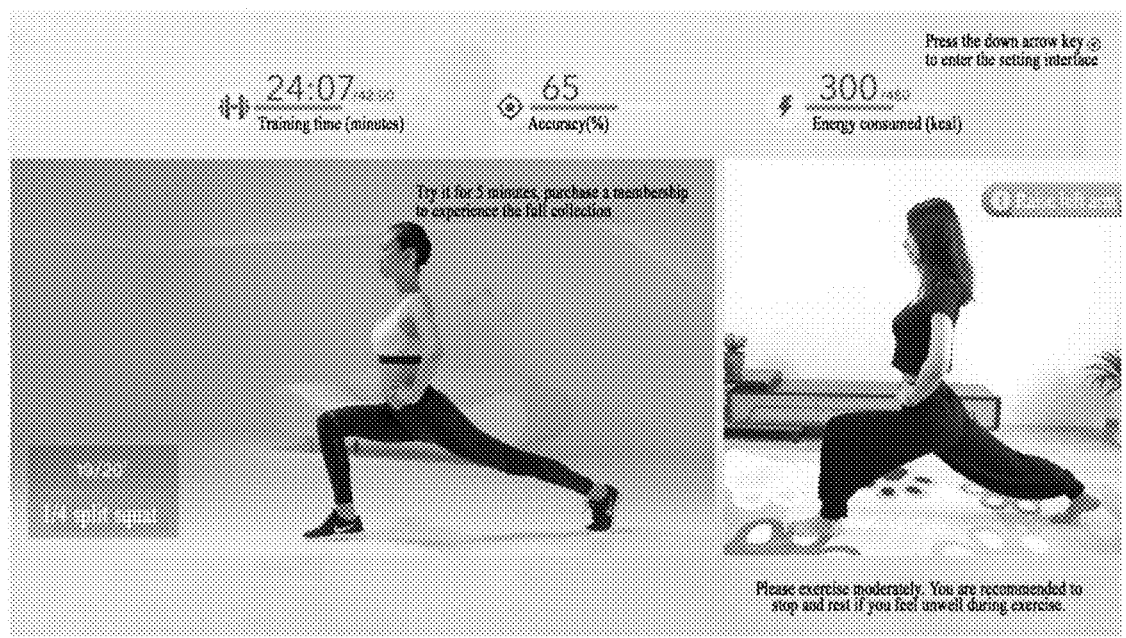
FIG. 21 is a schematic diagram illustrating a playback interface in a follow-up mode according to some embodiments of the present disclosure.

When the user enters the follow-up mode for the first time, the display apparatus displays an interface of the follow-up mode after the guide image is played, so that the user can perform follow-up training. Referring to FIG. 21, the interface of the follow-up mode can include two playback windows, one of which is configured to play the fitness video, such as a course for follow-up training, and the other one is configured to play an image of the camera. In addition, the display interface can also display other information, such as a trial rule and a training record. In view of the above, in the follow-up mode, a user image can be uploaded to the display apparatus via the camera in the display apparatus, so that the user can intuitively determine whether his or her action is the same as that in the fitness video.

In some embodiments, the display apparatus can also display a prompt on a window for follow-up training of the user based on a result determined by software whether the action of the user is the same as that in the fitness video.

Figure 22:
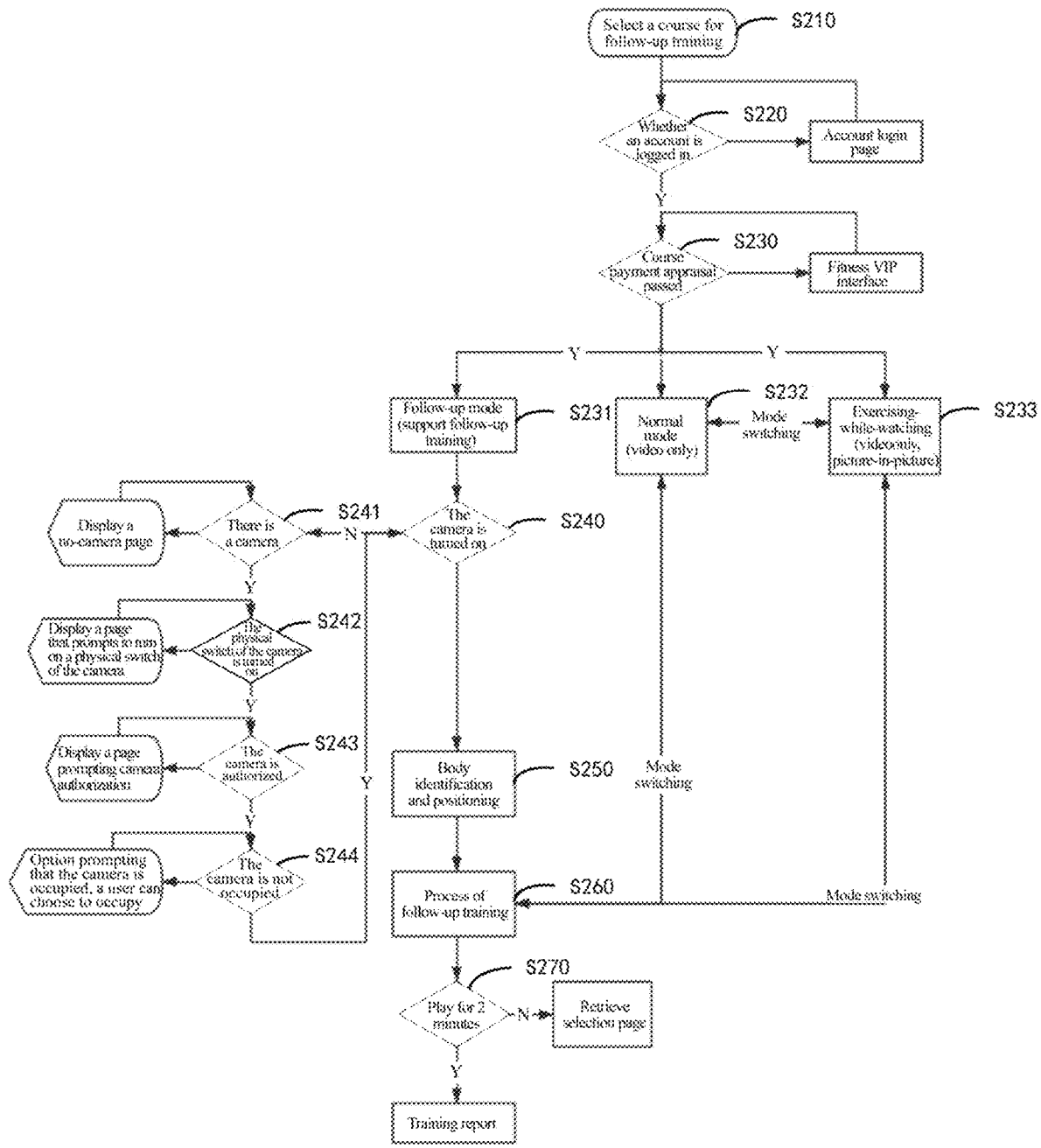
FIG. 22 is a schematic diagram illustrating a follow-up training flowchart according to some embodiments of the present disclosure.

In some embodiments, when it is not the user's first time to enter the follow-up mode, after the display apparatus enters the follow-up mode, the user interface can be displayed like FIG. 22, including:

Step S210: Receive a selection of a course for follow-up training from a user.

Step S220: Determine whether an account is logged in; in response to no account being logged in, display an account login page; and in response to the account being logged in, the flow goes to step S230.

Step S230: Perform authentication according to the logged in account, and determine whether payment authentication of the course is passed; in response to authentication being not passed, display a fitness VIP interface for the user to purchase VIP; and in response to the authentication being passed, provide an interface for selecting a training mode.

Steps S231 to S233: if a follow-up mode is selected, the flow goes to step S240; play a corresponding media resource for follow-up training if a normal mode or an exercising-while-watching mode is selected; and the user can select to switch between training modes if the course supports.

Step S240: Determine whether a camera is turned on; if the camera is not turned on, the flow goes to steps S241 to S244; and if the camera is turned on, the flow goes to step S250.

Steps S241 to S244: Determine whether the camera is connected with the display apparatus, and display a no-camera page if no camera is connected, and prompt that no camera is connected; and determine whether a physical switch of the camera is turned on if the camera is connected. If the physical switch of the camera is not turned on, a page that prompts to turn on the physical switch of the camera is displayed. If the physical switch is turned on, whether the camera is authorized is determined. If the camera is not authorized, a page prompting camera authorization is displayed. If the camera is authorized, whether the camera is occupied by an application of the display apparatus is determined. If the camera is occupied, an option for prompting that the camera has been occupied is displayed, and the user can select the occupied camera. If the camera is occupied, it proves that the camera has been turned on and step S250 is performed.

Step S250: Perform body recognition and positioning.

Step S260: Enter follow-up training process.

Step S207: Determine play time when the user exits, where a training report is generated if playback lasts more than 2 minutes, and display a retrieve interface if the playback lasts less than 2 minutes.

Figure 23:
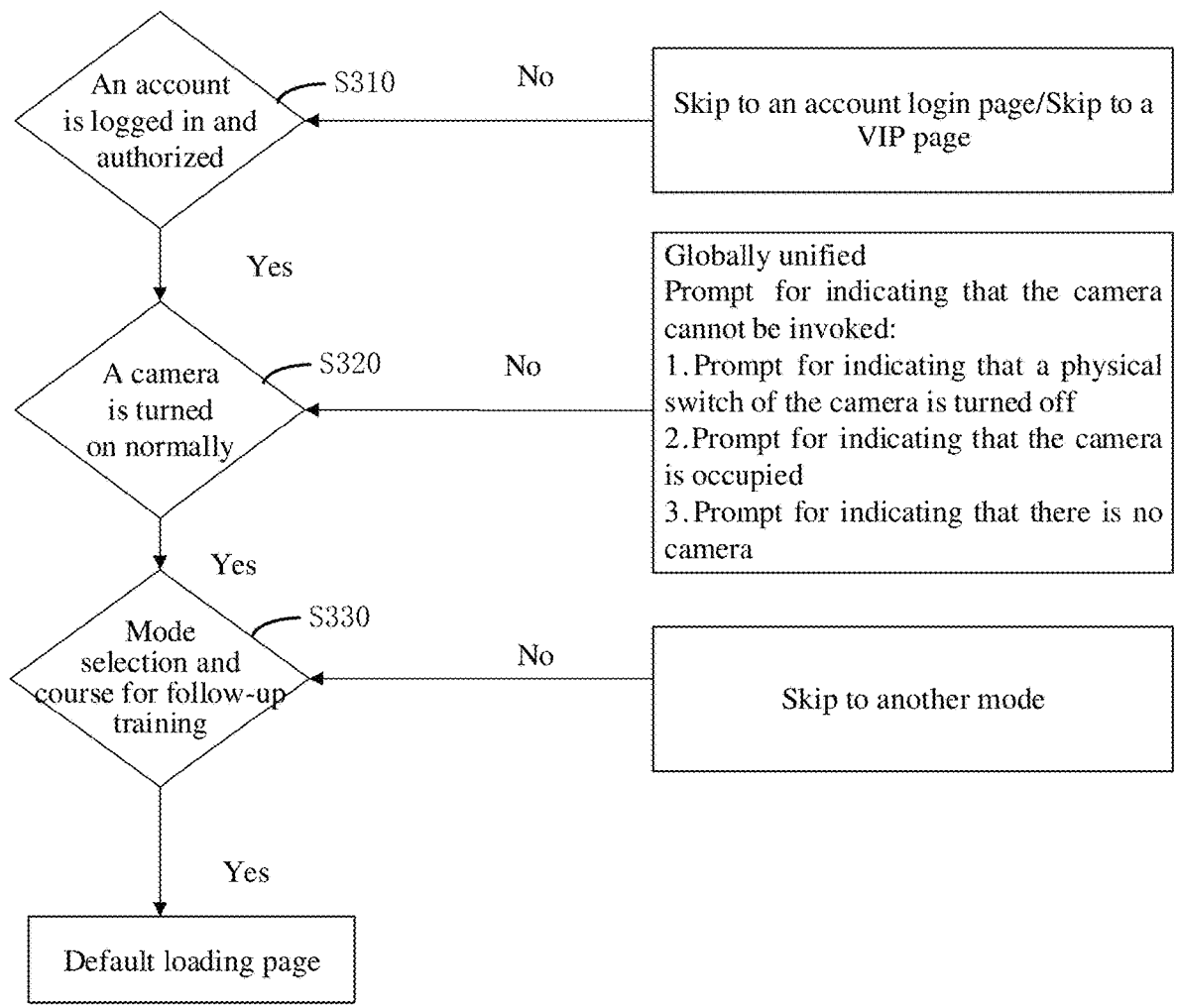
FIG. 23 is a schematic diagram illustrating a follow-up training flowchart according to some embodiments of the present disclosure.

In some embodiments, the processing prior to the process of follow-up training in FIG. 22 can be simplified to the process shown in FIG. 23, including steps S310 to S330.

Step S310: Determine whether an account is logged in and has rights, if yes, perform step S320, or otherwise, skip to an account login page or a VIP page.

Step S320: Determine whether the camera is normally turned on, and if yes, perform step S330, or otherwise, display a prompt for indicating that the camera cannot be invoked is displayed, wherein the prompt comprises that the physical switch of the camera is turned off, the camera is occupied, or there is no camera.

Step S330: Determine whether a selected mode matches with the course for follow-up training, and if yes, display a default loading page, or otherwise, skip to another mode.

When the display apparatus enters the process of follow-up training according to the processing shown in FIG. 22, the default loading page can be displayed, or the default loading page is displayed according to the processing shown in FIG. 23.

Figure 24:
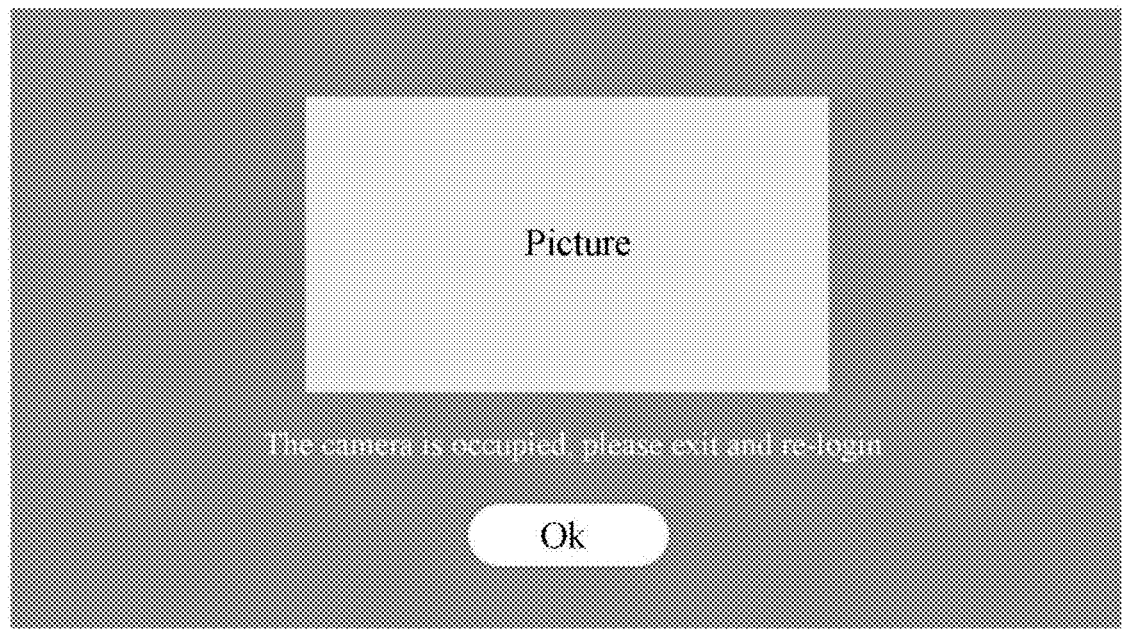
FIG. 24 is a schematic diagram illustrating that a camera is occupied according to some embodiments of the present disclosure.

In some embodiments, if the camera is occupied by another application, the default loading page can be a page prompting that the camera is occupied. As shown in FIG. 24, the default loading page can prompt the user to log out and then re-login.

Figure 25:
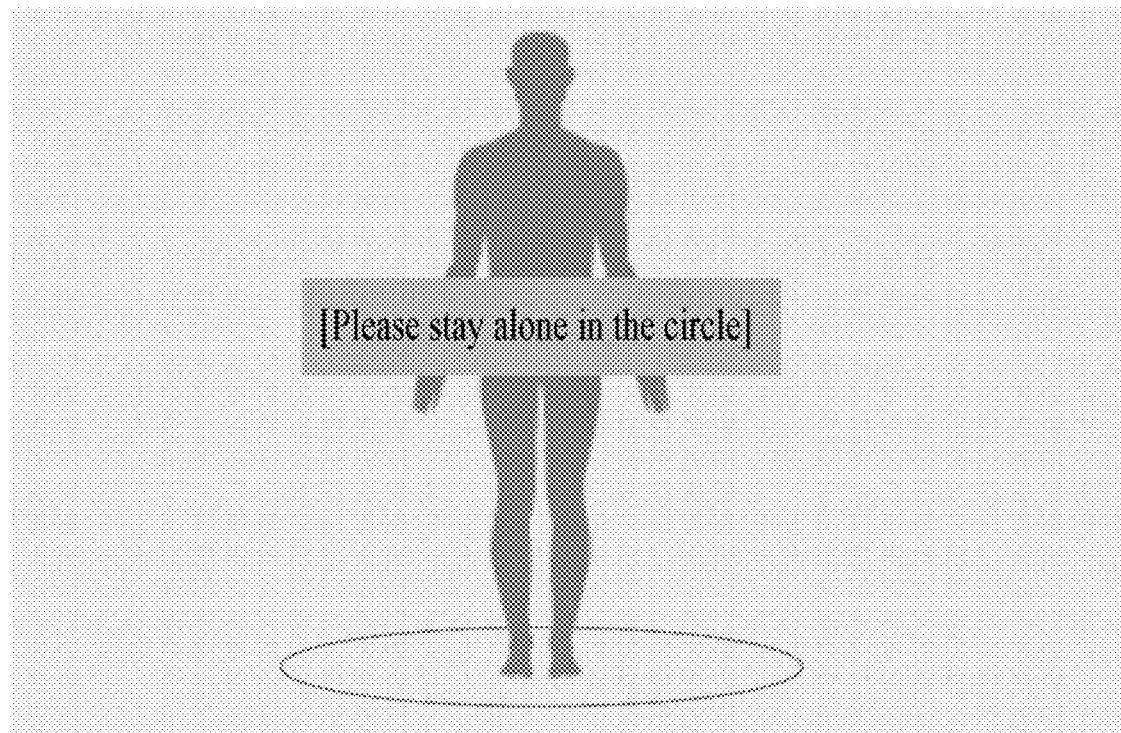
FIG. 25 is a schematic diagram illustrating a guidance for follow-up training according to some embodiments of the present disclosure.

In some embodiments, if the camera is not occupied by another application and is successfully turned on, the default loading page shown in FIG. 25 can be displayed, such as a body recognition interface. As shown in FIG. 25, the body recognition interface can be provided with prompt information, such as "Please stand alone in the circle". The display apparatus can perform body recognition via the camera after the loading page is displayed. An interface for follow-up training is entered if the recognition is successful. If a back button is clicked, the display apparatus goes back to an original interface, that is, an interface previous to the loading page. Further, after the recognition is successful, the display apparatus fixes an angle of the camera, such that user images may be collected stably.

In some embodiments, a process in which the display apparatus performs body recognition is as follows:

I. it is determined that there is no one in the current interface.
  1. If the camera cannot move, or a user cannot be found even the camera has been moved to the boundary, the following prompt text is displayed: Please stand in the center of the screen.
  2. When the camera can move, the camera will be slowly moved to a position at the center and the circle moves accordingly.

II. it is determined that there is someone in the current image.
  1. When the camera can move, the circle falls at the feet of the current person, and the camera is slowly move to ensure that the person is in the middle of the image. The circle and the camera move with the movement of the person.

2. When the camera is on its boundary (an upper boundary, a lower boundary, a left boundary, or a right boundary), the following prompt message is displayed: Please stand in the center of the screen.

III. state change from no one to someone.
1. Cancel the prompt.
2. For other processing, reference can be made to "II. it is determined that there is someone in the current image".

IV. state change from someone to no one—reference can be made to "I".

V. There are multiple persons in front of the camera.
1. Only one person is recognized In some embodiments, at least two among the plurality of people can be recognized.

Figure 26:
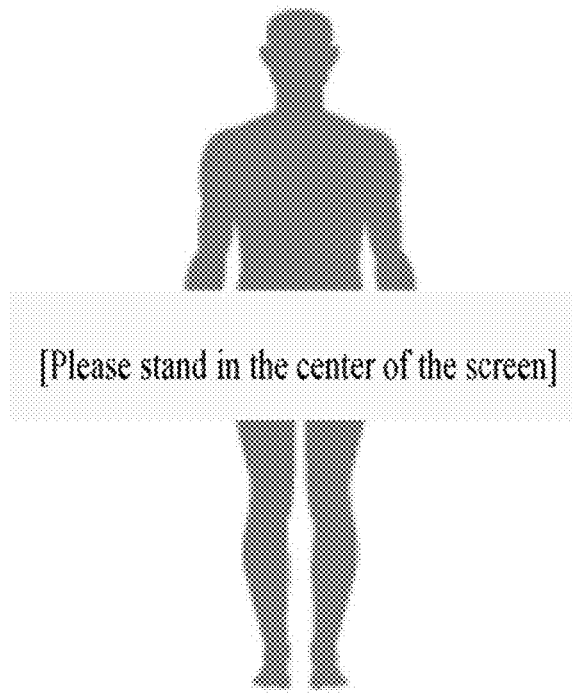
FIG. 26 is a schematic diagram illustrating a guidance for follow-up training according to some embodiments of the present disclosure.

In some embodiments, a prompt page can be displayed if the camera cannot display the user in the center of the screen. As shown in FIG. 26, the prompt page can display the prompt message: "Please stand in the center of the screen". After the user is in the center of the screen, the display apparatus can display the prompt page shown in FIG. 27, to prompt the user to confirm start of the follow-up training.

Figure 27:
FIG. 27 is a schematic diagram illustrating a guidance for follow-up training according to some embodiments of the present disclosure.
Figure 28:
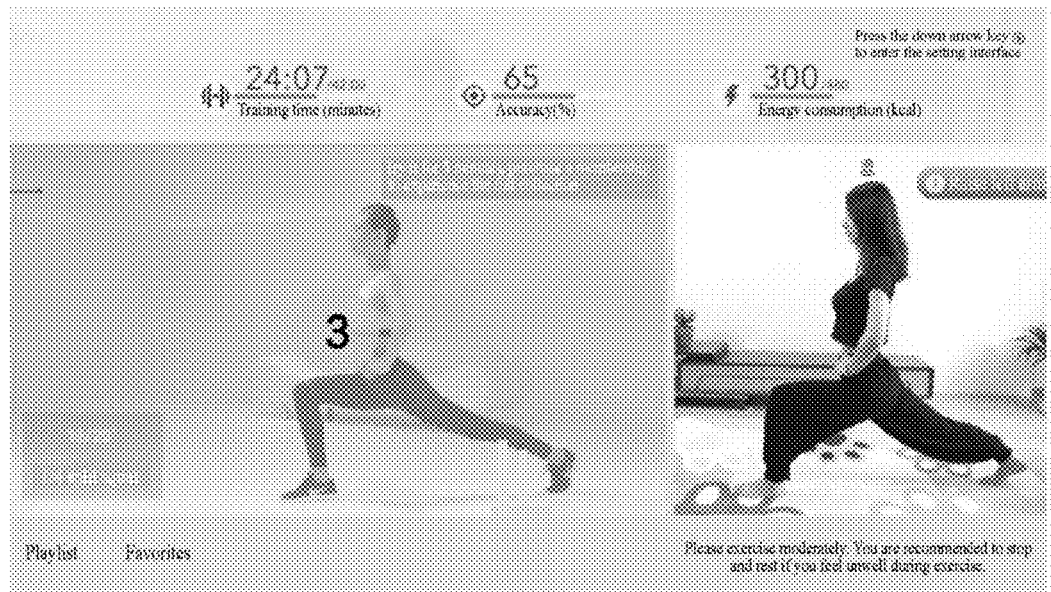
FIG. 28 is a schematic diagram illustrating countdown for follow-up training according to some embodiments of the present disclosure.

In some embodiments, after the user operates according to the prompt shown in FIG. 27, referring to FIG. 28, the display apparatus displays a countdown of 3s, and then starts to play the video for follow-up training and the user image.

In some embodiments, when the user switches episodes during the follow-up training, there is no need to perform body recognition again.

Figure 29:
FIG. 29 is a schematic diagram illustrating an assessment interface for follow-up training according to some embodiments of the present disclosure.

In some embodiments, if there is a trial rule for the course for follow-up training, the trial rule can be displayed in an upper right corner of the course for follow-up training. During the training process, the display apparatus locks user face tracking by using a face recognition algorithm, and identifies the user in the image of the camera, which moves with the user. When the user successfully and correctly makes an action, feedback, such as words of encouragement, is displayed to encourage the user. To be more attractive, the words of encouragement can be displayed in a form of animation. Referring to FIG. 29, the words of encouragement may be "GOOD".

In some embodiments, the feedback of the display apparatus to the user action can be generated according to the feedback rules in the following table 1:

TABLE 1

| Priority | Feedback | Triggering condition | Animation interactions feedback |
|---|---|---|---|
| 3 | Encouragement feedback | An accuracy rate above 80% for 3 consecutive seconds | Two AR encouragement feedback animations are displayed randomly |
| 3 | Wrong actions feedback | An accuracy rate below 60% for 3 consecutive seconds | Two AR wrong feedback animations are displayed randomly |
| 2 | The human body does not move | No human body is detected in 4 seconds | Poke the user with both hands |
| 1 | The human body is not in a detection range of the camera | It is detected that the person is not in the frame for 4 seconds | It is displayed that no one is detected by the camera |
| 0 | There is no camera | No camera is detected | It is displayed that no camera is detected |

In some embodiments, a smaller priority value indicates a higher priority.

The training record can include training time, burned calories, and accuracy. The training record can be refreshed and displayed based on time, and refresh rules are as follows.

a. Training time: The training time is refreshed and displayed in real-time based on course time.
b. Accuracy: During a time period of an effective action, the user follows up the exercise, and the accuracy is refreshed every second.
c. Burned calories: Accuracy of a user action within 1 s*1 s/time of an effective gesture in the video*standard calories. If the burned calories cannot be determined, expected refresh time is once every 1 s.

In some embodiments, burned calories can be displayed as consumed energy. The consumed energy can also be calculated according to the following manner:

Consumed energy=sum of energy consumed in all actions.

Energy consumed in each action=energy of each action*accuracy of the action.

Accuracy of a certain action=an arithmetic average of all accuracy value during the action (including missed data).

In a media-resource file of the video for follow-up training, energy for each action should be provided.

Figure 30:
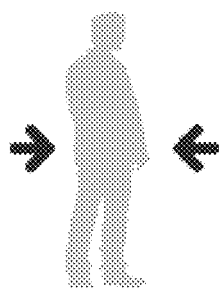
FIG. 30 is a schematic diagram illustrating an assessment interface for follow-up training according to some embodiments of the present disclosure.
Figure 31:
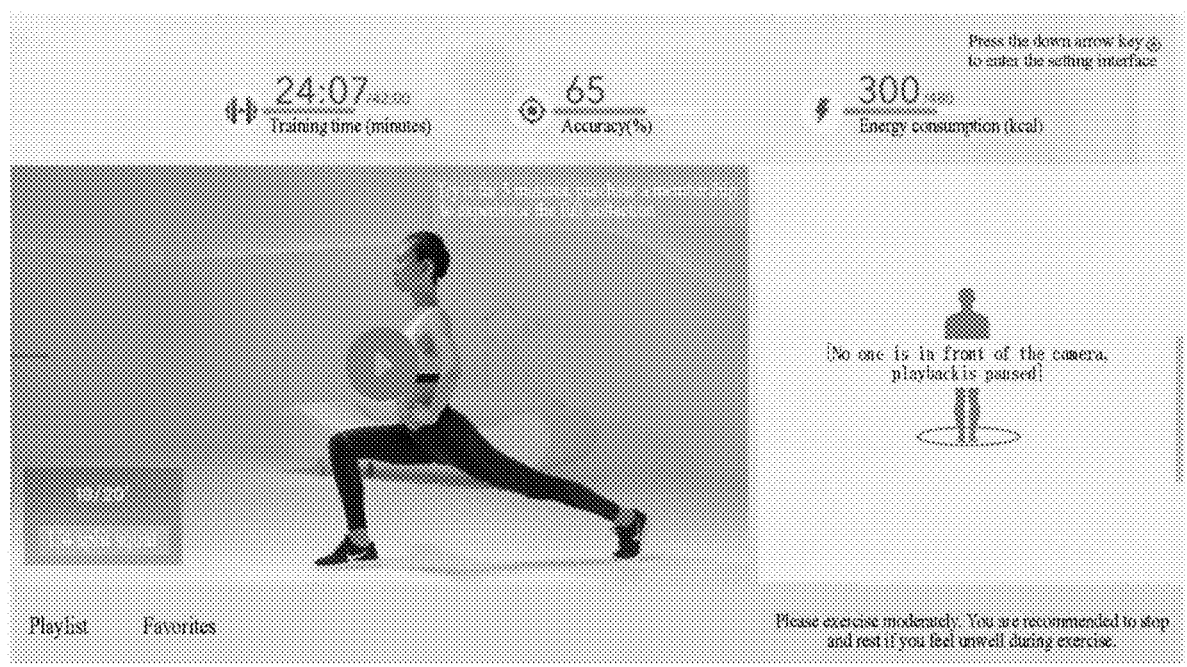
FIG. 31 is a schematic diagram illustrating an assessment interface for follow-up training according to some embodiments of the present disclosure.
Figure 32:
FIG. 32 is a schematic diagram illustrating an assessment interface for follow-up training according to some embodiments of the present disclosure.

In some embodiments, if the display apparatus cannot detect the user for 4 s, a triggered animation interface can be as shown in FIG. 30. If the display apparatus detects that the person is not in the frame for 4 s, that is, the person is not shown in the image of the camera, a triggered animation interface can be as shown in FIG. 31. If the display apparatus cannot detect the camera, a triggered animation interface can be as shown in FIG. 32.

Figure 33:
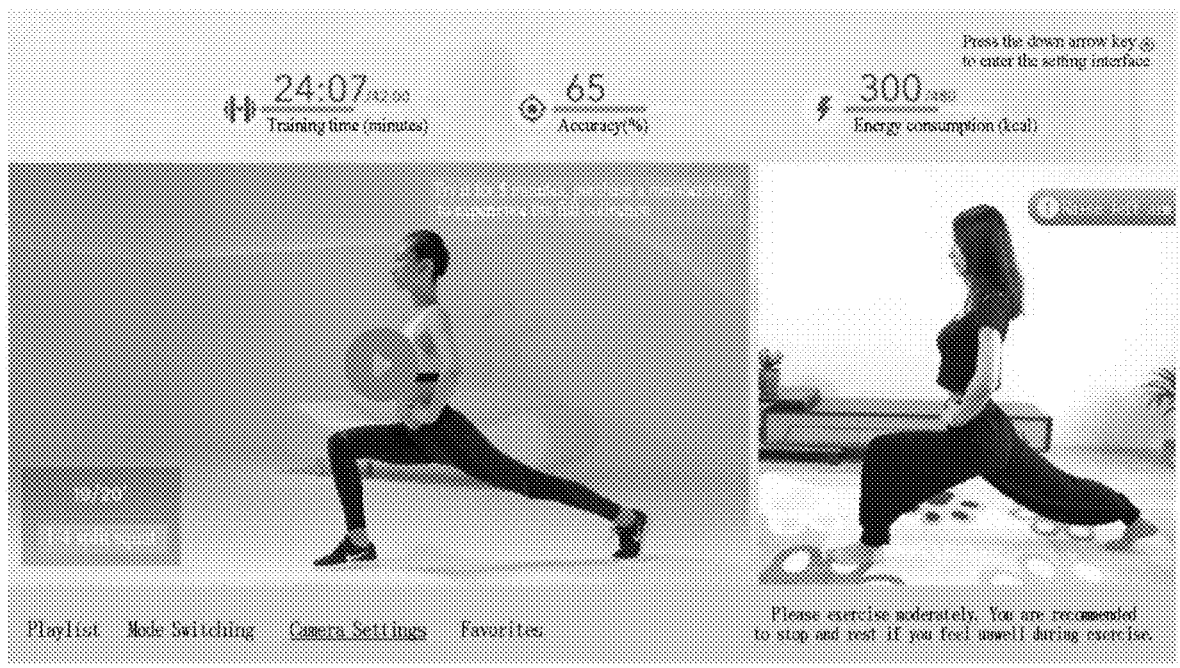
FIG. 33 is a schematic diagram illustrating settings for follow-up training according to some embodiments of the present disclosure.

In some embodiments, as shown in FIG. 33, the interface of the follow-up mode can be provided with a camera setting option, and the camera setting option is an operation control available for selection. When selected by the user, the camera setting option can be displayed in a suspended manner, and the following function prompt is displayed: the angle of the camera can be re-matched with the recognized person through this function. An interface of camera settings can be entered after the user presses the OK key, to set the camera. After setting the camera, the user clicks one of the back key or the OK key, and the display apparatus can return to the body recognition interface to perform body recognition again. After the recognition is successful, the display apparatus goes back to the interface of the follow-up mode. After the countdown, the user can continue the follow-up training from a same time. In the interface of camera settings, a function prompt and an option control can be displayed when the user clicks the back button. The function prompt can be: cancelling settings may not continue the follow-up training, and follow-up training is exited. The option control can include a cancel control which is selected by default. If the user continues to click the back button, the display apparatus goes back to a detail page of the course for follow-up training.

In some embodiments, in the follow-up mode, the user can perform a gesture operation on the display apparatus. In some embodiments, the follow-up mode is a healthy and beneficial smart fitness scenario with its own algorithm and course for follow-up training. In addition to this scenario, the gesture operation can also be applied to other scenarios, such as a dedicated fitness scenario where the user can customize a plan.

Figure 34:
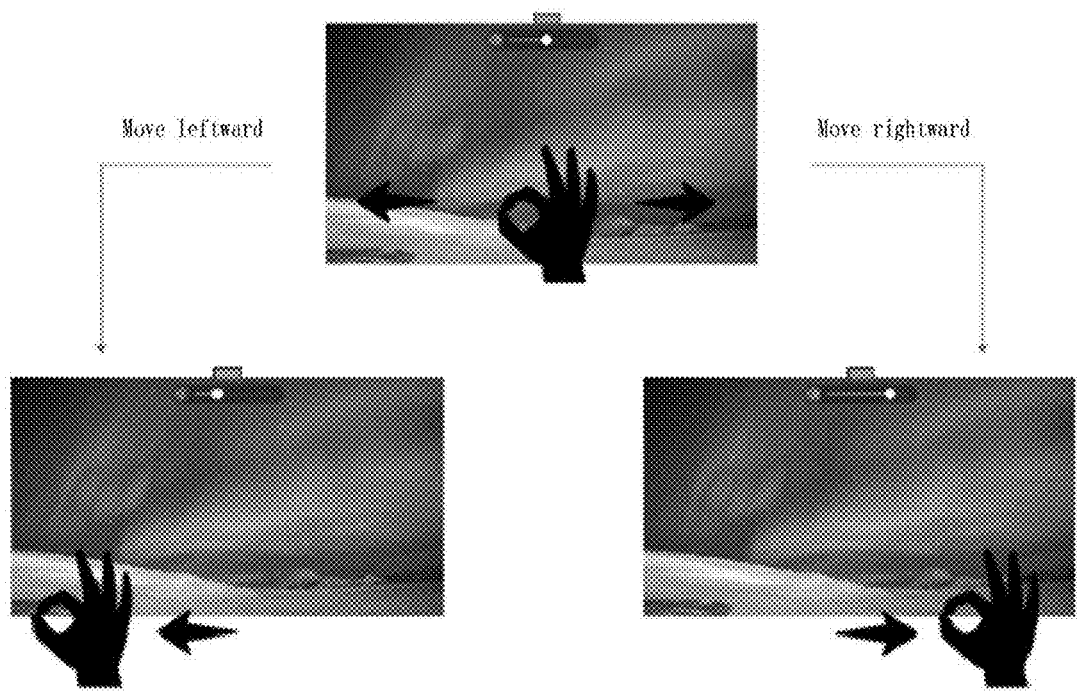
FIG. 34 is a schematic diagram illustrating a gesture guidance according to some embodiments of the present disclosure.
Figure 35:
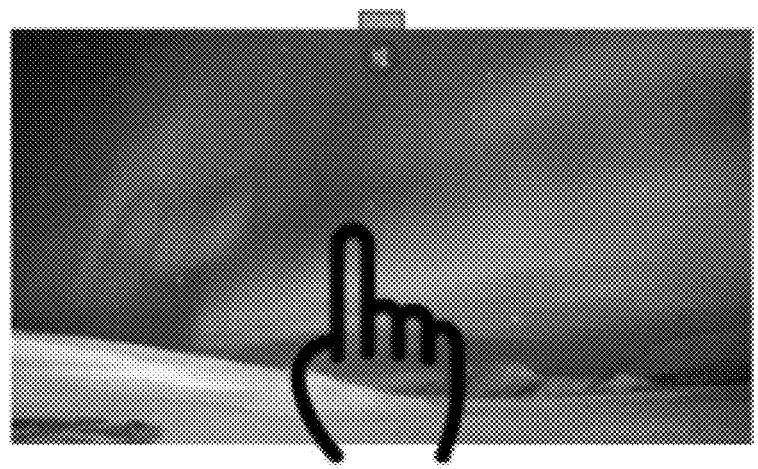
FIG. 35 is a schematic diagram illustrating a gesture guidance according to some embodiments of the present disclosure.

In some embodiments, the gesture operation includes volume control. As shown in FIG. 34, the user can start volume adjustment by making an OK gesture with one hand before the camera. The display apparatus can display left and right arrows to prompt the user to adjust the volume. The user moves the OK gesture to the left to decrease the volume, and moves the OK gesture to the right to increase the volume. In addition, referring to FIG. 35, the user can also achieve global mute control by posing the number "1" with one hand.

Figure 36:
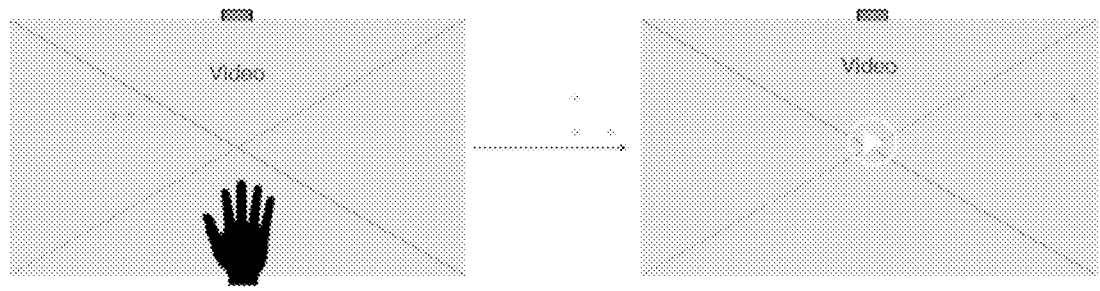
FIG. 36 is a schematic diagram illustrating a gesture guidance according to some embodiments of the present disclosure.
Figure 37:
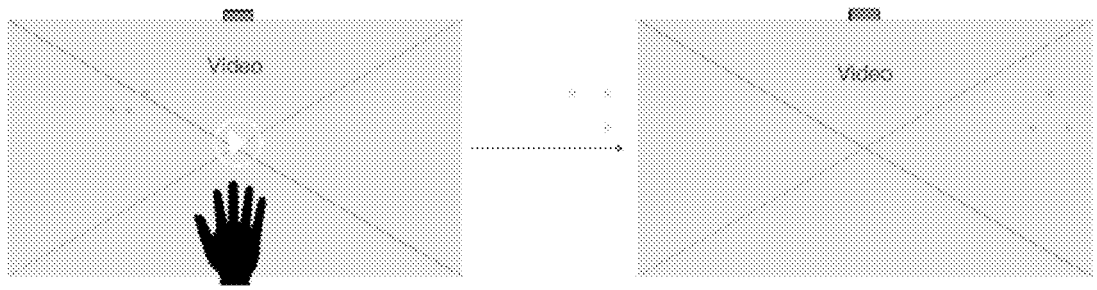
FIG. 37 is a schematic diagram illustrating a gesture guidance according to some embodiments of the present disclosure.

In some embodiments, the gesture operation includes pause. Referring to FIG. 36, current playback for follow-up training can be paused after the user makes a gesture with five fingers of one hand apart and keeps this gesture facing the screen for 2 seconds. After the playback is paused, referring to FIG. 37, playback of the current follow-up training can be continued after the user makes the gesture with five fingers of one hand apart and keeps this gesture facing the screen for 2 seconds.

In some embodiments, the display apparatus can display a stay page when the user quits after exercising for more than 2 minutes in the follow-up mode or after an episode of the course for follow-up training is completed.

Figure 38:
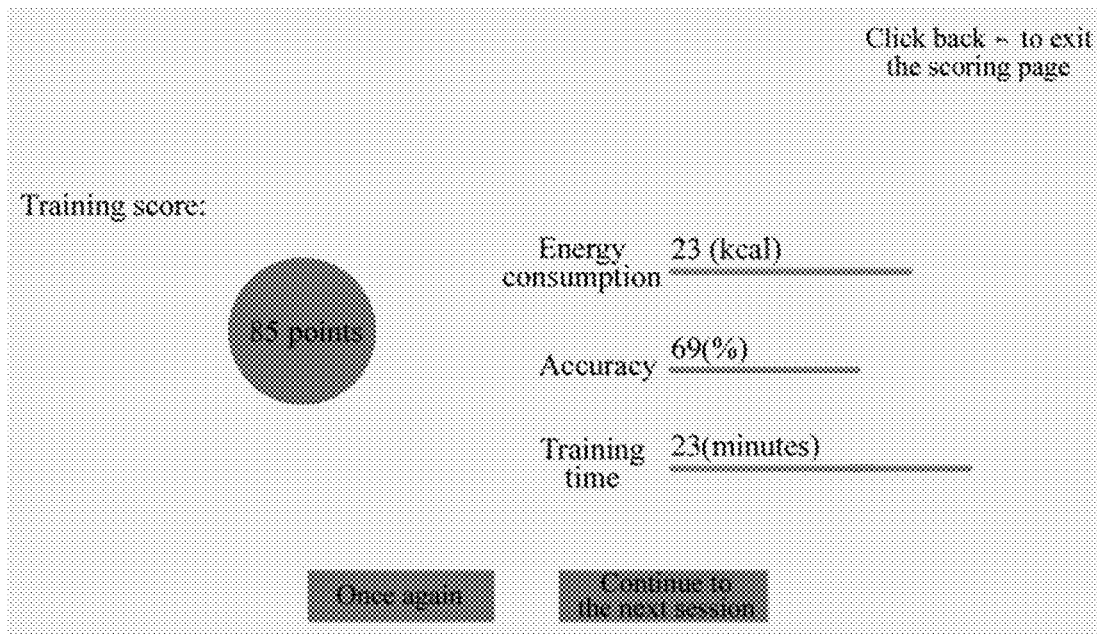
FIG. 38 is a schematic diagram illustrating a training score according to some embodiments of the present disclosure.

In some embodiments, the display device can generate and display a training report as shown in FIG. 38 when the user quits after exercising for more than 2 minutes in the follow-up mode or after an episode of the course for follow-up training is completed. The user can select to exercise once more or continue a next session of training or exit the training.

Figure 39:
FIG. 39 is a schematic diagram illustrating a transition of follow-up training according to some embodiments of the present disclosure.

In some embodiments, when the user performs an action transition, for example, switch to a next session of training, a prompt for action explanations can be added. Referring to FIG. 39, countdown can be 3 seconds, and the media-resource control prompts that countdown to the follow-up training remain unchanged.

In some embodiments, when the user clicks the control of "Exercising-While-Watching Mode" or enters the exercising-while-watching mode according to the default mode selection processing, the display apparatus plays a fitness video and a movie in the exercising-while-watching mode.

Figure 40:
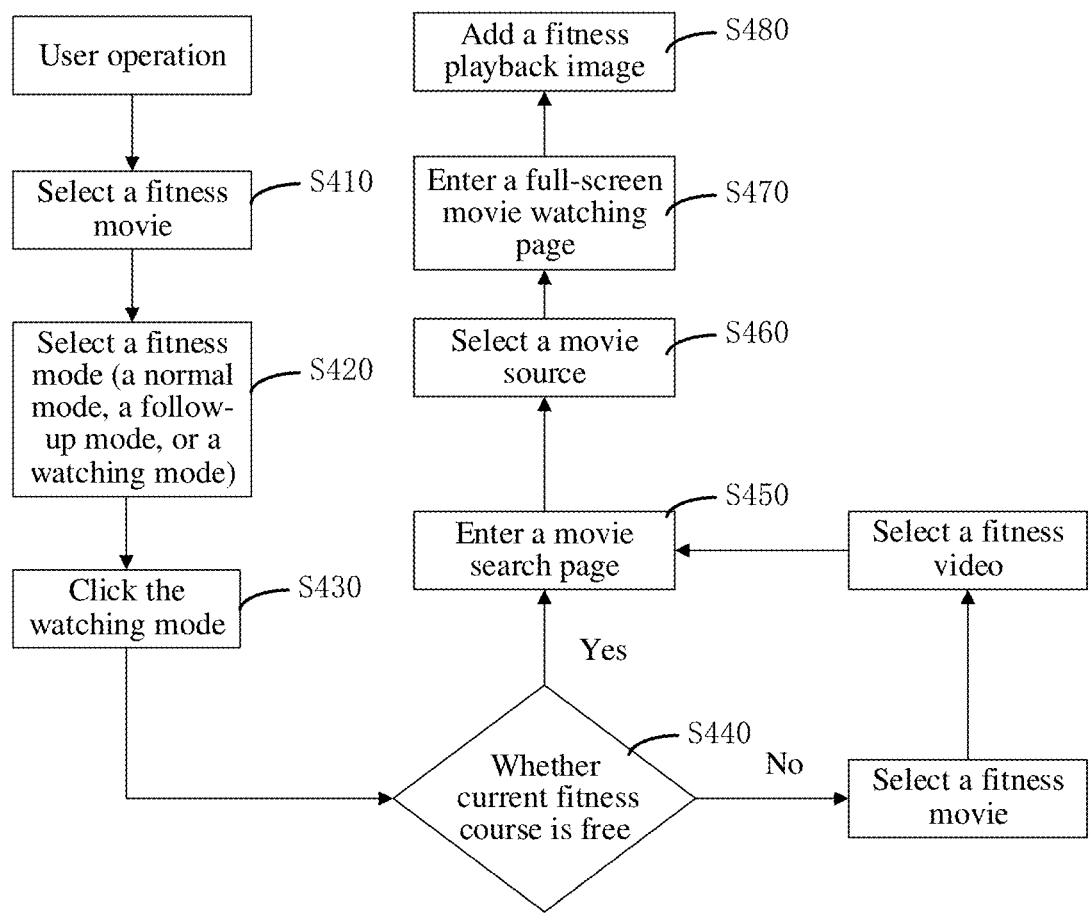
FIG. 40 is a schematic flowchart illustrating an exercising-while-watching mode according to some embodiments of the present disclosure.

In some embodiments, for a flow where the user watches the movie and the fitness video at the same time in the exercising-while-watching mode, reference can be made to FIG. 40. As shown in FIG. 40, the flow includes steps S410 to S480.

Steps S410 and S420: After a fitness movie is selected by the user, that is, a fitness video, a fitness mode is selected. The fitness mode includes a normal mode, a follow-up training mode, and a watching movies mode.

Steps S430 to S450: After a watching mode is selected by the user, that is, an exercising-while-watching mode, the display apparatus can determine whether the current fitness video is free; in response to the fitness video being not free, a VIP purchase page will be popped up, and a movie search page can be entered after the course is purchased by the user; and in response to the fitness video being free, the movie search page can be entered directly.

In some embodiments, after a fitness movie, that is, a fitness video is selected by the user, the watching mode, that is, the exercising-while-watching mode is selected to enter the movie search page.

In some embodiments, when the movie search page is displayed, data about a medium resource for training can be obtained by sending a request for obtaining the medium resource for training. In this case, when the user selects a movie to watch, the data about the medium resource for training can be downloaded, which improves a loading speed of the data for the medium resource for training. A video of the medium resource for training can be quickly displayed after an interface for exercising-while-watching has been entered.

In some embodiments, pages displaying a window of the primary video and a window of the secondary video can also be entered in other ways.

In some embodiments, some fitness videos that need to be purchased provide trial segments. On a VIP purchase page of the video, if the user does not select to purchase, after a return command of the user is received, display of a purchase interface is canceled and a movie search page is displayed at the same time. This allows the user to decide whether to purchase the course after watching the trial segment in the exercising-while-watching mode. In some embodiments, it is not necessary for the VIP purchase interface to pop up prior to the mode selection interface. When the medium resource for training (the fitness video) provides a trial segment, the user can search and display the video media resource. After the trial segment provided by fitness video ends, a floating layer arranged on an upper layer above a current interface is provided, and a membership purchase interface for the fitness video is displayed in the floating layer. The user can select to purchase or return to the exercising-while-watching interface.

In some embodiments, during purchasing or returning to the exercising-while-watching interface, if the user selects to purchase the membership when the trial segment provided by the fitness video ends, the fitness video continues to be played in the fitness video window, and the movie continues to be played in a movie window.

In some embodiments, during purchasing or returning to the exercising-while-watching interface, if the user does not purchase the membership when the trial segment provided by the fitness video ends, a floating layer for prompting continues to be played in the fitness video window, and the movie continues to be played in the movie window. In this case, a playback thread of the fitness video can be paused.

In some embodiments, during purchasing or returning to the exercising-while-watching interface, if the user does not purchase the membership when the trial segment provided by the fitness video ends, the fitness video window on the movie window is canceled and the movie continues to be played in the movie window. In this case, the playback thread of the fitness video can be canceled.

In some embodiments, during a watching process of the user, after watching of the fitness video is finished, a purchase prompt interface is popped up. The purchase prompt interface can include a purchase entry and an exit entry/exit prompt. The display apparatus switches to a purchase interface if the user selects the purchase entry, and after the purchase, the fitness video continues to be played in the playback interface where the prompt interface is popped up. If the user performs a back operation, the display apparatus switches to a fitness video selection interface. If the user selects a fitness video, the fitness video continues to be played in the playback interface where the prompt interface is popped up. If the display apparatus switches to a channel page or another channel, a process of the playback interface before popping up the prompt interface can be canceled, and it is considered that the user is not intended to perform the follow-up training.

In some embodiments, after the fitness video is played, if there is a subsequent video in the video list, content of the subsequent video continues to be played in the fitness video window. If there is no subsequent video or there is no video list, the display apparatus goes to the fitness video selection interface. If the user selects a fitness video, the fitness video continues to be played in the previous playback interface. If the user selects to return to the channel page or switch to another channel, a process of the previous playback interface will be canceled.

Figure 55:
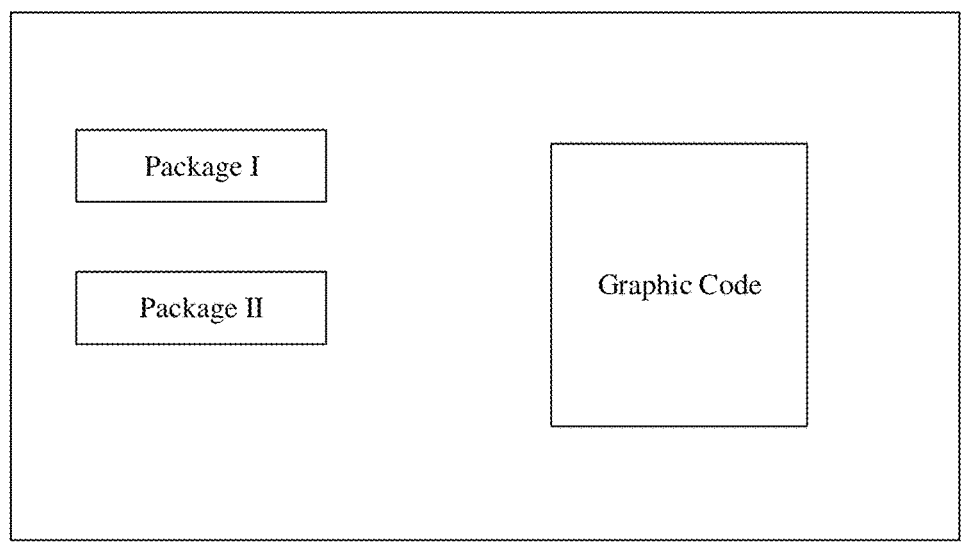
FIG. 55 is a schematic diagram illustrating an interface of a display apparatus according to some embodiments of the present disclosure.

In some embodiments, after trail viewing in the video window (a primary window) is finished, a purchase interface (as shown in FIG. 55) for purchasing video content in the primary window can be displayed. Playback is continued if the user purchases permission. If the user does not purchase the permission, a prompt floating layer is displayed in the primary window, or the primary window is canceled. The fitness video window (a secondary window) is displayed in full screen.

In some embodiments, a video monitoring window can be set as the primary window, and the movie window can be set as the secondary window.

In some embodiments, a layer where the secondary window is located is above a layer where the primary window is located.

In some embodiments, the secondary window can be set near an edge of a display screen.

In some embodiments, the secondary window can be set at an upper left corner of the display screen. For content of the primary window, usually the upper left corner is selected to display information that is less relevant to the video content, such as an annotation or a prompt. Therefore, placing the secondary window in the upper left corner of the display screen can prevent, as much as possible, the secondary window from blocking effective image information of the video in the primary window.

In some embodiments, referring to FIG. 41, the video search page in the exercising-while-watching mode can have a search area and a display area. The search area has a search keyboard and a search QR code. The user can input a desired movie through the search keyboard, or can scan the QR code by using a terminal device to search for the movie on the terminal device. The terminal device can return the movie selected by the user to the display device.

The display area has historical records and hot searches. In some embodiments, the historical record can display a movie that is historically viewed or historically searched by the user in the exercising-while-watching mode. In some embodiments, the historical record can also display a movie that is historically viewed or historically searched by the user in any mode.

The hot search can be provided with posters of popular movies, and the poster can be specifically configured by operation of the display apparatus. The user can select one movie to watch. The media resource displayed on the video search page can be a video media resource that does not need to be transferred to a third-party application for play. A media resource or an audio media resource that needs to be transferred to a third-party application for play can be filtered out and not for play.

Figure 42:
FIG. 42 is a schematic diagram illustrating a movie search page according to some embodiments of the present disclosure.

In some embodiments, the video search page can also be provided with a prompt message. Referring to FIG. 42, the prompt message can be: "You could select a video and exercise while watching the movie".

In some embodiments, after the movie search interface is entered, the processor determines whether a selection of playing the fitness video has been carried out. If yes, a prompt may be displayed in a floating layer above the movie search interface to prompt the user to select a movie to exercise while watching. If no, there is no prompt.

In some embodiments, the processor can determine whether exercising while watching is selected by determining whether loading of the exercising-while-watching interface has been initiated in background.

In some embodiments, after the user selects the watching mode, the processor can set a state identifier. After the movie search interface is displayed, the processor can select whether to display a prompt by determining a television switching identifier.

Steps S460 and S470: Select a movie source, and enter a full-screen movie watching page.

In some embodiments, after the user selects a video source on the movie search page, the display apparatus can display a full-screen movie watching page in the primary window, and add a fitness playback window on the full-screen movie watching page, to form a picture-in-picture playback mode.

Step S480: Add a fitness playback image.

In some embodiments, the display apparatus can provide a movie playback window and a fitness video window on the display interface, and play a corresponding video in the corresponding window according to mapping between different windows and different code streams. For example, video data corresponding to an ID of a selected video media resource is played in the movie playback window, to generate a full-screen movie watching page; and video data corresponding to an ID of a selected fitness media resource is played in the fitness video window, to generate a fitness playback image.

In some embodiments, the movie is played in a full-screen movie playback window, and the fitness video window is arranged above the movie playback window.

Figure 43:
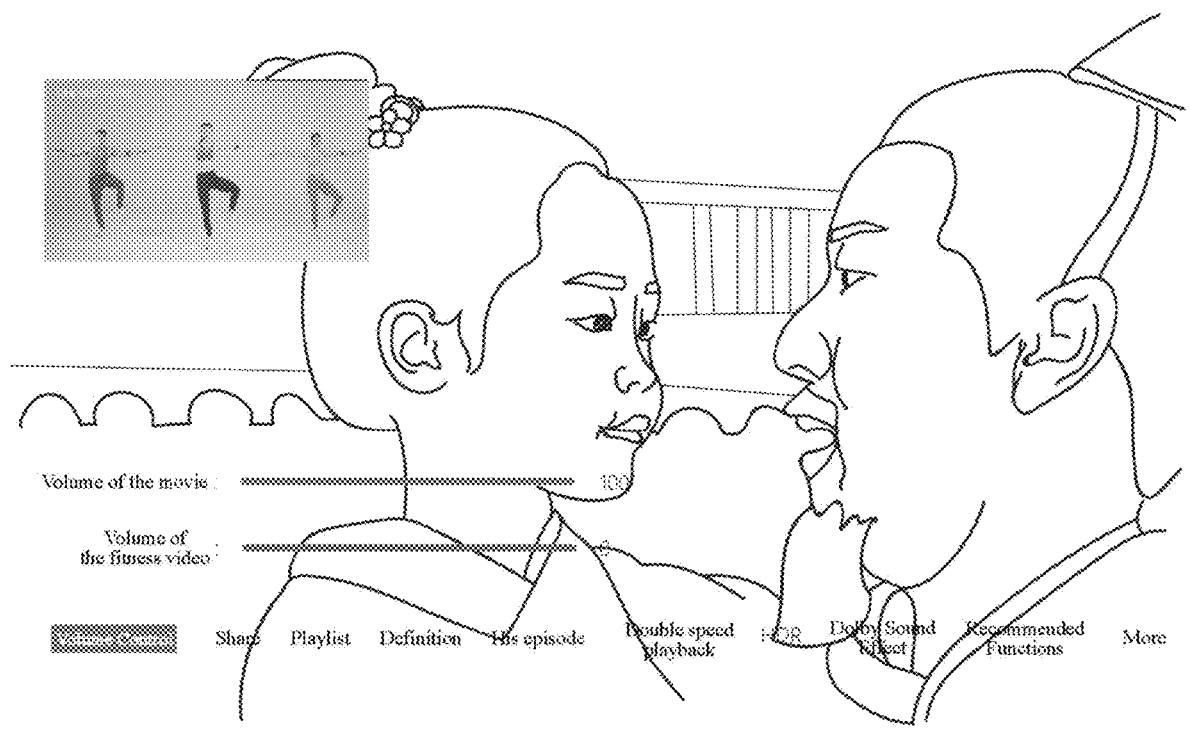
FIG. 43 is a schematic diagram illustrating volume adjustment according to some embodiments of the present disclosure.

In some embodiments, referring to FIG. 43, in the picture-in-picture mode, the display interface of the display apparatus includes a primary window and a secondary window. In some embodiments, the primary window plays a movie selected by the user in full screen, and the secondary window plays a fitness video selected by the user. The secondary window is displayed above the primary window, for example, the secondary window can be displayed at top left of the primary window.

In some embodiments, the user can further perform switch between the primary window and the secondary window. For example, the fitness video is switched to be displayed in the primary window, and the movie is switched to be displayed in the secondary window.

In some embodiments, the user can also adjust a size and position of the secondary window. For example, referring to FIG. 47, the secondary window is adjusted to be at upper right of the primary window.

In some embodiments, the video played in the primary window can be referred to as a primary video, and the video played in the secondary window can be referred to as a secondary video.

A command for playing the primary video and the secondary video at the same time is generated after the user selects a movie source at the movie search page. In response to the command for playing the primary video and the secondary video at the same time, the display apparatus generates a request for playing the corresponding two videos to obtain resources corresponding to the two videos from the server, and loads a playback page to start the picture-in-picture playback mode, so as to play the primary video and secondary video simultaneously.

In some embodiments, in the picture-in-picture mode, the user needs to watch the primary video and the secondary video simultaneously. To prevent the user from being uncomfortable due to mixed sound of the two videos, the display apparatus can play the primary video and the secondary video according to volume set by the user last time, or play the primary video and the secondary video according to default gain volume, so as to implement automatic gain adjustment for a primary audio stream and a secondary audio stream. Certainly, the user can also perform volume control for the display apparatus, so as to carry out manual gain adjustment for the primary audio stream and the secondary audio stream that are not yet mixed.

In some embodiments, the primary video and the secondary video can have respective advertisements, and the two videos can play the advertisements respectively without affecting each other. After playback of the advertisement is finished, the corresponding primary video or secondary video is played.

In some embodiments, the primary video and the secondary video may have advertisements in a media resource playing process. In some embodiments, playback processing of different playback windows can be performed independently, and the advertisements are played independently according to pre-made advertisements or labels.

In some embodiments, the display apparatus can also perform automatic gain adjustment on volumes of the advertisements. For example, advertising timing of the two videos may be different, and the display apparatus can be configured such: if the advertisement of one of the videos has finished playing and the advertisement of the other video has not finished playing, turn up the volume for the video whose advertisement has finished playing; and after the advertisement of the other video has finished playing, restore the volume to a default value or a value previously set by the user. In some embodiments, both the primary window and the secondary window need to confirm their advertisement loading/playback state respectively before the advertisement is played. When one of the windows is loading/playing an advertisement, the other window does not load/play an advertisement.

In some embodiments, when both the primary window and the secondary window have advertisements that need to be played, one window is selected to play the advertisement and the other does not play the advertisement. This can be replaced with a video loading interface or a pause interface, and rules for selecting can be set as required.

Figure 56A:
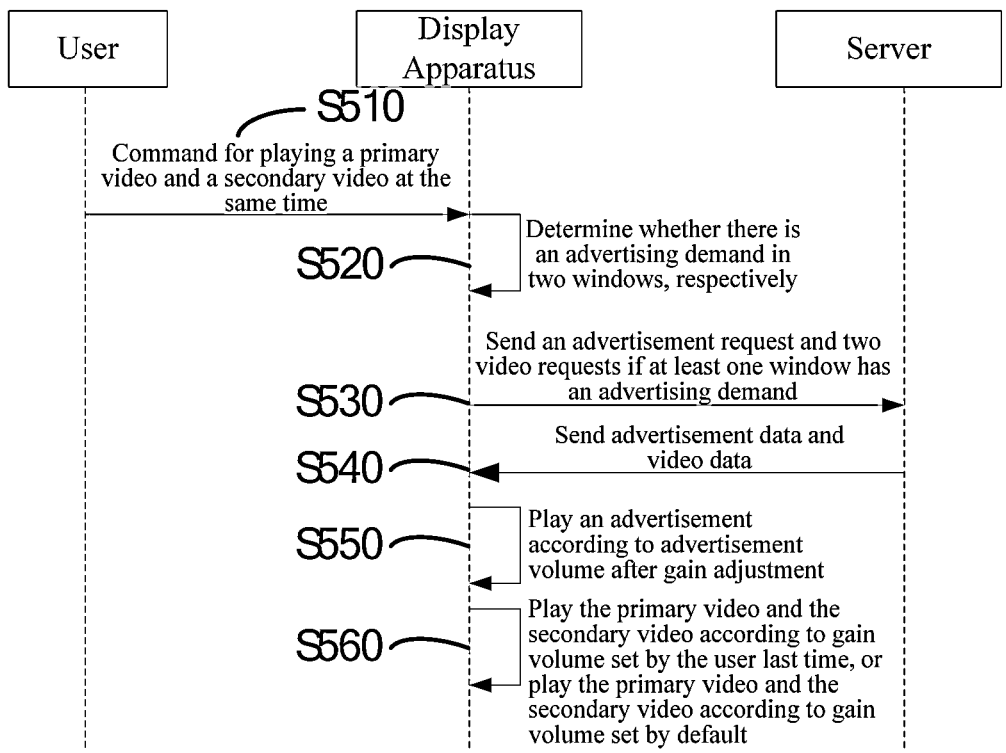
FIG. 56A is an interactive schematic diagram illustrating volume gain adjustment when an advertisement is played according to some embodiments of the present disclosure.

Referring to FIG. 56A, which is an interactive schematic diagram illustrating volume gain adjustment according to some embodiments. In some embodiments, the advertisement can be a pre-movie advertisement, an in-movie advertisement, or a post-movie advertisement. A volume gain adjustment process includes steps S510 to S560.

Step S510: After a movie source on the movie search page is selected by a user, the click operation of the movie source is taken by the display apparatus as a command for playing the primary video and the secondary video at the same time.

Steps S520 and S530: The server detects whether there is an advertising demand in two windows respectively, and sends an advertisement request and two video requests if at least one window has an advertising demand.

Step S540: The server sends advertisement data and video data.

Step S550: The display apparatus plays an advertisement according to advertisement volume after gain adjustment.

Step S560: The display apparatus plays the primary video and the secondary video according to gain volume set by the user last time, or plays the primary video and the secondary video according to gain volume set by default.

In some embodiments, in response to receiving the command for playing the primary video and the secondary video at the same time, the display apparatus respectively generates playback requests corresponding to the two videos, and sends the same to the server to obtain data of the primary video and data of the secondary video.

In some embodiments, the display apparatus can determine media-resource identifiers corresponding to the primary video and the secondary video respectively based on the fitness video and the movie previously selected by the user, and then generate a video playback request based on the media-resource identifier. In some embodiments, when the movie is played in the primary window and the fitness video is played in the secondary window, the display apparatus can confirm the identifier of the fitness video based on the playback instruction selected by the user on the interface of the list of fitness videos or on a detail interface of the fitness video. In a movie selection interface, a movie identifier corresponding to the movie is determined based on a movie control selected by the user. Meanwhile, because the movie is played in the primary window and the fitness video is played in the secondary window, a playback request for playing the primary video is generated based on the movie identifier, and a playback request for playing the secondary video is generated based on a fitness identifier, which are sent to the server respectively.

In some embodiments, the playback request for playing the secondary video can be directly generated and sent to the server after the identifier of the fitness video is confirmed based on the playback instruction selected by the user on the interface of the list of fitness videos or the detail interface of the fitness video, without waiting for generation of the playback request of the primary video. In this way, data of the fitness video can be requested and downloaded in advance, thereby accelerating loading of the fitness video.

In some embodiments, the command for playing the primary video and the secondary video at the same time can be an instruction for selecting a video control or an instruction for playing a movie program in the watching mode.

In some embodiments, the command for playing the primary video and the secondary video at the same time can be an operation instruction for requesting to play the movie and the fitness video at the same time.

In some embodiments, after the command for playing the primary video and the secondary video at the same time is received, it is respectively detected whether there is an advertising demand in the windows that play the two videos. If at least one window has an advertising demand, an advertisement corresponding to the advertising demand can be referred to as a pre-movie advertisement, and the advertisement request is sent to the server while a playback request corresponding to the window is sent. In this case, there is a mapping between advertisement request and the video window. In some embodiments, an advertisement request corresponding to the primary window is generated when an advertising demand parameter is set in parameters of the movie control corresponding to the primary window or the primary video, so as to play an advertisement in the primary window after advertisement data is obtained. The same applies to the secondary window as well.

In some embodiments, there is a mapping between the video playback request and the playback window. The display apparatus first sends the playback request to the server, and the server feeds back a playback parameter for the corresponding playback request. If there is an advertising demand parameter in the playback parameter, the processor generates an advertisement request for the corresponding window, so as to play an advertisement in the window after advertisement data is obtained.

In some embodiments, after the user pauses the play of the primary video and the secondary video, restarting the play of the primary video and the secondary video can also generate a command for playing the primary video and the secondary video. In response to receiving the command for playing the primary video and the secondary video at the same time, the display apparatus respectively detects whether there are advertising demand parameters in video streams of the two windows or in window settings. If there is an advertising demand parameter, an advertisement request is generated for the corresponding window, so as to play an advertisement in the window after advertisement data is obtained. The advertisement corresponding to the advertising demand parameter can be referred to as an in-movie advertisement.

In some embodiments, the display apparatus can also monitor, in a real-time manner, whether there are advertising demand parameters in the video streams of the windows of the primary video and the secondary video during play of the primary video and the secondary video. If there is an advertising demand parameter, an advertisement request is generated for the corresponding window, so as to play an advertisement in the window after advertisement data is obtained. The advertisement corresponding to the advertising demand can be referred to as an in-movie advertisement.

In some embodiments, the display device can also detect whether there are advertising demand parameters in the video streams of the windows or in the window settings of the primary video and the secondary video when the primary video and the secondary video are finished. If there is an advertising demand parameter, an advertisement request is generated for the corresponding window, so as to play an advertisement in the window after advertisement data is obtained. The advertisement corresponding to the advertising demand can be referred to as a post-movie advertisement.

In some embodiments, media-resource information of the primary video and the secondary video contains an advertising label for indicating that an advertisement needs to be played. The media-resource information can be included in page data sent from the server, and the page data is data of a page displaying the fitness video or the video source. The display apparatus can extract the advertising label from the media-resource information. An advertisement request is generated if it is determined based on the advertising label that the current video has an advertising demand. In this case, an advertisement corresponding to the advertising demand is a pre-movie advertisement. After generating the advertisement request, the display apparatus sends the advertisement request and the playback requests of the two videos to the server, so as to request the server for advertisement data, media-resource data of the primary video, and media-resource data of the secondary video.

In some embodiments, the media-resource data of the primary video and the secondary video contains an advertising label for indicating that an advertisement needs to be played. The media-resource data includes a video stream of the fitness video or the movie source sent from the server. The display apparatus can extract the advertising label from the media-resource data. An advertisement request is generated if it is determined based on the advertising label that the current video has an advertising demand. In this case, an advertisement corresponding to the advertising demand is an in-movie advertisement or a post-movie advertisement.

In some embodiments, the video request contains a media-resource ID and an account ID (or an ID of the display apparatus) respectively. Therefore, after the advertisement request is sent, the server can send advertisement data based on a parameter for indicating that exercising-while-watching is performed at a terminal and the account ID (or the ID of the display apparatus) of the advertisement request (for example, delivered advertisements have same duration, or similar contents, or similar styles, or similar volume), thereby improving user experience. The parameter for indicating that exercising-while-watching is performed at a terminal can be included in the advertisement request, or can be generated and stored in an exercising-while-watching interface previously established by the server.

In some embodiments, after receiving the advertisement request, the server determines whether there is an advertisement request that is sent from a same account within a preset time period. If yes, it means that the user is watching a video in the watching mode. In this case, similar advertisement data is selected based on previously confirmed advertisement data to serve as feedback to data of another advertisement request. In some embodiments, when there is no online advertisement data, advertisement data is determined according to a preset advertisement rule.

In some embodiments, an advertisement request for causing the server to send an advertisement carries an advertising label and an account ID (or the ID of the display apparatus) respectively. After the advertisement request is sent, according to the parameter for indicating that exercising-while-watching is performed at the terminal and the account ID of the advertisement request (or the ID of the display apparatus), the server can determine an advertisement of the video playback window based on the advertisement request corresponding to the video playback window, and determine an advertisement of a playback window of the fitness media resource based on at least one of advertisement duration, advertisement volume, and the like that are corresponding to the video window. Data of the two advertisements is sent to the display apparatus for play on the two video windows of the display apparatus.

In some embodiments, after the exercising-while-watching interface, that is, a picture-in-picture interface is displayed, the display apparatus only plays an advertisement in one window.

In some embodiments, before displaying advertisement data on one window, the display determines whether advertisement data is played on the other window. If yes, the advertisement data will not be played on the former window, or otherwise, the advertisement data is played on the former window.

In some embodiments, the display apparatus merely sends an advertisement demand corresponding to video playback window. The playback window of the fitness video does not send an advertisement request to the server after detecting an advertisement demand.

In some embodiments, when merely advertisement in one window is played, the display apparatus controls the display to display a floating layer after receiving advertisement data that is fed back from the server based on the advertisement request. The floating layer is placed above the video playback window and the playback window of the fitness video. The advertisement is played in the floating layer. After the advertisement is finished, the floating layer is removed, and a notification is broadcasted such that the video playback window and the playback window of the fitness video play corresponding video streams respectively.

In some embodiments, the advertisement data is played in a window corresponding to an original advertisement request, and the advertisement data is not played in the other window.

In some embodiments, when the display apparatus plays advertisements in the primary window and the secondary window at the same time, to improve audio-visual effects of the two advertisements, gain control can be performed to adjust volume of the two advertisements. For example, the volume of the secondary window is adjusted to be 50% of original volume, or the volume of the secondary window is adjusted to be 50% of the volume of the primary window. Certainly, the volume of the secondary window can also be adjusted to another value, provided that the volume is different from that of the primary window, so as not to make the user confuse about the two advertisements. In some embodiments, the display apparatus can detect playback progresses of the two video windows in real-time. When the play of the advertisement in one of the windows ends, the play of the advertisement in the other playback window is stopped. In this way, starting synchronization in play of the movie video and the fitness video in the two windows is improved.

In some embodiments, if the display apparatus detects an advertisement playing mark in one window, that is, the advertisement on the window has not finished playing, and no advertisement playing marker is detected in the other window, that is, the advertisement on said window has finished playing or no advertisement is played on said window, during the play of the fitness video or the movie corresponding to said window, the volume of the playback window on which the advertisement is played is automatically lowered and the playback volume of the other window is raised. In some embodiments, the advertisement playing marker can be an advertisement countdown marker. In some embodiments, after the two advertisements in the primary window and the secondary window are finished playing, the display apparatus starts to play the fitness video and the movie, and performs gain adjustment for the volumes of the two videos. The movie video is played in a full-screen movie playback window, that is, is played in the primary window. The fitness video window, that is, the secondary window, is placed above the movie playback window.

In some embodiments, the playback windows start playing corresponding video contents after the advertisement data is finished playing.

In some embodiments, when the primary window and the secondary window play advertisements at the same time, to improve effects of the advertisements, the display apparatus can be configured to play two content-related advertisements at the same time.

In some embodiments, a server of an advertising provider can provide two content-related advertisements to the server of the display apparatus. For example, one of the advertisements is a promotional video of an advertising object, and the other advertisement is a plurality of promotional images of the advertising object, where the promotional image can include local details, an overall structure, price information, and promotions of the advertising object. The advertising provider may be a provider of the display apparatus or may be a third-party provider.

In some embodiments, an operator of the server of the display apparatus can set an association relationship for the two content-related advertisements in advance, so that one of the advertisements is referred to as an associated advertisement of the other advertisement. This helps the display apparatus to obtain the two content-related advertisements when obtaining advertisements. For example, an association identifier is set for play addresses of the two content-related advertisements, or a mapping table including the play addresses of the two advertisements is provided, so that after the play address of one of the advertisements is obtained, the play address of the other advertisement associated with this advertisement can be obtained according to the association identifier or by querying the mapping table.

In some embodiments, the operator of the server of the display apparatus can preset a mapping rule. The mapping rule can include an algorithm that implements the following: taking one advertisement as a to-be-matched advertisement; computing an advertisement whose content is related to content of the to-be-matched advertisement; and taking an advertisement whose relevance with the to-be-matched advertisement is highest as an associated advertisement of the to-be-matched advertisement. The associated advertisement can change as advertising resources are continuously updated. The algorithm of the mapping rule can be specifically set and adjusted according to an advertisement demand. In some embodiments, the algorithm can include: searching for play addresses of advertisements containing a same advertisement object. If there are a plurality of play addresses, advertising duration corresponding to each play address can be analyzed. The relevance is configured to be relatively higher when the advertising duration is close to that of the to-be-matched advertisement, and the relevance is configured to be relatively lower when the advertising duration is quite different from that of the to-be-matched advertisement. When the display apparatus requests to obtain two advertisements but only is provided with information about one advertisement, the server of the display apparatus can compute the associated advertisement according to the mapping rule.

Figure 56B:
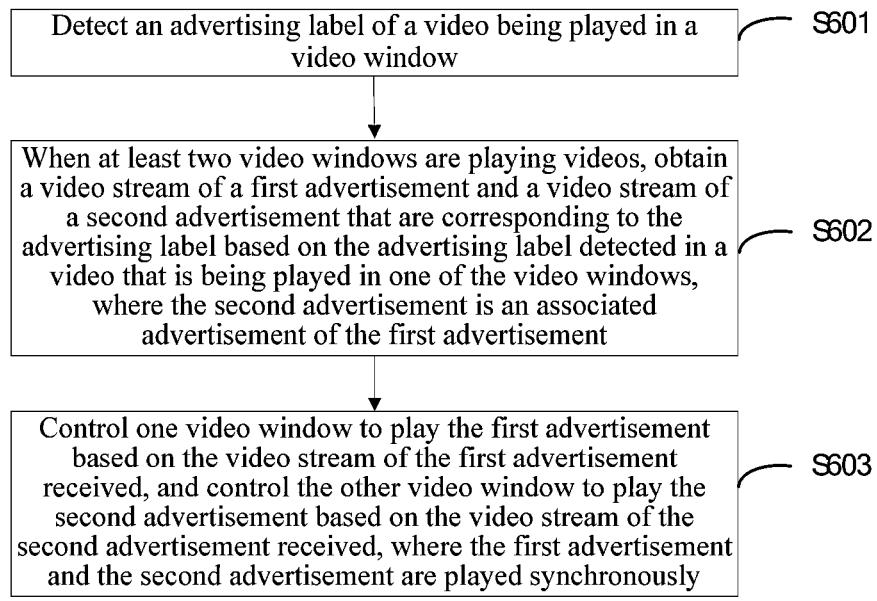
FIG. 56B is a schematic flowchart illustrating a method for playing two content-related advertisements according to some embodiments of the present disclosure.

In some embodiments, for the method for a video player of the display apparatus to play two content-related advertisements, reference can be made to FIG. 56B. The method can include steps S601 to S603.

Step S601: Detect an advertising label of a video being played in a video window.

In some embodiments, when the video player of the display apparatus plays the primary video and the secondary video respectively in two windows at the same time, playing content of the primary window can be controlled by a process of the primary window, and playing content of the secondary window can be controlled by a process of the secondary window. The process of the primary window and the process of the secondary window can be started by a main process of the video player after the video player receives the command for playing the primary video and the secondary video at the same time. The main process of the video player can obtain a video stream of the primary video from a video source of the primary video, obtain a video stream of the secondary video from a video source of the secondary video, distribute the video stream of the primary video to the process of the primary window, and distribute the video stream of the secondary video to the process of the primary window.

In some embodiments, the main process of the video player can also be the process of the primary window, and display contents of the two windows are controlled by the process of the primary window.

In some embodiments, the process of the primary window and the process of the secondary window may not be generated, and the display contents of the two windows are directly controlled by the video player.

In some embodiments, the process of the primary window can be configured to directly obtain the video stream of the primary video from the video source of the primary video, and the process of the secondary window can be configured to directly obtain the video stream of the secondary video from the video source of the secondary video.

In some embodiments, the process of the primary window can decode the video stream of the primary video, obtain video frames of the primary video based on decoded data, and control the primary window to play the video frames of the primary video. The process of the secondary window can decode the video stream of the secondary video, obtain video frames of the secondary video based on decoded data, and control the secondary window to play the video frames of the secondary video.

In some embodiments, the video stream of the primary video contains label information, and the label information can include an advertising label and play timing corresponding to the advertising label. For example, the play timing is from 30 minutes:00 seconds to 30 minutes:15 seconds. When the process of the primary window decodes the video stream of the primary video, it can be determined whether there is an advertising label in the video stream of the primary video.

In some embodiments, the display apparatus plays videos in two video windows, for example, playing the primary video in the primary window and playing the secondary video in the secondary window. Whether the primary video has an advertising label can be detected only, or whether the secondary video has an advertising label can be detected only, or whether the primary video and the secondary video have advertising labels respectively can be detected. If advertising labels are detected in both the primary video and the secondary video, only the advertising label of the primary video can be processed while the advertising label of the secondary video is not processed.

Step S602: When at least two video windows are playing videos, based on the advertising label detected in a video that is being played in one of the video windows, obtain a video stream of a first advertisement and a video stream of a second advertisement that are corresponding to the advertising label, where the second advertisement is an associated advertisement of the first advertisement.

In some embodiments, when two video windows are playing videos, if only the video being played in one of the windows, such as the primary window or the secondary window, has the advertising label, two streams of channel advertising data can be obtained based on the advertising label.

In some embodiments, when videos are being played in two video windows, if the video being played in the primary window has the advertising label and the video being played in the secondary window does not have the advertising label, two streams of advertisement data can be obtained based on the advertising label. On the contrary, if the video being played in the secondary window has the advertising label and the video being played in the primary window does not have the advertising label, the advertising label is not processed and two streams of advertising data is not obtained.

In some embodiments, when two video windows are playing videos, if the video being played in the primary window has the advertising label and the video being played in the secondary window also has the advertising label, two streams of advertising data can be obtained based on the advertising label corresponding to the primary window, and the advertising label corresponding to the secondary window is not processed.

In some embodiments, when the advertising label is decoded by the process of the primary window, an advertisement request of the primary window can be sent to a main process of the video player. If a decoding speed of the video stream of the primary video is greater than a playback speed of the video frames, the video stream of the advertisement can be pre-downloaded before the play timing of the advertising label. The advertisement request can include the media-resource identifier of the primary video.

In some embodiments, the advertisement request can also include an advertisement-type identifier and other parameters that are used for the server to determine the first advertisement.

In some embodiments, at different time periods, the advertisement provider can provide the first advertisement and/or the second advertisement with different contents. The process of the primary window can send an advertisement request of the primary window to the main process of the video player at a first preset time prior to the play timing corresponding to the advertising label, so as to obtain a video stream of a latest advertisement. The first preset time can be set according to duration of the play time corresponding to the advertising label. For example, if the duration of the play time corresponding to the advertising label is 15 seconds, the first preset time is set to be 11 seconds. In other words, the advertisement request of the primary window is sent to the main process of the video player 11 seconds before the advertisement is played. If the duration of the play time corresponding to the advertising label is 10 seconds, the first preset time is set to be 6 seconds. In other words, the advertisement request of the primary window is sent to the main process of the video player 6 seconds before the advertisement is played. In this way, time is reserved for downloading the video streams of the first advertisement and the second advertisement, thereby ensuring that the video streams of the first advertisement and the second advertisement can be downloaded completely before the play timing corresponding to the advertising label.

In some embodiments, the advertisement request can also be generated when the time corresponding to the advertising label is reached.

In some embodiments, after receiving the advertisement request of the primary window, the main process of the video player can obtain the media-resource identifier of the primary video based on the advertisement request of the primary window. Based on that the video player currently has a playback process of the secondary window, an advertisement request including a parameter for indicating double windows playback and the media-resource identifier of the primary video is generated, and the generated advertisement request is sent to the server.

In some embodiments, the parameter for indicating double windows playback can also be generated after the video player receives a command for playing the primary video and the secondary video at the same time. After receiving the playback request of the primary window, the main process of the video player can directly obtain the parameter for indicating double windows playback. An advertisement request is generated and sent to the server based on the parameter for indicating double windows playback and the media-resource identifier of the primary video.

In some embodiments, the parameter for indicating double windows playback can include identifiers of two video windows that are playing videos, such as an identifier of the primary window and an identifier of the secondary window. According to that interface data of the display includes the identifiers of the two video windows, it is determined that there are two video windows that are playing videos on the display.

In some embodiments, after receiving the advertisement request sent from the video player, the server can obtain a play address of the first advertisement and a play address of the second advertisement respectively based on the parameter for indicating double windows playback and the media-resource identifier of the primary video that are included in the advertisement request, and send the play address of the first advertisement and the play address of the second advertisement to the display apparatus. The play address of the first advertisement can be an access address of the video stream of the first advertisement, and the play address of the second advertisement can be an access address of the video stream of the second advertisement. The first advertisement and the second advertisement can be content-related advertisements with same duration, or can be content-related advertisements with different durations. A correspondence can be set for the play address of the first advertisement and the play address of the second advertisement. A correspondence is set between the play address of the first advertisement and the media-resource identifier of the primary video. Therefore, the server can obtain the play address of the first advertisement based on the media-resource identifier of the primary video, and then obtain the play address of the second advertisement based on the correspondence between the play address of the first advertisement and the play address of the second advertisement.

In some embodiments, after receiving the play address of the first advertisement and the play address of the second advertisement, the main process of the video player can access the play address of the first advertisement and the play address of the second advertisement, and download the video streams of the two advertisements.

In some embodiments, the main process of the video player can also download the video streams of the two advertisements at a second preset time prior to the play timing corresponding to the advertising label. The second preset time can be set according to the duration of the play time corresponding to the advertising label. For example, if the duration of the play time corresponding to the advertising label is 15 seconds, the second preset time is set to be 10 seconds. In other words, downloading of the video stream of the advertisement is started at 10 seconds before the advertisement is played. If the duration of the play time corresponding to the advertising label is 10 seconds, the second preset time is set to be 5 seconds. In other words, downloading of the video stream of the advertisement is started at 5 seconds before the advertisement is played. In this way, it is ensured that the video streams of the first advertisement and the second advertisement can be downloaded completely before the playback time corresponding to the advertising label.

Step S603: Control one video window to play the first advertisement based on the video stream of the first advertisement received, and control the other video window to play the second advertisement based on the video stream of the second advertisement received, where the first advertisement and the second advertisement are played synchronously.

In some embodiments, after downloading the video stream of the first advertisement and the video stream of the second advertisement, the main process of the video player can send the video stream of the first advertisement to the process of the primary window, and send the video stream of the second advertisement to the process of the secondary window. In this case, if start time corresponding to the advertising label has not been reached, the process will wait until the start time corresponding to the advertising label is reached. Meanwhile, instructions for playing advertisements are sent to the process of the playback window of the primary video and the process of the playback window of the secondary video, so that the primary window pauses the play of the primary video and starts to play the first advertisement, and the secondary window pauses the play of the secondary video and starts to play the second advertisement.

In some embodiments, the main process of the video player obtains the video streams of the two advertisements when the start time corresponding to the advertising label is reached. After the video stream of the first advertisement and the video stream of the second advertisement are received, the two video streams can be directly sent to the processes of the two windows respectively, so that the two windows start to play the advertisements. In some embodiments, the main process of the video player is the process of the primary window. After receiving the video stream of the first advertisement and the video stream of the second advertisement, the process of the primary window can forward the video stream of the second advertisement to the process of the secondary window, and then play the first advertisement after a time delay, thereby ensuring that the play of the first advertisement and the play of the second advertisement are started synchronously.

In some embodiments, regarding a synchronous play of the first advertisement and the second advertisement, the play is started at the same time and ended at the same time.

In some embodiments, regarding a synchronous play of the first advertisement and the second advertisement, the play can be started at different time or ended at different time, provided that one of the advertisements is played during the play of the other advertisement, or at least at a moment, one video window plays video frames of the first advertisement and the other video window plays video frames of the second advertisement.

In some embodiments, the main process of the video player can also monitor a playback progress of the first advertisement of the primary window and a playback progress of the second advertisement in real-time. The main process of the video player can obtain the playback progress of the first advertisement by obtaining a media-resource type of a video frame played in a next frame of the process of the primary window. If the media-resource type of the video frame played in the next frame is an advertisement, it is indicated that the first advertisement contains video frames that have not been played yet. If the media-resource type of the video frame played in the next frame is empty, it is indicated that the current frame is the last frame of the first advertisement. The playback progress of the second advertisement is obtained by obtaining a media-resource type of a video frame played in a next frame of the process of the secondary window. If the media-resource type of the video frame played in the next frame is an advertisement, it is indicated that the second advertisement contains video frames that have not been played yet. If the media-resource type of the video frame played in the next frame is empty, it is indicated that the current frame is the last frame of the second advertisement.

In some embodiments, if a current playback progress of the first advertisement indicates that the last frame of the first advertisement has reached, while for a current playback progress of the second advertisement indicates that the last frame of the second advertisement has not reached, the main process of the video player controls the playback window of the primary video to continue playing the primary video, and controls the playback window of the secondary video to stop playing the second advertisement and to continue playing the secondary video. If a current playback progress of the first advertisement indicates the last frame of the first advertisement has not reached, while a current playback progress of the second advertisement indicates that the last frame of the second advertisement has reached, the main process of the video player controls the playback window of the primary video to continue playing the first advertisement, and control the playback window of the secondary video to keep displaying the last frame of the second advertisement or playing the second advertisement cyclically. If the playback progress of the first advertisement indicates that the last frame of the first advertisement has reached, and the playback progress of the second advertisement indicates that the last frame of the second advertisement has reached, the main process of the video player controls the playback window of the primary video to continue playing the primary video, and control the playback window of the secondary video to continue playing the secondary video.

In some embodiments, when the display apparatus merely plays a video in one video window, whether the video contains an advertising label can also be detected. If it is detected that there is an advertising label, the video stream of the first advertisement corresponding to the advertising label can be obtained. The playback window is controlled to play the first advertisement based on the received video stream of the first advertisement.

Figure 56C:
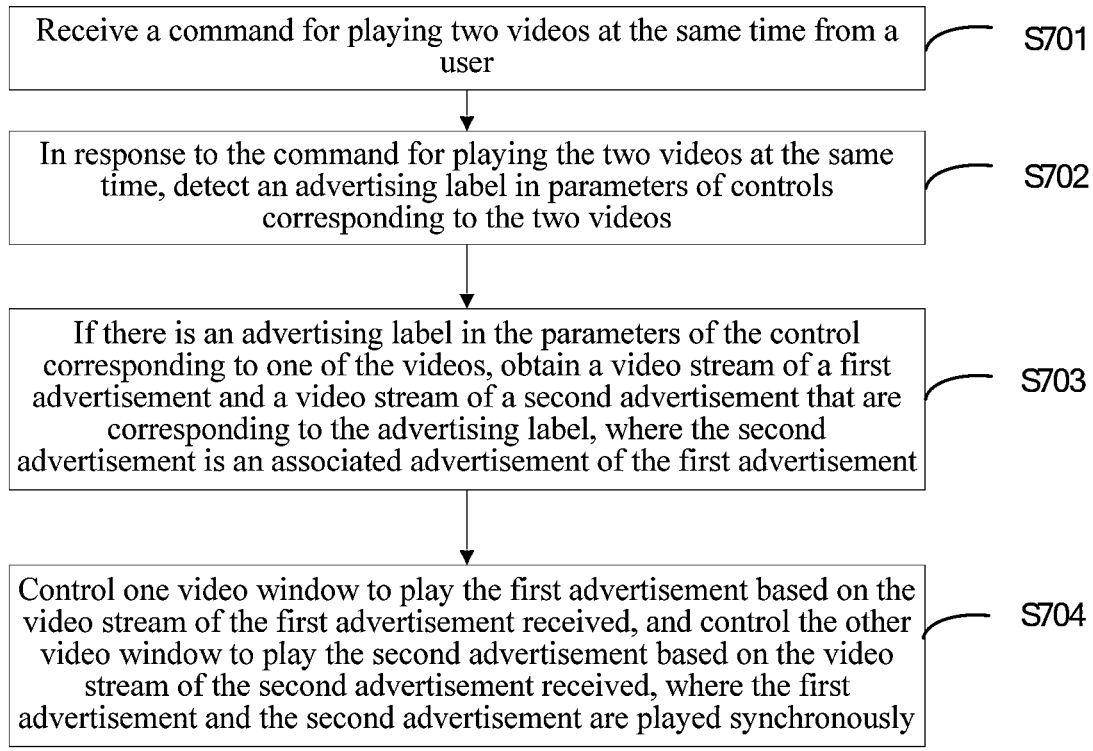
FIG. 56C is a schematic flowchart illustrating a method for playing two content-related advertisements according to some embodiments of the present disclosure.

In some embodiments, for the method for the video player of the display apparatus to play two content-related advertisements, reference can be made to FIG. 56C. The method can include steps S701 to S703.

Step S701: Receive a command for playing two videos at the same time from a user.

In some embodiments, after the user selects a video and confirms playback and then selects another video and confirms playback, or selects two videos simultaneously and confirms playback, the display apparatus can generate an instruction for playing the two videos at the same time.

Step S702: In response to the command for playing the two videos at the same time, detect an advertising label in parameters of controls corresponding to the two videos.

In some embodiments, an advertising label can be provided in some parameters of a control corresponding to the primary video. After receiving the command for playing the primary video and the secondary video at the same time, the main process of the video player can determine whether there is an advertising label in the parameters of the control corresponding to the primary video.

In some embodiments, an advertising label can be provided in some parameters of a control corresponding to the secondary video. After receiving the command for playing the primary video and the secondary video at the same time, the main process of the video player can determine whether there is an advertising label in the parameters of the control corresponding to the secondary video.

In some embodiments, advertising labels can be provided in some parameters of the control corresponding to the primary video and in some parameters of the control corresponding to the secondary video. After receiving the command for playing the primary video and the secondary video at the same time, the main process of the video player can respectively determine whether there are advertising labels in the parameters of the control corresponding to the primary video and in the parameters of the control corresponding to the secondary video.

Step S703: If there is an advertising label in the parameters of the control corresponding to one of the videos, obtain a video stream of a first advertisement and a video stream of a second advertisement that are corresponding to the advertising label, where the second advertisement is an associated advertisement of the first advertisement.

In some embodiments, if there is an advertising label in the parameters of the control corresponding to the primary video, the main process of the video player can obtain the video stream of the first advertisement and the video stream of the second advertisement from the server based on the advertising label. For the method for obtaining, reference can be made to step S602.

In some embodiments, if there is an advertising label in the parameters of the control corresponding to the secondary video, the main process of the video player can obtain the video stream of the first advertisement and the video stream of the second advertisement from the server based on the advertising label.

In some embodiments, if there are advertising labels in both the parameters of the control corresponding to the primary video and the parameters of the control corresponding to the secondary video, the main process of the video player can obtain the video stream of the first advertisement and the video stream of the second advertisement from the server based on the advertising label corresponding to the primary video.

Step S704: Control one video window to play the first advertisement based on the video stream of the first advertisement received, and control the other video window to play the second advertisement based on the video stream of the second advertisement received, where the first advertisement and the second advertisement are played synchronously.

Figure 56D:
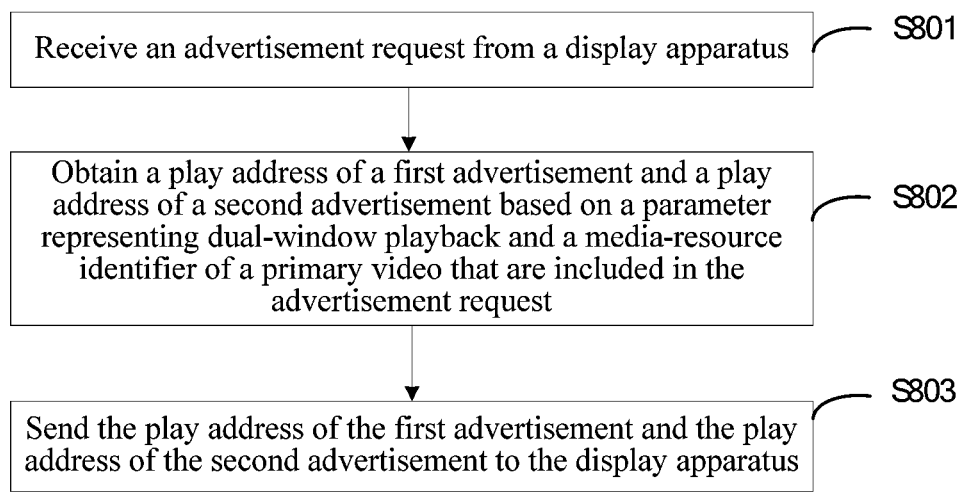
FIG. 56D is a schematic flowchart illustrating a method for sending an advertisement by a server according to some embodiments of the present disclosure.

To describe the method for providing two content-related advertisements to the display apparatus, FIG. 56D shows a schematic flowchart illustrating a method for sending an advertisement from a server according to some embodiments. As shown in FIG. 56D, the method can include steps S801 to S803.

Step S801: Receive an advertisement request from the display apparatus.

In some embodiments, the server can receive the advertisement request sent from the main process of the video player, and analyze the advertisement request to obtain the parameter for indicating double windows playback and the media-resource identifier of the primary video. The parameter for indicating double windows playback includes a playback-window identifier of the primary video and a playback-window identifier of the secondary video.

Step S802: Obtain a play address of the first advertisement and a play address of the second advertisement based on the parameter for indicating double windows playback and the media-resource identifier of the primary video that are included in the advertisement request.

In some embodiments, after obtaining the parameter for indicating double windows playback and the media-resource identifier of the primary video from the advertisement request, the server can obtain the play address of the first advertisement based on the media-resource identifier of the primary video in the advertisement request, and then obtain the play address of the second advertisement that is associated with the play address of the first advertisement based on the parameter for indicating double windows playback that is included in the advertisement request.

Step S803: Send the play address of the first advertisement and the play address of the second advertisement to the display apparatus.

In some embodiments, after obtaining the play address of the first advertisement and the play address of the second advertisement, the server can send the play address of the first advertisement and the play address of the second advertisement to the display apparatus.

In some embodiments, after the play address of the first advertisement and the play address of the second advertisement are sent to the display apparatus from the server, the display apparatus can access the play address of the first advertisement to download the video stream of the first advertisement, and can access the play address of the second advertisement to download the video stream of the second advertisement.

It can be seen from the foregoing embodiments that by setting the playback window of the primary video to play the associated advertisement synchronously with the playback window of the secondary video, when the display apparatus plays an advertisement on the playback window of the primary video, the playback window of the fitness video can synchronously play another advertisement associated with this advertisement. In this way, an advertisement playback effect and watching experience of the fitness video are improved.

In some embodiments, when the display apparatus plays two videos, volume of the two videos can be automatically adjusted as follows: playing the primary video and the secondary video according to volume set by the user last time, or playing the primary video and the secondary video according to volume set by default.

In some embodiments, default gain volume of the secondary video is set to be 0, and the gain volume of the primary video is set to be 100. In other words, the secondary video is played silently, and the primary video is played according to original volume of the primary video. In some embodiments, the gain volume of the secondary video can also be set by default as a volume obtained by performing gain adjustment on original volume of the secondary video. For example, the gain volume of the secondary video is 50% of the original volume of the secondary video. In some embodiments, the gain volume of the secondary video can also be set as a volume obtained by performing gain adjustment on the original volume of the primary video by default. For example, the gain volume of the secondary video is 50% of the original volume of the primary video.

During simultaneous playback of the primary video and the secondary video, the user can also perform manual gain adjustment on the volume of the primary video and on the volume of the secondary video.

Figure 57:
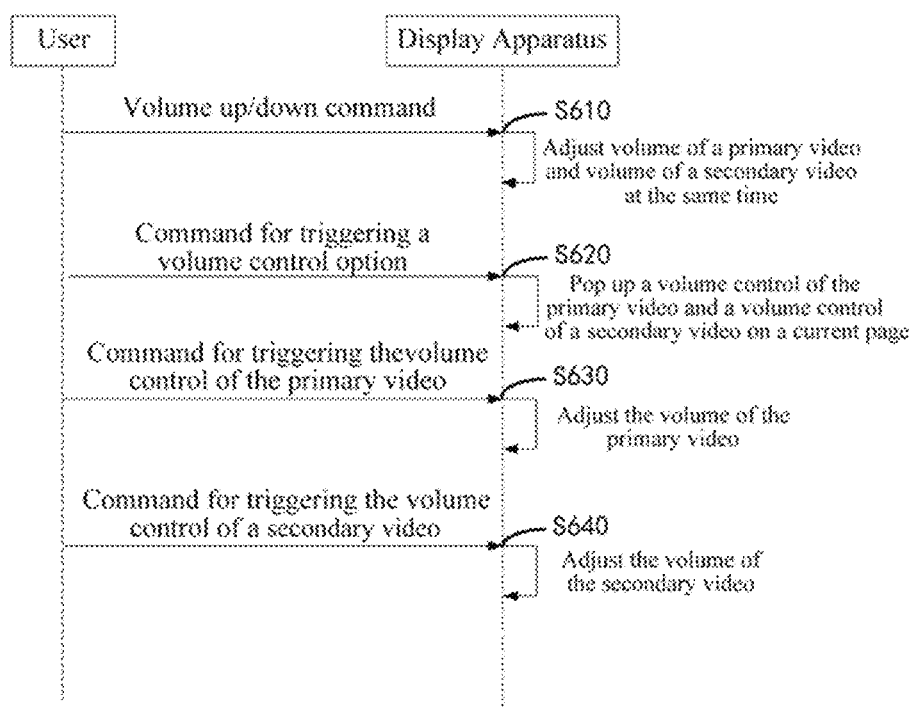
FIG. 57 is an interactive schematic diagram illustrating volume gain adjustment according to some embodiments of the present disclosure.

Referring to FIG. 57, FIG. 57 is an interactive schematic diagram illustrating volume gain adjustment according to some embodiments. As shown in FIG. 57A, the volume gain adjustment includes steps S610 to S640.

Step S610: a volume up/down command is sent to the display apparatus, and in response to the volume up/down command, the display apparatus adjusts volume of the primary video and volume of the secondary video at the same time.

In some embodiments, the user can input the volume up/down command to the display apparatus by pressing a volume up key or a volume down key on the remote control. After receiving the volume up/down command, the display apparatus simultaneously adjusts the volume of the primary video and the volume of the secondary video based on the volume up/down command. For example, the volume of the primary video and the volume of the secondary video are increased at the same time if the volume up/down command is a command corresponding to the volume up key, or the volume of the primary video and the volume of the secondary video are decreased at the same time if the volume up/down command is a command corresponding to the volume down key, thereby adjusting volume overall.

In some embodiments, after receiving the volume up/down command, the display apparatus confirms a current playback state based on a playback parameter. When the playback parameter indicates that the current interface is in an exercising-while-watching state, the volume of the primary video and the volume of the secondary video are adjusted at the same time. When the playback parameter indicates that the current interface only plays one video stream, only volume of said video stream is adjusted. When the playback parameter indicates that the current interface is in a watching-and-chatting state (that is, when both a video call window and a movie playback window are included), only volume of the movie playback window is adjusted.

Figure 52:
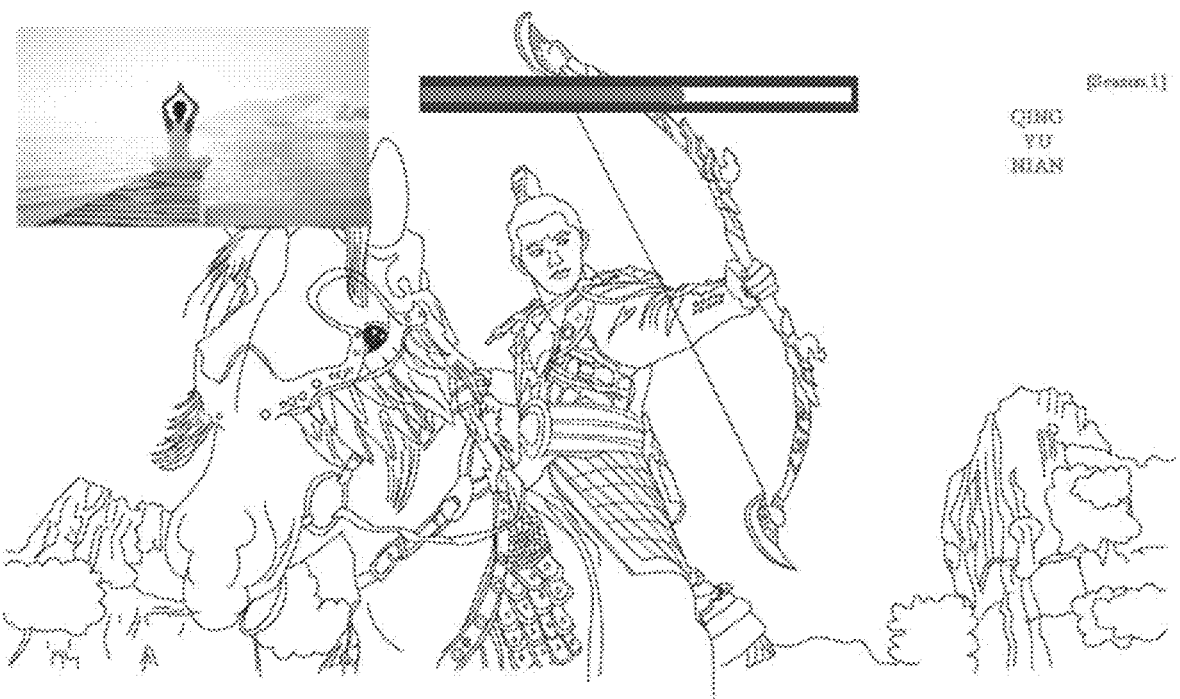
FIG. 52 is a schematic diagram illustrating an interface of a display apparatus according to some embodiments of the present disclosure.

In some embodiments, the overall adjustment on the volume by the display apparatus can be an adjustment on a power amplifier or on an audio gain. After receiving code streams of the two windows, the display apparatus respectively parses the code streams into a primary video stream and a primary audio stream that correspond to the primary window (a movie program), and into a secondary video stream and a secondary audio stream that correspond to the secondary window (a fitness video); the display apparatus then sends the primary video stream to the primary window for display, and sends the secondary video stream to the secondary window for display. After the primary audio stream and the secondary audio stream are mixed, a power amplification and a sound effect processing will be performed by a processing module of the display apparatus. In the exercising-while-watching mode, in response to the volume up/down command from the user, as shown in FIG. 52, volume adjustment is performed on the mixed audio streams. Meanwhile, a volume bar is set in another floating layer on the display interface to illustrate an adjustment of the volume.

Figure 53:
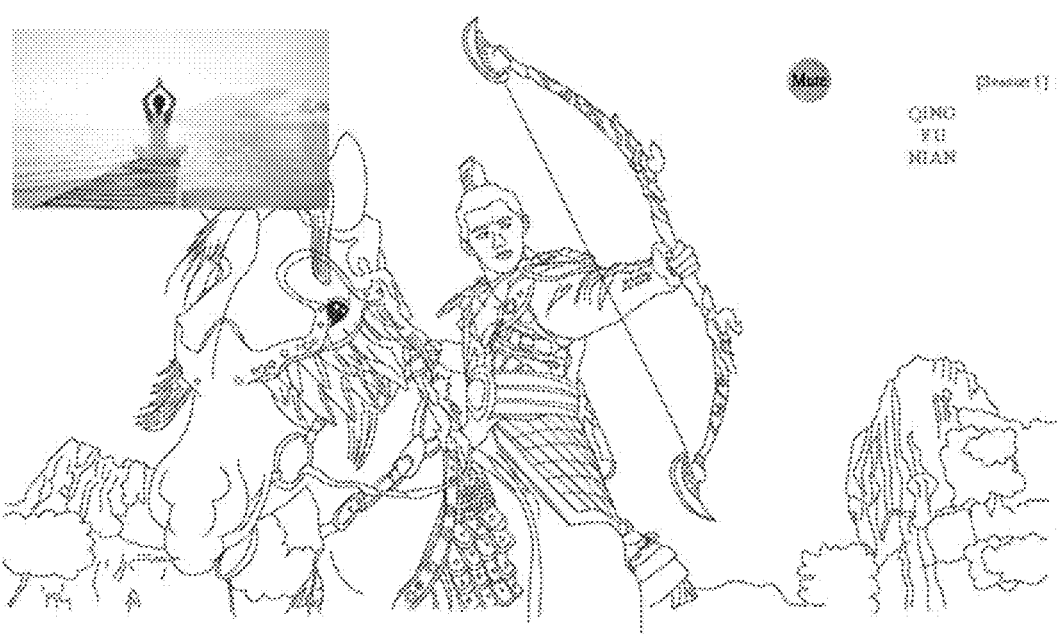
FIG. 53 is a schematic diagram illustrating an interface of a display apparatus according to some embodiments of the present disclosure.

In some embodiments, in response to a mute command from the user, as shown in FIG. 53, the mixed audio streams are no longer output. The user can input the mute command to the display apparatus through a mute key on the remote control.

As shown in FIG. 52, in some embodiments, in response to the volume up/down command from the user, the display apparatus can display a volume bar in real-time when the volumes of the primary video and the secondary video are adjusted at the same time. In this case, in response to the volume up/down command from the user, when both windows have volume output, the volume of the two videos are decreased or increased at the same time, and volume changes are displayed on the volume bar. In this way, the user can feel that the volume of both windows has been increased or decreased.

In some embodiments, a mute command or a command for adjusting the volume from the user can act on both the primary audio stream and the secondary audio stream that are not yet mixed.

In some embodiments, the primary audio stream and the secondary audio stream are simultaneously controlled by the mute command or the command for adjusting the volume, and the mixed audio streams are controlled by the mute command or the command for adjusting the volume.

Step S620: A command for selecting a volume control option is received from the user, and in response to the command for selecting the volume control option, the display apparatus pops up a volume control of the primary video and a volume control of a secondary video on a current page.

Step S630: A command for selecting the volume control of the primary video is received from the user, and the display apparatus adjusts volume of the primary video in response to a selection of the volume control of the primary video.

Step S640: A command for selecting the volume control of the secondary video is received, and the display apparatus adjusts volume of the secondary video in response to a selection of the volume control of the secondary video.

In some embodiments, if the user needs to individually adjust the volume of the primary video or the secondary video, the command for triggering the volume control option can be input to the display apparatus to invoke the volume control of the primary video and the volume control of the secondary video.

As shown in FIG. 43, in the playback mode of exercising-while-watching, the user can press a preset button (such as a direction key) on the remote control to send a command for invoking a setting option to the display apparatus. In response to the command for invoking the setting option, playback setting options (a control list) are invoked in a floating layer above the window of the display interface of the display apparatus. The playback setting options include a volume control option, and can also include control options for definition, etc. The user can trigger the option by selecting the volume control option, to generate a command for triggering the volume control option. Based on the command for triggering the volume control option, the display apparatus invokes, on the current floating layer or a new floating layer, a volume control of the primary video that corresponds to the video in the primary window and controls volume of the primary audio stream, and invokes a volume control of the secondary video that corresponds to the secondary window to control volume of the secondary audio stream. Display of the volume control of the primary video and the volume control of the secondary video is canceled when the focus moves to another option control (such as a definition control).

By receiving an operation for moving the focus from the user, the focus may be moved to the volume control of the primary video or the volume control of the secondary video. When the focus is on the volume control of the primary video, a volume adjustment command input from the user is received, and the volume of the primary audio stream before mixing is adjusted in response to the command. When the focus is on the volume control of the secondary video, a volume adjustment command input from the user is received, and the volume of the secondary audio stream before mixing is adjusted in response to the command. By adjusting the volume of the audio streams before mixing respectively, the volume of the movie, that is, the volume of the primary video, and the volume of the fitness video, that is, the volume of the secondary video, are adjusted.

In some embodiments, both the volume control of the primary video and the volume control of the secondary video can be volume-bar controls. The user can adjust the volume on two volume sliders that pop up from the volume control option. For example, the user can move the focus to one of the volume sliders by pressing an upward direction key or a downward direction key, and then adjust current volume corresponding to the volume slider by pressing a left direction key or a right direction key. A number at a tail end of the volume slider indicates the current volume.

Figure 44:
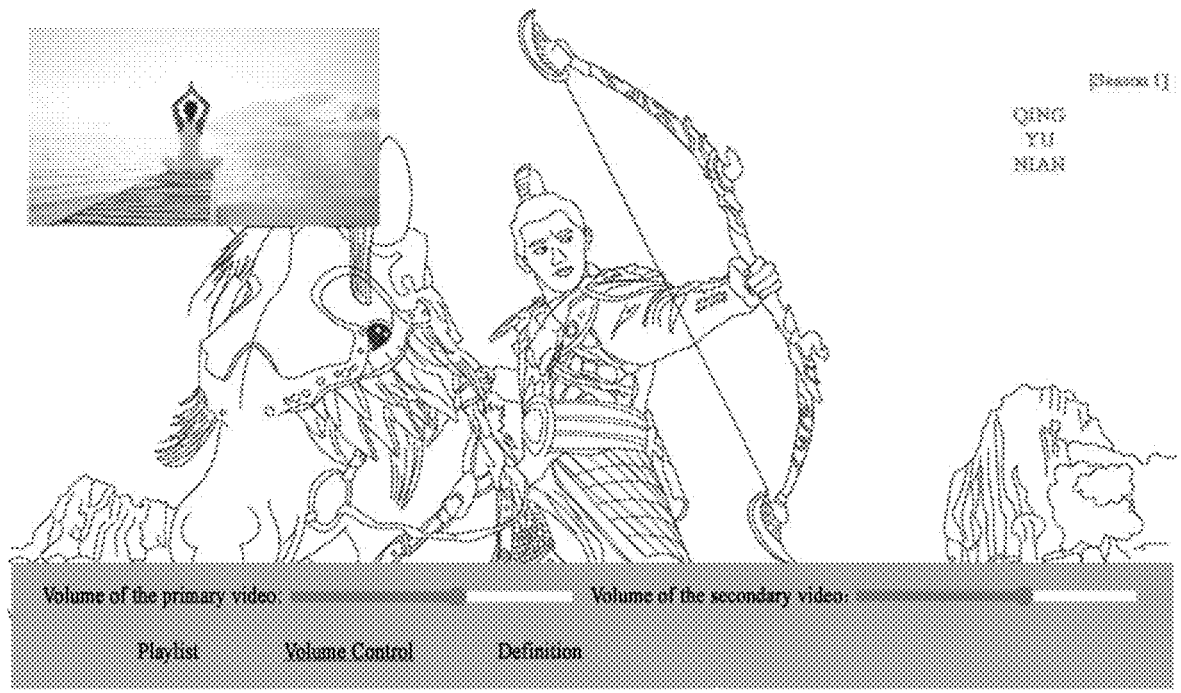
FIG. 44 is a schematic diagram illustrating volume adjustment according to some embodiments of the present disclosure.
Figure 45:
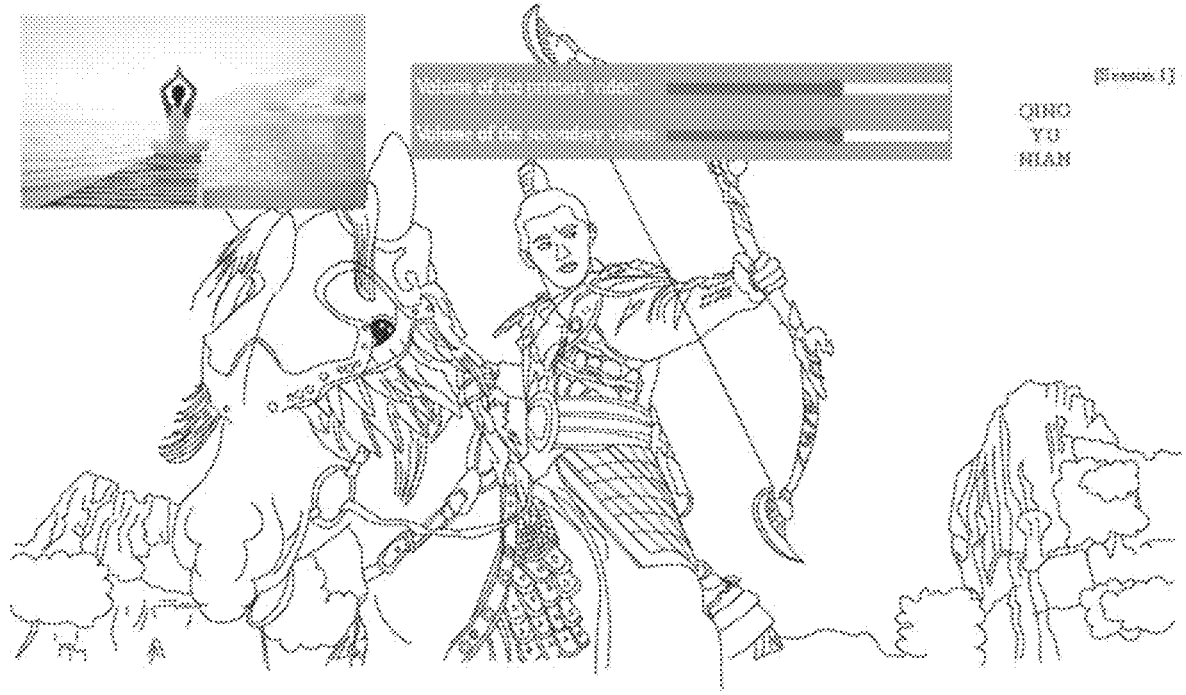
FIG. 45 is a schematic diagram illustrating volume adjustment according to some embodiments of the present disclosure.

In some embodiments, an appearance and a position of the volume slider may be different from those in FIG. 43, as shown in FIG. 44 and FIG. 45.

In some embodiments, the volume control of the primary video and the volume control of the secondary video can be disposed above the space of the volume control options in a parallel way and in a top-down manner.

In some embodiments, the volume control of the primary video and the volume control of the secondary video can be disposed above the space of the volume control options in a parallel way and in a left-right manner.

In some embodiments, when the volume control of the primary video and the volume control of the secondary video are displayed, the display of the control list can be canceled to prevent the playback image from being excessively blocked.

In some embodiments, the volume control of the primary video and/or the volume control of the secondary video can be respectively set in the control list, and the volume controls of the videos on the two windows can be selected without the volume control option.

In some embodiments, the display apparatus can cancel display of the playback setting option or can retain the display of the playback setting option after two volume sliders are popped up.

In some embodiments, the display apparatus receives the input volume adjustment command, and in response to the volume adjustment command, determine a current playback state based on a playback parameter. When the playback parameter indicates that a current interface is in a playback state of exercising while watching, a volume adjustment control of the primary video and a volume adjustment control of the secondary video are displayed at the same time. When the playback parameter indicates that the current interface is in a playback state of playing only one video stream, only volume of the video stream as played is adjusted. When the playback parameter indicates that the current interface is in a playback state of watching and chatting (that is, when both a video call window and a movie playback window are included at the same time), only volume of the movie playback window is adjusted.

In some embodiments, when the playback parameter indicates that the current interface is in a playback state of playing only one video stream, the volume of the video stream as played is adjusted by adjusting power amplification and a sound effect only.

In some embodiments, the volume adjustment to the power amplification and the sound effect refers to volume adjustment to a decoded audio stream. In some embodiments, adjusting respectively refers to volume gain adjustment performed respectively on each audio stream in a decoding process.

In some embodiments, the volume adjustment to the power amplification and the sound effect refers to volume adjustment to an audio stream after audio mixing process. In some embodiments, when the power amplification and the sound effect are adjusted respectively, gain adjustment is performed on each audio stream before audio mixing process.

In some embodiments, the playback state can also be determined in other manners.

In some embodiments, an audio processing process of the display apparatus successively includes performing gain adjustment on an audio in each channel, mixing audios in various channels, and processing power amplification and a sound effect of the mixed audio.

In some embodiments, when the volume adjustment command is received and the volume adjustment control of the primary video and the volume adjustment control of the secondary video are not presented on the display interface, volume of the whole machine, that is, power amplification and a sound gain of the display apparatus are controlled based on the volume adjustment command.

In some embodiments, when the volume adjustment command is received and the volume adjustment control of the primary video and the volume adjustment control of the secondary video are presented on the display interface, according to the position of the focus, a volume gain of the primary video before audio mixing is controlled to adjust the volume of the primary video, or a volume gain of the secondary video before audio mixing is controlled to adjust the volume of the secondary video.

In some embodiments, when the focus lands on the volume adjustment control of the primary video, in response to the volume adjustment command, the volume gain of the primary video before audio mixing is controlled to adjust the volume of the primary video.

Figure 58:
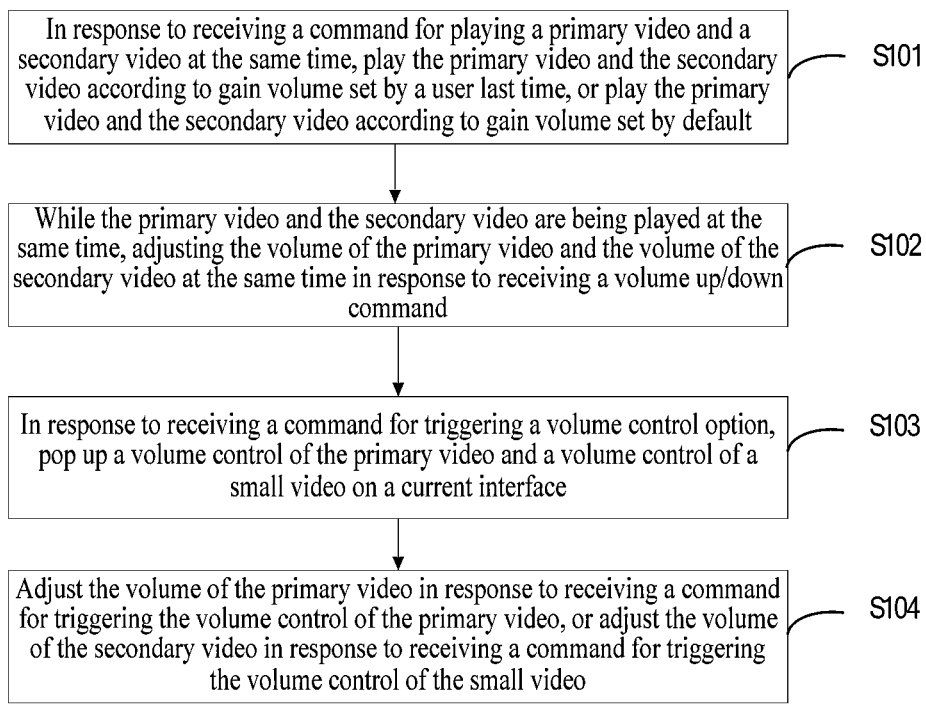
FIG. 58 is a schematic flowchart illustrating a volume control method according to some embodiments of the present disclosure.

In some embodiments, when the focus lands on the volume adjustment control of the secondary video, in response to the volume adjustment command, the volume gain of the secondary video before audio mixing is controlled to adjust the volume of the secondary video. According to the interactive schematic diagrams illustrating volume gain adjustment as shown in FIG. 56A and FIG. 57, a volume control method of the display apparatus may be as shown in FIG. 58, including steps S101 to S104.

Step S101: In response to receiving a command for playing the primary video and the secondary video at the same time, playing the primary video and the secondary video according to gain volume set by the user last time, or playing the primary video and the secondary video according to gain volume set by default.

Step S102: while the primary video and the secondary video are being played at the same time, adjusting the volume of the primary video and the volume of the secondary video at the same time in response to receiving a volume up/down command.

Step S103: In response to receiving a command for triggering the volume control option, popping up a volume control of the primary video and a volume control of the secondary video on a current interface.

Step S104: Adjusting the volume of the primary video in response to receiving the command for triggering the volume control of the primary video, or adjusting the volume of the secondary video in response to receiving the command for triggering the volume control of the secondary video. In some embodiments, step 103 and step 102 may not perform simultaneously.

Figure 59:
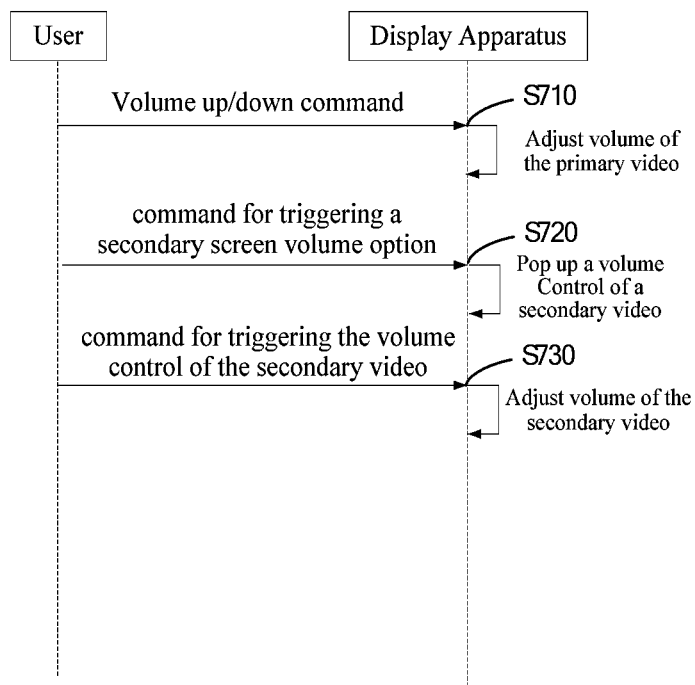
FIG. 59 is an interactive schematic diagram illustrating volume gain adjustment according to some embodiments of the present disclosure.

Referring to FIG. 59, FIG. 59 is an interactive schematic diagram illustrating volume gain adjustment according to some embodiments. As shown in FIG. 59, the volume gain adjustment includes steps S710 to S730.

Step S710: a volume up/down command is sent to the display apparatus, and in response to the volume up/down command, the display apparatus adjusts a volume of the primary video and not adjust a volume of the secondary video.

In some embodiments, adjusting the volume of the primary video may be adjusting overall volume (that is, a gain of the power amplification and the sound effect after mixing) of the display apparatus.

In some embodiments, adjusting the volume of the primary video may be adjusting the volume of the primary video volume before audio mixing.

In some embodiments, the user can issue a volume up/down command for adjusting the primary video only by pressing the volume up key or the volume down key on the remote control.

Adjusting the volume of the secondary video needs to be done by the user by invoking a volume control option or a secondary-screen volume option on a display image.

Step S720: a command for triggering a secondary screen volume option is received, and the display apparatus pops up the volume control of the secondary video in response to the command for triggering a secondary screen volume option.

Step S730: a command for triggering the volume control of the secondary video is received, and the display apparatus adjusts volume of the secondary video in response to the command for triggering the volume control of the secondary video.

Figure 46:
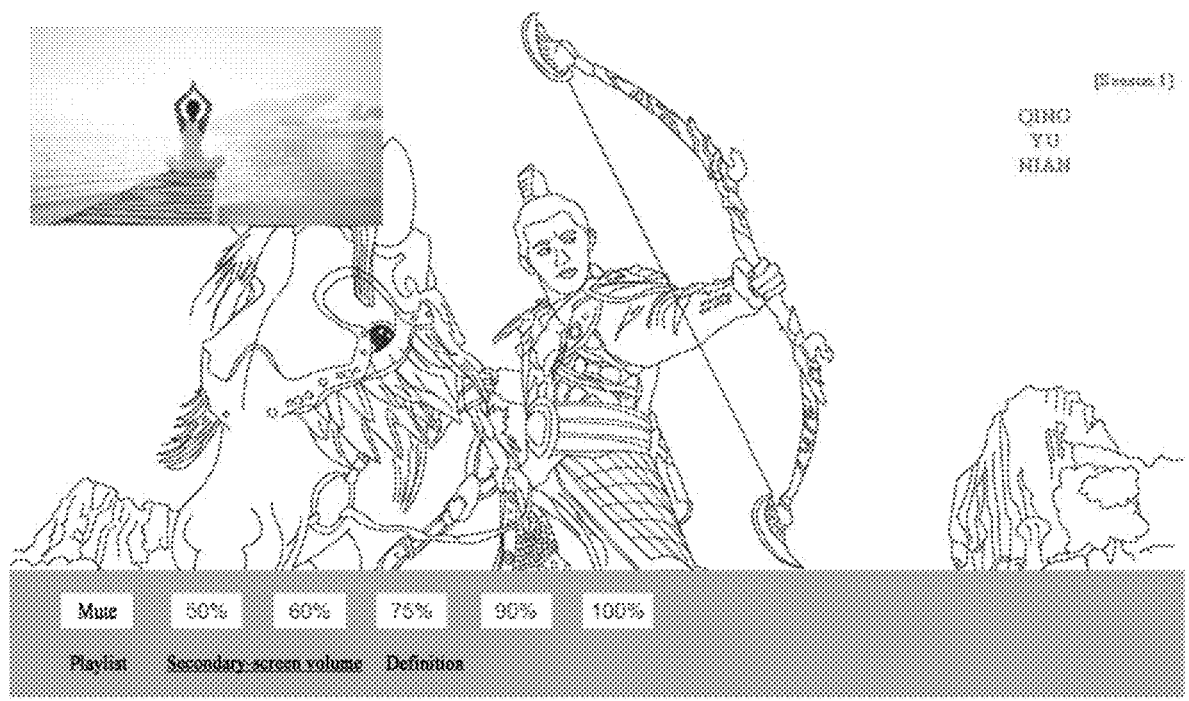
FIG. 46 is a schematic diagram illustrating volume adjustment according to some embodiments of the present disclosure.

In some embodiments, the playback setting option in the display apparatus by pressing a direction key on the remote control can include a secondary-screen volume option, so as to adjust relative volume of the secondary video. Referring to FIG. 46, the user can trigger this option by selecting the secondary-screen volume option, to generate the command for triggering the secondary-screen volume option. According to the command for triggering the secondary-screen volume option, the display apparatus can pop up a plurality of fixed volume controls for the user to select, such as a mute control, a 50% control, a 60% control, a 75% control, a 90% control, and a 100% control. In some embodiments, the volume control selected by the secondary-screen volume option by default can be the 75% control, and each fixed volume control is a volume control of the secondary video. The user can move the focus to one of the fixed volume controls through the upward direction key or the downward direction key, and then select a fixed volume through the left direction key or the right direction key. The command for triggering the volume control of the secondary video can be generated after OK is pressed. The display apparatus adjusts the volume of the secondary video based on the command for triggering the volume control of the secondary video. After the adjustment is completed, the following prompt is popped up: volume set successfully.

After the volume is set successfully, the display apparatus locally saves the volume that is set successfully. When entering next time, the volume of the secondary video is by default the volume set last time. Default volume, such as 75%, is used if the volume set last time is invalid.

In some embodiments, the control controls the relative volume to initial volume of the secondary video. An operator of the display apparatus can set the default volume of the secondary video. For example, the number of users who select each volume is counted, where only users who have used exercising-while-watching are counted. If the user has set for multiple times, settings need to be saved for multiple times, but only the recent setting is counted. This setting is used to perform gain adjustment on the volume of the secondary audio stream and the secondary video stream that are not yet mixed. Specifically, the volume of the secondary audio stream before mixing is respectively adjusted to 0, 50% of the original volume, 60% of the original volume, 75% of the original volume, 90% of the original volume, or 100% of the original volume. Subsequently, the secondary audio stream and the primary audio stream that are performed with volume adjustment are mixed and then are output.

In some embodiments, the control controls a relative volume to the volume of the primary video. This setting is used to perform gain adjustment on the volume of the secondary audio stream that is not yet mixed. To be specific, the volume of the secondary audio stream before mixing is respectively adjusted to 0 according to the volume of the primary audio stream, 50% of the volume of the primary audio stream, 60% of the volume of the primary audio stream, 75% of the volume of the primary audio stream, 90% of the volume of the primary audio stream, or 100% of the volume of the primary audio stream. Subsequently, the secondary audio stream and the primary audio stream that are performed with volume adjustment are mixed and then are output.

Figure 60:
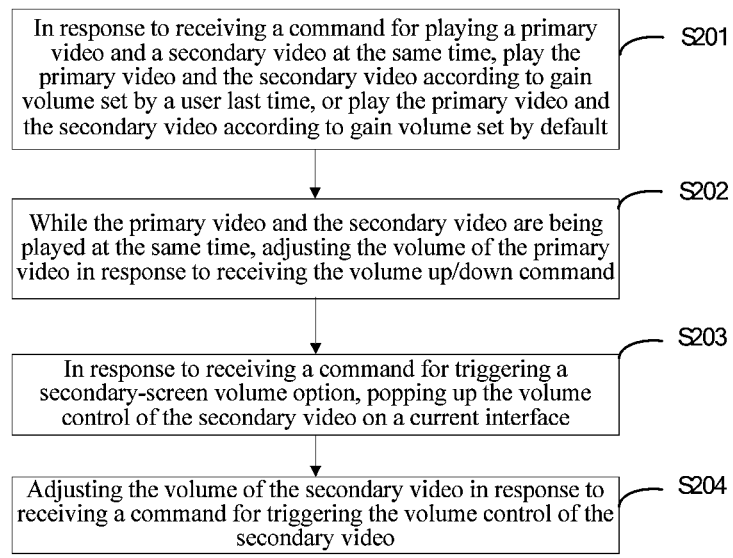
FIG. 60 is a schematic flowchart illustrating a volume control method according to some embodiments of the present disclosure.

According to the interactive schematic diagrams illustrating volume gain adjustment as shown in FIG. 56A and FIG. 60, a volume control method of the display apparatus may be as shown in FIG. 60, including steps S201 to S204.

Step S201: In response to receiving a command for playing the primary video and the secondary video at the same time, playing the primary video and the secondary video according to gain volume set by the user last time, or playing the primary video and the secondary video according to gain volume set by default.

Step S202: while the primary video and the secondary video are being played at the same time, adjusting the volume of the primary video in response to receiving the volume up/down command.

Step S203: In response to receiving a command for triggering a secondary-screen volume option, popping up the volume control of the secondary video on a current interface.

Step S204: Adjusting the volume of the secondary video in response to receiving a command for triggering the volume control of the secondary video.

The volume of the secondary video can be adjusted according to the foregoing implementations.

In some embodiments, step S204 and step S203 may not perform simultaneously.

In some embodiments, when the volume adjustment command is received and a secondary-screen volume control is not displayed on the display interface, the volume of the primary video is adjusted based on the volume adjustment command.

In some embodiments, when the volume adjustment command is received and a secondary-screen volume control is not displayed on the display interface, the volume gain of the primary video before audio mixing is controlled based on the volume adjustment command, to control the volume of the primary video.

In some embodiments, when the volume adjustment command is received and a secondary-screen volume control is displayed on the display interface, the volume adjustment command is not responded to.

In some embodiments, when the secondary-screen volume control is displayed on the display interface, an input command for selecting the secondary-screen volume control is received, and in response to a selection of the secondary-screen volume control, the volume gain of the secondary video before audio mixing is controlled to adjust the volume of the secondary video.

In some embodiments, the volume adjustment command can be a volume up command or a volume down command.

In some embodiments, the mute command from the user to the display apparatus through the mute key on the remote control can make the display apparatus entirely mute (the scenario shown in FIG. 53). In this case, both the primary video and the secondary video are mute. After the global mute, the display apparatus cancels the global mute if a command for adjusting volume of the primary window or the volume of the secondary window through the volume slider or through the control.

Figure 61:
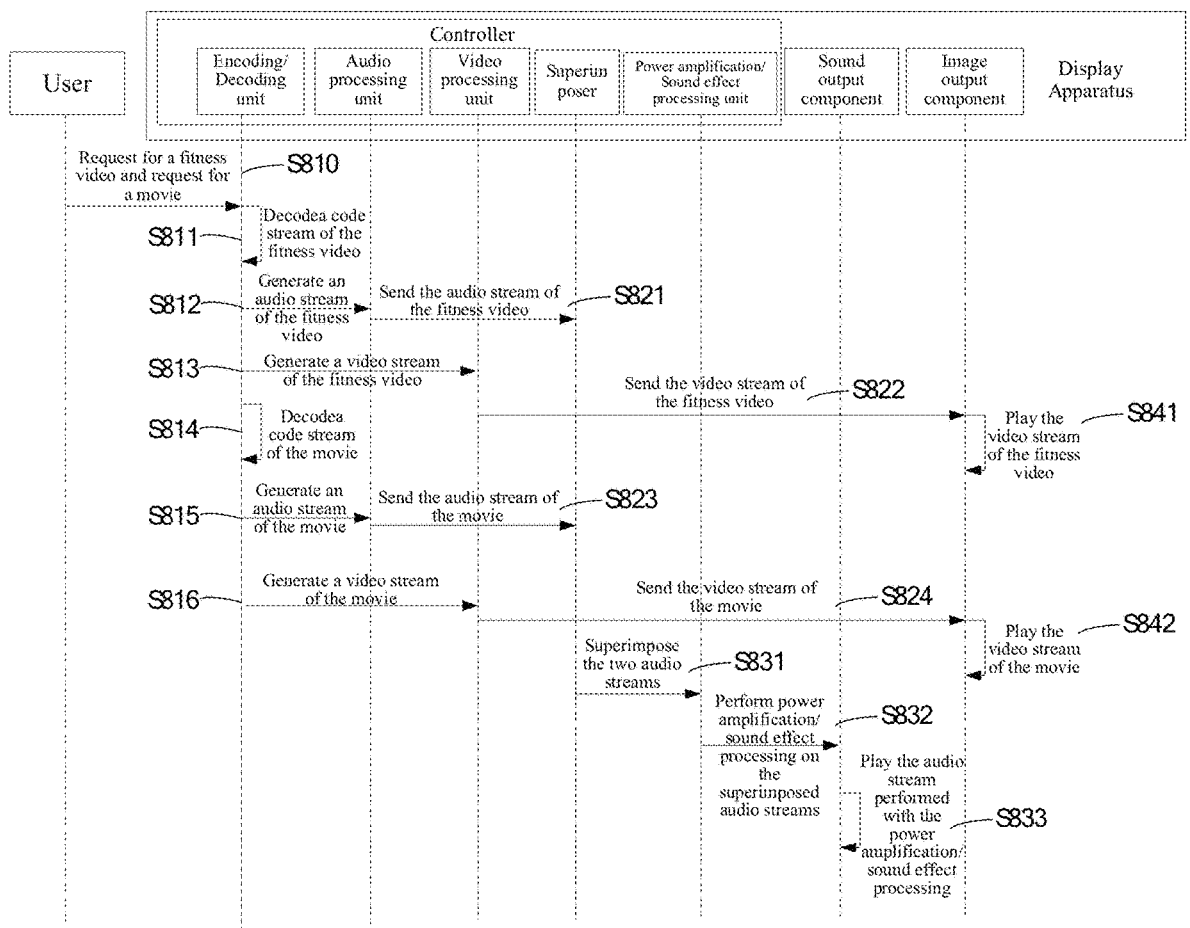
FIG. 61 is a schematic sequence diagram for simultaneously playing a primary video and a secondary video on a display apparatus according to some embodiments of the present disclosure.

To further describe a data processing process of playing the primary video and the secondary video at the same time, FIG. 61 shows a schematic sequence diagram of simultaneously playing a primary video and a secondary video by a display apparatus. As shown in FIG. 61, in some embodiments, the display apparatus includes a controller, a sound output component, and an image output component. The controller includes a decoding unit, an audio processing unit, a video processing unit, a superimposer, and a power amplification/sound effect processing unit.

In some embodiments, the data processing process of playing the primary video and the secondary video at the same time includes the following steps.

Step S810: After a fitness video and a movie is selected, an OK key on a remote control is pressed to send a request for the fitness video and a request for the movie to the display apparatus.

Steps S811 to S16: The decoding unit of the display apparatus parses code streams of the fitness video based on the request for the fitness video and parses code streams of the movie based on the request for the movie, wherein the decoding unit obtains an audio stream of the fitness video and a video stream of the fitness video by parsing the code streams of the fitness video, and obtains an audio stream of the movie and a video stream of the movie by parsing the code streams of the movie.

Steps S821 to S824: The decoding unit sends two audio streams to the audio processing unit, and sends two video streams to the video processing unit.

Steps S831 to S833: The audio processing unit sends two audio streams to the superimposer, and the superimposer superimposes the two audio streams and sends the same to the power amplification/sound effect processing unit. The power amplification/sound effect processing unit performs power amplification processing and/or sound effect processing on the superimposed audio streams, and outputs the audio streams which have been processed by the power amplification processing and/or the sound effect processing to the sound output component of the display apparatus. The sound output component can play the audio streams which have been processed by the power amplification processing and/or the sound effect processing.

Steps S841 and S842: The video processing unit sends two video streams to the image output component, and the image output component transmits the video stream of the movie to a movie window for playback, and transmits the video stream of the fitness video to a fitness video window for playback.

Figure 62:
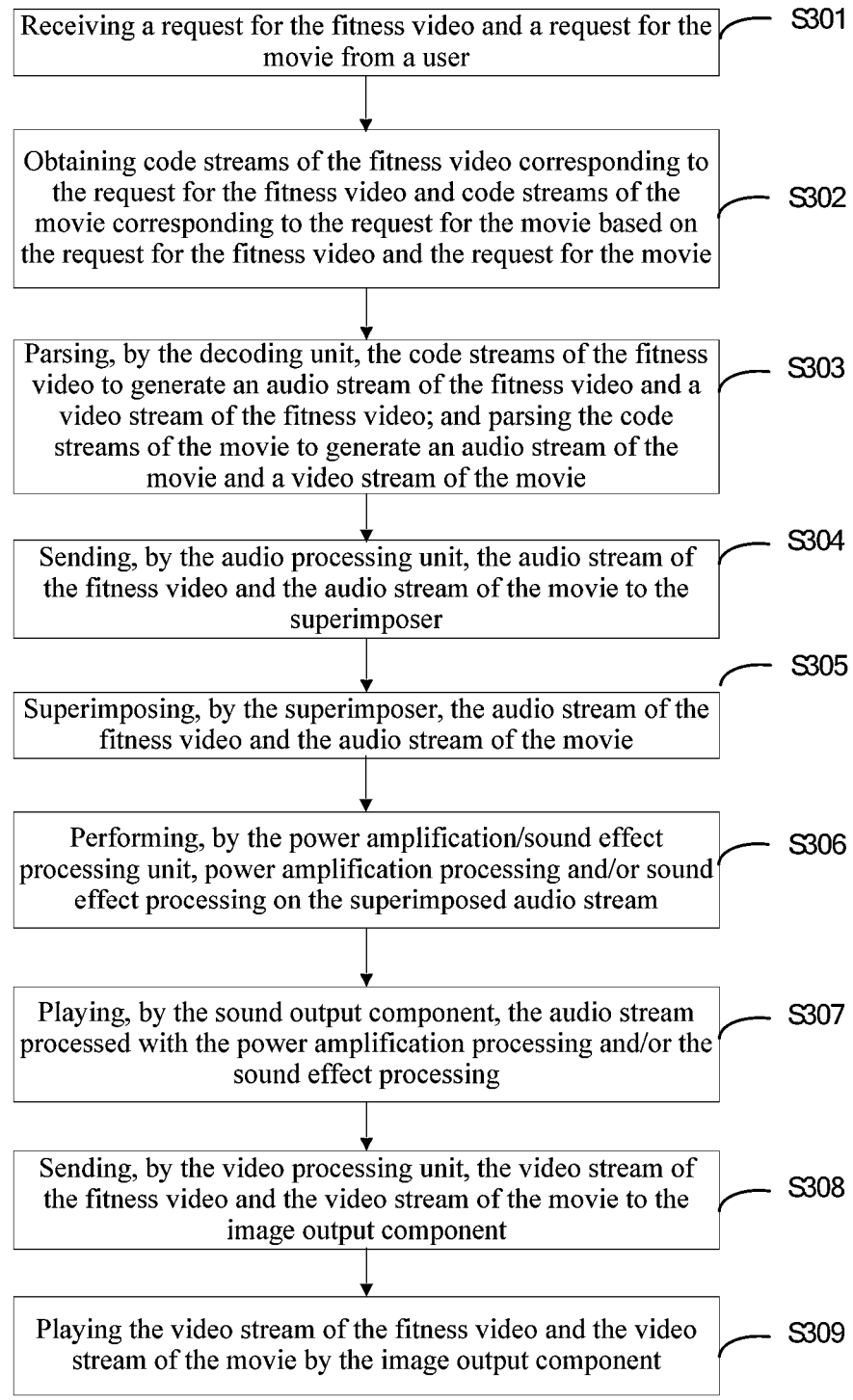
FIG. 62 is a schematic flowchart illustrating a method for simultaneously playing a primary video and a secondary video on a display apparatus according to some embodiments of the present disclosure.

FIG. 62 is a schematic flowchart illustrating a method for simultaneously playing a primary video and a secondary video on a display apparatus according to some embodiments. As shown in FIG. 62, the method for simultaneously playing the primary video and the secondary video on the display apparatus can include the following steps.

Step S301: Receiving a request for the fitness video and a request for the movie from a user.

In some embodiments, the controller of the display apparatus can receive the request for the fitness video and the request for the movie that are input from the user, extract a media-resource identifier of the fitness video from the request for the fitness video, and extract a media-resource identifier of the movie from the request for the movie.

Step S302: Obtaining code streams of the fitness video corresponding to the request for the fitness video and code streams of the movie corresponding to the request for the movie based on the request for the fitness video and the request for the movie.

In some embodiments, the controller of the display apparatus can obtain the code streams of the fitness video from a media-resource content platform based on the media-resource identifier of the fitness video, and obtain the code streams of the movie based on the media-resource identifier of the movie. The media-resource content platform may be a content platform set by the server of the display apparatus or may be a third-party content platform. The controller can determine a source of the video stream according to the media-resource identifier.

Step S303: Parsing, by the decoding unit, the code streams of the fitness video to generate an audio stream of the fitness video and a video stream of the fitness video; and parsing the code streams of the movie to generate an audio stream of the movie and a video stream of the movie.

Step S304: Sending, by the audio processing unit, the audio stream of the fitness video and the audio stream of the movie to the superimposer.

In some embodiments, the audio processing unit may not process the audio stream of the fitness video and the audio stream of the movie, and directly send the two audio streams to the superimposer.

In some embodiments, the audio processing unit can also perform gain processing on at least one audio stream of the audio stream of the fitness video and the video stream of the fitness video. For a determining condition and a method for the gain processing, reference can be made to other embodiments, or the determining condition and the method for the gain processing can be set according to specific conditions.

Step S305: Superimposing, by the superimposer, the audio stream of the fitness video and the audio stream of the movie.

Step S306: Performing, by the power amplification/sound effect processing unit, power amplification processing and/or sound effect processing on the superimposed audio stream.

In some embodiments, the power amplification/sound effect processing unit can perform power amplification processing and/or sound effect processing on the superimposed audio stream according to a preset gain rule. For the preset gain rule, reference can be made to other embodiments; or the preset gain rule can be set according to specific conditions. In some embodiments, the gain rule can be adjusted by the user. For example, the user can select different sound effects, and the superimposer can perform sound effect processing on the superimposed audio stream according to the sound effect selected by the user.

Step S307: Playing, by the sound output component, the audio stream processed with the power amplification processing and/or the sound effect processing.

Step S308: Sending, by the video processing unit, the video stream of the fitness video and the video stream of the movie to the image output component.

In some embodiments, the video processing unit can transmit the video stream of the fitness video to the fitness video window, and transmit the video stream of the movie to the movie window.

Step S309: Playing the video stream of the fitness video and the video stream of the movie by the image output component.

In some embodiments, the image output component plays the video stream of the fitness video on the fitness video window, and plays the video stream of the movie on the movie window.

Figure 63:
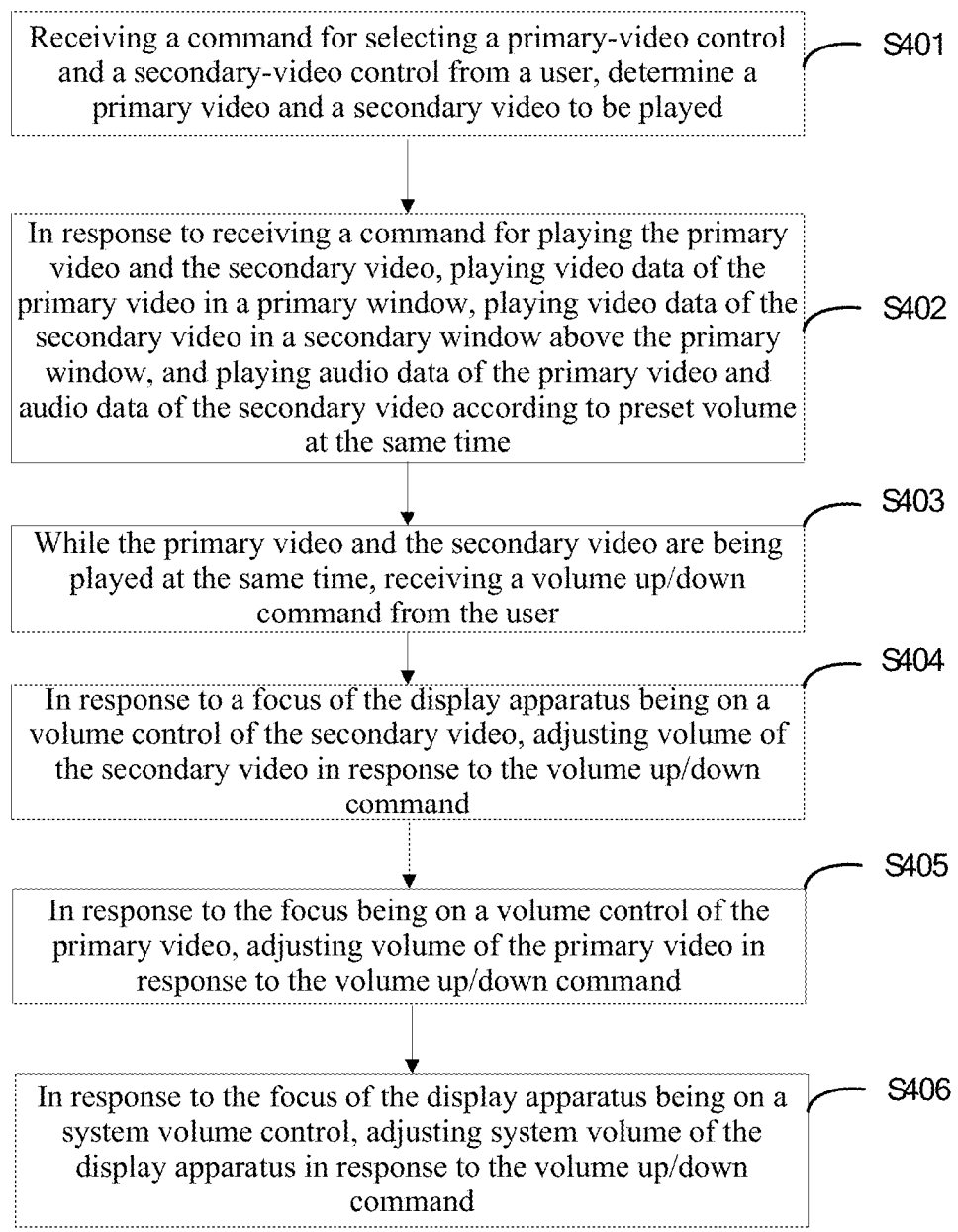
FIG. 63 is a schematic flowchart illustrating a volume control method according to some embodiments of the present disclosure.

To further describe the volume control method of the display apparatus, FIG. 63 shows a schematic flowchart illustrating a volume control method according to some embodiments, including steps S401 to S405.

Step S401: Receiving a command for selecting a primary-video control and a secondary-video control from a user, determine a primary video and a secondary video to be played.

In some embodiments, the primary-video control may be a control corresponding to the movie shown in FIG. 41. After the primary-video control is selected by the user, the primary video that the user requires the display apparatus to play can be determined. For example, if the primary-video control selected by the user is a control corresponding to "SNP DVD", it can be determined that the primary video to be played is "SNP DVD"; and a secondary-video control may be a control corresponding to the fitness video shown in FIG. 9. For example, if the user selects a control corresponding to a fitness video of "Calorie Burning", it can be determined that the fitness video to be played is "Calorie Burning".

Step S402: In response to receiving a command for playing the primary video and the secondary video, playing video data of the primary video in a primary window, playing video data of the secondary video in a secondary window above the primary window, and playing audio data of the primary video and audio data of the secondary video according to preset volume at the same time.

In some embodiments, the user can input a command for playing the primary video and the secondary video to the display apparatus by first selecting the secondary-video control, subsequently selecting the primary-video control, and then pressing the OK key on the remote control. In response to the command for playing the primary video and the secondary video, the controller of the display apparatus can control the image output component and the sound output component to play the primary video and the secondary video at the same time, so that the display apparatus plays the video data of the primary video in the primary window, plays the video data of the secondary video in the secondary window above the primary window, and plays audio data of the primary video and audio data of the secondary video according to preset volume. For example, the volume of the primary video is 100, and the volume of the secondary video is 50. When the primary video and the secondary video are played at the same time, audio data of an audio stream of the secondary video and audio data of an audio stream of the primary video are superimposed and then are output to the sound output component of the display apparatus.

Step S403: while the primary video and the secondary video are being played at the same time, receiving a volume up/down command from the user.

In some embodiments, when the display apparatus plays the primary video and the secondary video at the same time, the user can input the volume up/down command to the display apparatus to adjust the volume.

In some embodiments, the user can invoke a volume control on the display apparatus by pressing the volume up key or the volume down key on the remote control of the display apparatus, and input the volume up/down command to the display apparatus by operating the volume control. The display apparatus can be configured to display two volume controls in response to receiving a signal for triggering the volume up key or volume down key on the remote control. The volume controls can be volume sliders, as shown in FIG. 45. One of the volume controls is a volume control of the primary video that is configured to adjust the volume of the primary video, can be set with an identifier of the movie window, and displays "Volume of the primary video". The other volume control is a volume control of the secondary video that is configured to adjust the volume of the secondary video, can be set with an identifier of the fitness video window, and displays "Volume of the secondary video". The focus of the display apparatus can be located on one of the volume sliders by default, and the user can press the upward direction key or the downward direction key on the remote control to change the position of the focus. Referring to FIG. 45 and FIG. 52, the display apparatus can be configured to generate a volume adjustment parameter of the primary video when the focus of the display apparatus is on the volume control of the primary video. The volume adjustment parameter of the primary video can include the identifier of the movie window. The display apparatus can be configured to generate a volume adjustment parameter of the secondary video when the focus of the display apparatus is on the volume control of the secondary video. The volume adjustment parameter of the secondary video can include the identifier of the fitness video window.

The user can input the volume up/down command to the display apparatus by continuing pressing the volume up key or the volume down key on the remote control. When the focus of the display apparatus is on the volume control of the primary video, the display apparatus can determine, based on the volume adjustment parameter of the primary video, that the volume up/down command is a command for adjusting the volume of the primary video, so as to adjust the volume of the primary video. When the focus of the display apparatus is on the volume control of the secondary video, the display apparatus can determine, based on the volume adjustment parameter of the secondary video, that the volume up/down command is a command for adjusting the volume of the secondary video.

In some embodiments, referring to FIG. 52, when the user presses the volume up key or a volume down key on the remote control, the display apparatus displays a volume slider at which the focus is located. As shown in FIG. 52, the volume slider can be a system volume control, and the system volume control can be set with a system volume identifier. The display apparatus can be configured to generate a system volume adjustment parameter based on the fact that the focus is on the volume slider. The system volume adjustment parameter can include the system volume identifier, or the system volume adjustment parameter may include the volume adjustment parameter of the primary video and the volume adjustment parameter of the secondary video, or the system volume adjustment parameter does not include the volume adjustment parameter of the primary video and does not include the volume adjustment parameter of the secondary video. The volume up/down command can be input to the display apparatus when the user continues to press the volume up key or the volume down key on the remote control. The display apparatus can determine, based on the system volume adjustment parameter, that the volume up/down command is a command for adjusting system volume, so as to adjust the system volume. Certainly, in some embodiments, the volume slider in FIG. 52 can also be the volume control of the primary video or the volume control of the secondary video. Correspondingly, when the focus is on the volume slider, the volume up/down command is the command for adjusting the volume of the primary video or the volume of the secondary video.

In some embodiments, the user can also invoke the volume control on the display apparatus in other ways, and then input the volume up/down command to the display apparatus by operating the volume control. For example, the display apparatus can also be configured to display a control list above the primary window in response to a command for triggering the downward direction key from the user. Reference can be made to FIG. 43, FIG. 44, and FIG. 46.

In FIG. 43 and FIG. 44, the control list can include a control for volume controlling. When the user moves the focus of the display apparatus to the control for volume controlling, the display apparatus is configured to display two volume controls that are in forms of volume sliders above the primary window in response to a command for triggering the control for volume controlling. The two volume sliders are the volume control of the primary video and the volume control of the secondary video, respectively. In FIG. 43, the volume control of the primary video can display "Volume of the movie", and the volume control of the fitness video can display "Volume of the fitness video". In FIG. 44, the volume control of the primary video can display "Volume of the primary video", and the volume control of the fitness video can display "Volume of the secondary video". The display apparatus is configured to generate the volume adjustment parameter of the primary video when the focus of the display apparatus is on the volume control of the primary video. The volume adjustment parameter of the primary video includes the identifier of the movie window. The display apparatus is configured to generate the volume adjustment parameter of the secondary video when the focus of the display apparatus is on the volume control of the secondary video. The volume adjustment parameter of the secondary video can include the identifier of the fitness video window.

The user can press the upward direction key and the downward direction key on the remote control to move the focus to the volume control of the primary video or the volume control of the secondary video. Subsequently, the volume up/down command is input to the display apparatus by pressing the volume up key or the volume down key. When the focus is on the volume control of the primary video, the display apparatus can determine, based on the volume adjustment parameter of the primary video, that the volume up/down command is the command for adjusting the volume of the primary video, so as to adjust the volume of the primary video. The display apparatus can obtain the volume adjustment parameter of the primary video when the focus of the display apparatus is on the volume control of the secondary video. The volume adjustment parameter of the secondary video can include the identifier of the fitness video window. The user can input the volume up/down command to the display apparatus by continuing pressing the volume up key or the volume down key on the remote control. The display apparatus can determine, based on the volume adjustment parameter of the secondary video, that the volume up/down command is the command for adjusting the volume of the secondary video.

In FIG. 46, the control list invoked by the user by pressing the downward direction key or the upward direction key on the remote control can include a secondary-screen volume control. When the user moves the focus of the display apparatus to the secondary-screen volume control, the display apparatus can pop up a plurality of volume controls based on a signal for triggering the secondary-screen volume control. Each volume control is a volume control of the secondary video, and is provided with an identifier of the fitness video window. The display apparatus can be configured to generate a volume adjustment parameter of the secondary video when the focus of the display apparatus is on the volume control of the secondary video. The volume adjustment parameter of the secondary video can include the identifier of the fitness video window. Different volume controls can display different volume identifiers, such as "mute", "50%", "60%", "75%", "90%", and "100%". The user can move the focus of the display apparatus to one of the volume controls, and press the OK key to trigger the volume control, thereby inputting the volume up/down command to the display apparatus. The display apparatus can determine, based on the volume adjustment parameter of the secondary video, that the volume up/down command is the command for adjusting the volume of the secondary video.

Step S404: in response to a focus of the display apparatus being on a volume control of the secondary video, adjusting volume of the secondary video in response to the volume up/down command.

In some embodiments, the display apparatus can generate an adjustment parameter of the secondary video when the focus of the display apparatus is on the volume control of the secondary video. Therefore, the controller of the display apparatus can be configured to: when the focus of the display apparatus is on the volume control of the secondary video, adjust the volume of secondary video in response to the volume up/down command and based on the volume adjustment parameter of the secondary video and the volume up/down command.

In some embodiments, the display apparatus can detect whether there is a volume adjustment parameter of the secondary video after receiving the volume up/down command.

If the volume adjustment parameter of the secondary video exists, the audio data of the audio stream of the secondary video before superimposition is gained based on the volume up/down command. For example, according to the identifier of the fitness video window in the volume adjustment parameter of the secondary video, the audio data of the audio stream of the fitness video is gained by the audio processing unit, and the gained audio data is superimposed with the audio data of the audio stream of the primary video. The superimposed audio data is adjusted based on preset power amplification and sound effect parameters. The adjusted audio data is output to the sound output component of the display apparatus.

In some embodiments, the volume up/down command can include a gain coefficient. The gain coefficient can be a volume coefficient of the audio stream of the fitness video or can be a volume coefficient of the audio stream of the primary video. A value of the gain coefficient can be determined by the user by adjusting a volume slider corresponding to the secondary video, or can be determined by a volume control selected by the user in a pop-up interface of the secondary-screen volume control.

Step S405: in response to the focus being on a volume control of the primary video, adjusting volume of the primary video in response to the volume up/down command.

In some embodiments, the display apparatus can generate an adjustment parameter of the primary video when the focus of the display apparatus is on the volume control of the primary video. Therefore, the controller of the display apparatus can be configured to adjust the volume of the primary video based on the volume adjustment parameter of the primary video and the volume up/down command.

In some embodiments, the display apparatus can detect whether there is a volume adjustment parameter of the primary video after receiving the volume up/down command.

If the volume adjustment parameter of the primary video exists, the audio data of the audio stream of the primary video before superimposition is gained based on the volume up/down command. For example, according to the identifier of the movie window in the volume adjustment parameter of the primary video, the audio data of the audio stream of the movie is gained by the audio processing unit, and the gained audio data is superimposed with the audio data of the audio stream of the secondary video. The superimposed audio data is adjusted based on preset power amplification and sound effect parameters. The adjusted audio data is output to the sound output component of the display apparatus.

In some embodiments, a linked volume adjustment control can be displayed between the volume control of the primary video and the volume control of the secondary video. When the focus is on the linked volume control, it is determined that the focus is on both the volume control of the primary video and the volume control of the secondary video. In this case, the display apparatus can generate the volume adjustment parameter of the secondary video and the volume adjustment parameter of the primary video, and can adjust the volume of the primary video and the volume of the secondary video based on the volume up/down command.

Step S406: in response to the focus of the display apparatus being on a system volume control, adjusting system volume of the display apparatus in response to the volume up/down command.

In some embodiments, the display apparatus can generate the system volume adjustment parameter when the focus of the display apparatus is on the system volume control. Therefore, the display apparatus can detect whether there is a system volume adjustment parameter after receiving the volume up/down command. If the system volume adjustment parameter exists, the volumes of the primary video and the secondary video after superimposition can be gained in response to the volume up/down command, to adjust the system volume.

In some embodiments, the display apparatus does not generate the volume adjustment parameter of the primary video and the volume adjustment parameter of the secondary video when the focus of the display apparatus is on the system volume control. Therefore, after receiving the volume up/down command, the display apparatus can also detect whether the volume adjustment parameter of the primary video and the volume adjustment parameter of the secondary video exist. If neither the volume adjustment parameter of the primary video nor the volume adjustment parameter of the secondary video exists, the volumes of the primary video and the secondary video after superimposition can be gained in response to the volume up/down command, to adjust the system volume.

In some embodiments, the display apparatus generates the volume adjustment parameter of the primary video and the volume adjustment parameter of the secondary video when the focus of the display apparatus is on the system volume control. Therefore, after receiving the volume up/down command, the display apparatus can also detect whether the volume adjustment parameter of the primary video and the volume adjustment parameter of the secondary video exist.

If both the volume adjustment parameter of the primary video and the volume adjustment parameter of the secondary video exist, the volumes of the primary video and the secondary video after superimposition can be gained in response to the volume up/down command, to adjust the system volume.

In some embodiments, when the system volume is adjusted by the display apparatus, the audio data of the audio stream of the secondary video and the audio data of the audio stream of the primary video can be sent to the superimposer by a volume control unit. The data of the two audio streams is superimposed by the superimposer, and then the gained audio data is adjusted according to the preset power amplification and sound effect parameters. The superimposer outputs the adjusted audio data to the sound output component of the display apparatus.

In some embodiments, the focus of the display apparatus is neither on the volume control of the secondary video nor on the volume control of the primary video. When neither the volume adjustment parameter of the primary video nor the volume adjustment parameter of the secondary video exists, the system volume of the display apparatus can be gained by default in response to the volume up/down command. In other words, the superimposed audio data is gained, or only the volume of the primary video is gained by default.

In some embodiments, the focus of the display apparatus is neither on the volume control of the secondary video nor on the volume control of the primary video. When neither the volume adjustment parameter of the primary video nor the volume adjustment parameter of the secondary video exists, the system volume of the display apparatus can be adjusted in response to the volume up/down command and based on a system-volume parameter and the volume up/down command. The system-volume parameter is generated when the focus is neither on the volume control of the secondary video nor on the volume control of the primary video.

Figure 64:
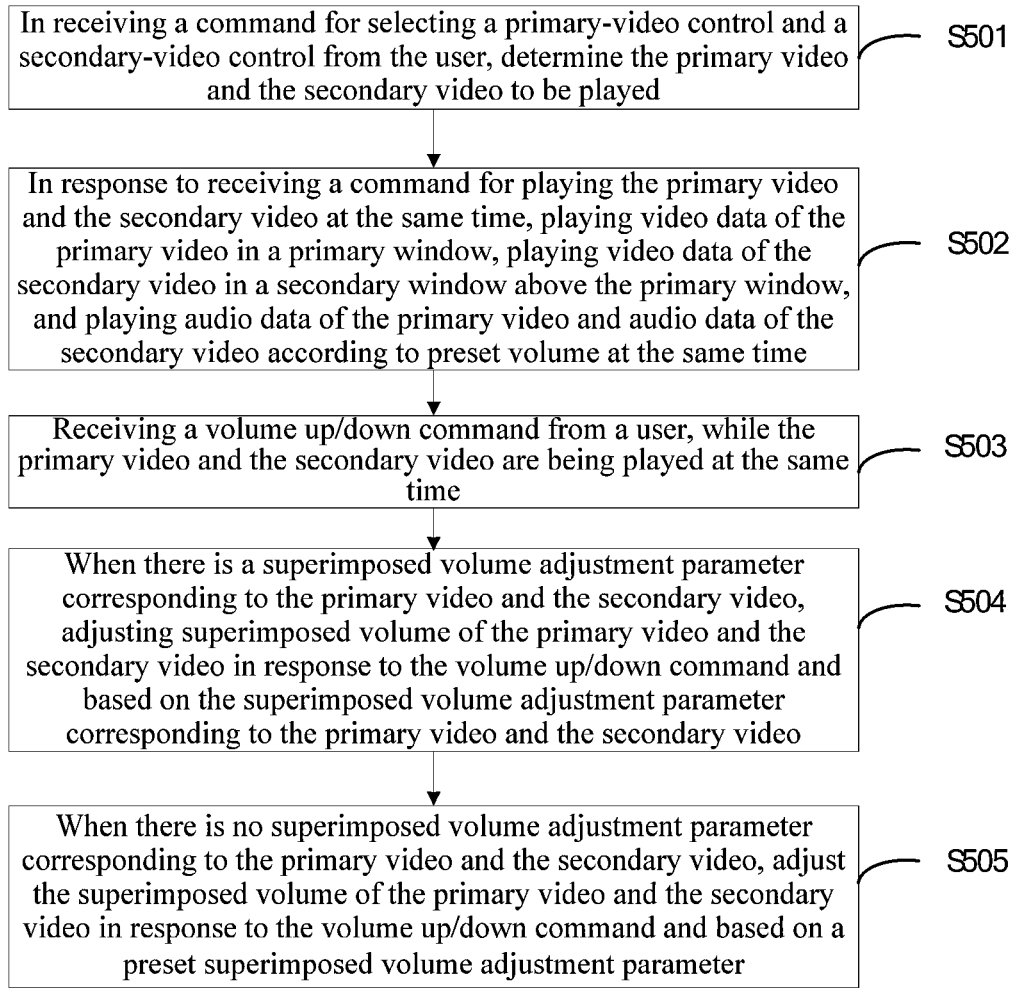
FIG. 64 is a schematic flowchart illustrating a volume control method according to some embodiments of the present disclosure.

FIG. 64 is a schematic flowchart illustrating a volume control method according to some embodiments, including steps S501 to S505.

Step S501: In receiving a command for selecting a primary-video control and a secondary-video control from the user, determine the primary video and the secondary video to be played.

Step S502: In response to receiving a command for playing the primary video and the secondary video at the same time, playing video data of the primary video in a primary window, playing video data of the secondary video in a secondary window above the primary window, and playing audio data of the primary video and audio data of the secondary video according to preset volume at the same time.

Step S503: Receiving a volume up/down command from a user, while the primary video and the secondary video are being played at the same time.

Step S504: When there is a superimposed volume adjustment parameter corresponding to the primary video and the secondary video, adjusting superimposed volume of the primary video and the secondary video in response to the volume up/down command and based on the superimposed volume adjustment parameter corresponding to the primary video and the secondary video.

In some embodiments, referring to FIG. 52, after the display apparatus pops up a volume control of a single volume slider, the user directly presses the volume up key or the volume down key on the remote control to input the volume up/down command to the display apparatus. The display apparatus can generate the superimposed volume adjustment parameter corresponding to the primary video and the secondary video according to a preset response rule. The superimposed volume adjustment parameter can include a gain coefficient, and a value of the gain coefficient can be determined by adjusting the volume slider.

In some embodiments, when the superimposed volume adjustment parameter corresponding to the primary video and the secondary video exists, an audio control unit of the controller of the display apparatus can send the audio data of the audio stream of the secondary video and the audio data of the audio stream of the primary video to the superimposer. The superimposer superimposes the two channels of audio data, and then sends the superimposed audio data to the power amplification/sound effect processing unit. The power amplification/sound effect processing unit adjusts the superimposed audio data based on the power amplification parameter and the sound effect parameter that are determined based on the superimposed volume adjustment parameter, and outputs the adjusted audio data to the sound output component of the display apparatus.

Step S505: When there is no superimposed volume adjustment parameter corresponding to the primary video and the secondary video, adjusting the superimposed volume of the primary video and the secondary video in response to the volume up/down command and based on a preset superimposed volume adjustment parameter.

In some embodiments, referring to FIG. 52, if the user directly presses the volume up key or the volume down key on the remote control after the display apparatus pops up a volume control of a single volume slider, the display apparatus may not generate the superimposed volume adjustment parameter corresponding to the primary video and the secondary video according to the preset response rule.

In some embodiments, when there is no superimposed volume adjustment parameter corresponding to the primary video and the secondary video, for example, when the volume up/down command from the user is a voice command "increase the volume", the volume up/down command does not include the superimposed volume adjustment parameter. In this case, the audio control unit of the controller of the display apparatus can send the audio data of the audio stream of the secondary video and the audio data of the audio stream of the primary video to the superimposer. The superimposer superimposes the two paths of audio data, and then sends the superimposed audio data to the power amplification/sound effect processing unit. The power amplification/sound effect processing unit adjusts the superimposed audio data based on the power amplification parameter and the sound effect parameter that are determined based on the preset superimposed volume adjustment parameter, and outputs the adjusted audio data to the sound output component of the display apparatus.

In some embodiments, the user can switch the positions of the fitness video window and the movie playback window through a preset key. For example, the fitness video is played in the fitness video window that is displayed in full screen, and the movie playback window is above the fitness video window.

In some embodiments, when an exercising-while-watching interface is displayed, as shown in FIG. 53, if a command for selecting a back control from the user is received, a video player (the primary window) is controlled to exit from the playback of the video, the playback in the secondary window is paused and the secondary window is hidden, and the display switches to a video selection interface, as shown in FIG. 41 or FIG. 43.

Figure 54:
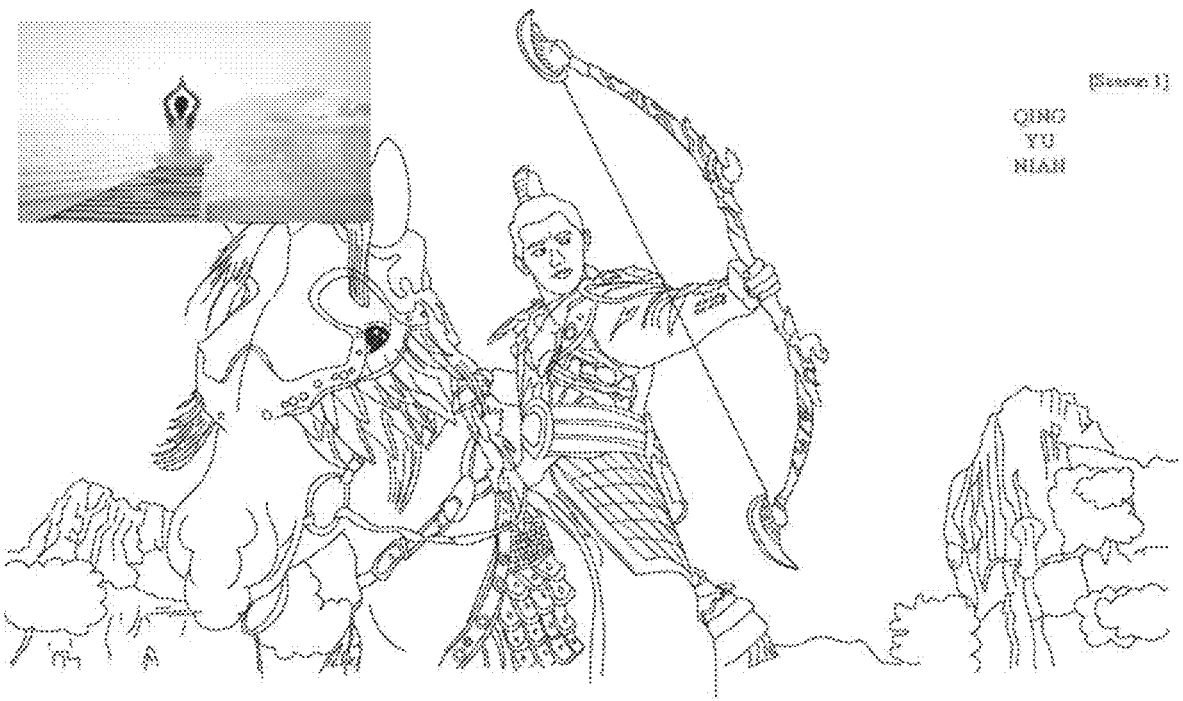
FIG. 54 is a schematic diagram illustrating an interface of a display apparatus according to some embodiments of the present disclosure.

In some embodiments, when an exercising-while-watching interface is displayed, as shown in FIG. 54, if a command for selecting a back control from the user is received, the primary window and the secondary window are canceled, and the display switches to a video selection interface, as shown in FIG. 41 or FIG. 43.

In some embodiments, in the video selection interface, after a video corresponding to the video control is selected by the user, the exercising-while-watching interface is restarted, so that the primary window loads the video corresponding to the video control reselected by the user. Meanwhile, the secondary window continues to play the previously selected fitness video or replays the previously selected fitness video from the beginning.

In the video selection interface, a command for selecting a back control from the user is received continually, and the display goes back to the detail interface of the fitness video.

In some embodiments, in the video selection interface, the command for selecting the back control from the user is received again, and processes corresponding to the primary window and the secondary window also need to be canceled. In some embodiments, at least one of the two videos may be a non-free video and the user has not purchased the video. After a trial segment of one non-free video is finished playing first, a current interface of the display apparatus can skip to a corresponding purchase page. The current image can be automatically returned to after the user has purchased the video, or the user can manually click to return to a picture-in-picture playback interface to continue the playback, or the playback of two videos is paused until the user restarts the playback of the two videos. After a trial segment of the other video continues to be played, the display switches to a corresponding purchase page. Payment implements of the two videos can be consistent with payment skip of respective video detail pages, for example, including VIP, display area, single order, payment, and other purchase methods. If the trial segments of the two non-free videos finish playing at the same time, the display may skip to a purchase page of the secondary video.

In some embodiments, historical records can be invoked at beginning of the playback of the primary video to skip to playback start, and the playback of the secondary video starts from the beginning.

In some embodiments, if the primary video/secondary video is a single episode, cycling playback is performed after the single episode ends. If the primary video/secondary video has a plurality of episodes, a next episode is automatically played. If the plurality of episodes is played to the last episode, the first episode is replayed.

In some embodiments, the highest definition of the primary video can be set to 1080 P only, and if this is not supported, the definition is decreased. Default definition of the secondary video is 720 P, and if this is not supported, the definition is decreased. The definition is determined based on the fact that the two videos cannot exceed 4 K@60 HZ according to a chip capability of the display apparatus. If the chip of the display apparatus is upgraded, the definition of the primary video and the secondary video can be selected to a higher level.

Figure 47:
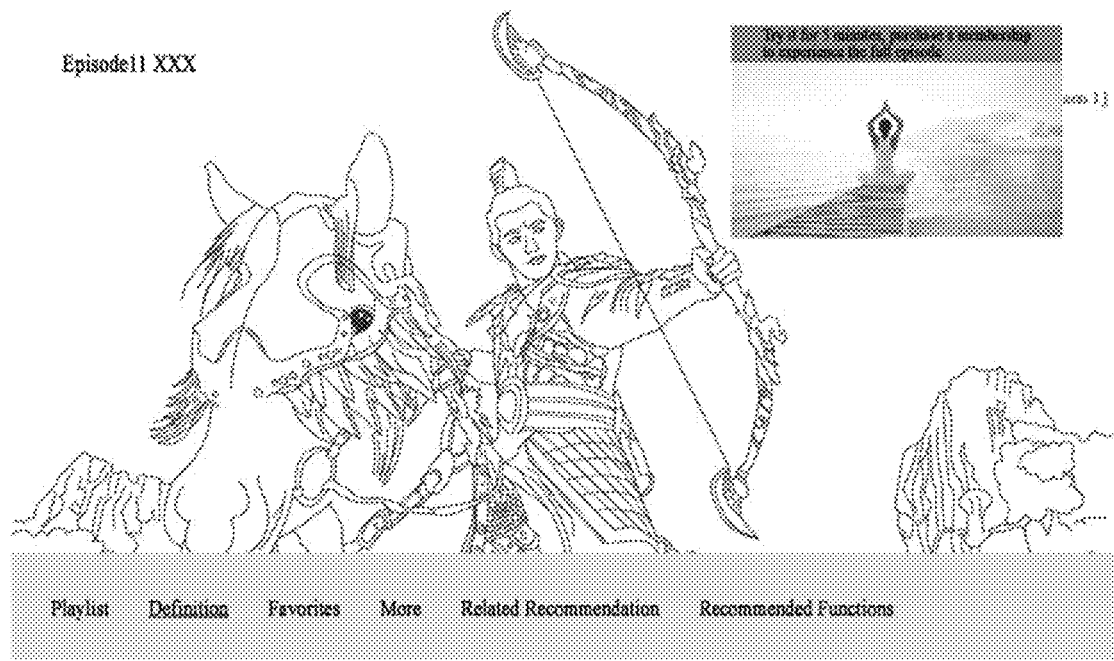
FIG. 47 is a schematic diagram illustrating settings in an exercising-while-watching mode according to some embodiments of the present disclosure.

In some embodiments, the user can adjust the definition of the primary video. Referring to FIG. 47, the playback setup option invoked by the user by pressing the downward direction key can include a definition option. The definition option can be used to adjust the definition of the primary video, and the user can adjust the definition of the primary video. In addition to the definition, the playback setting options may also include a playlist option, a mode-switching option, a related-recommendation option, a recommended-function option, and the like for user settings.

Figure 48:
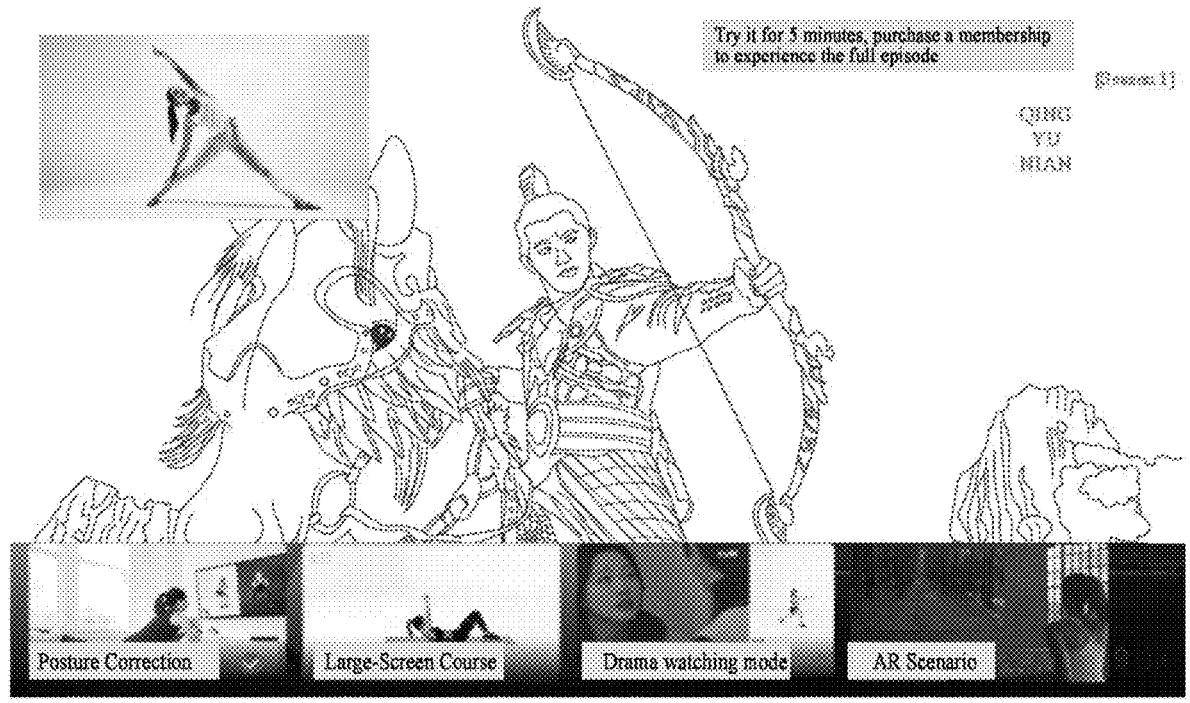
FIG. 48 is a schematic diagram illustrating mode switching according to some embodiments of the present disclosure.
Figure 49:
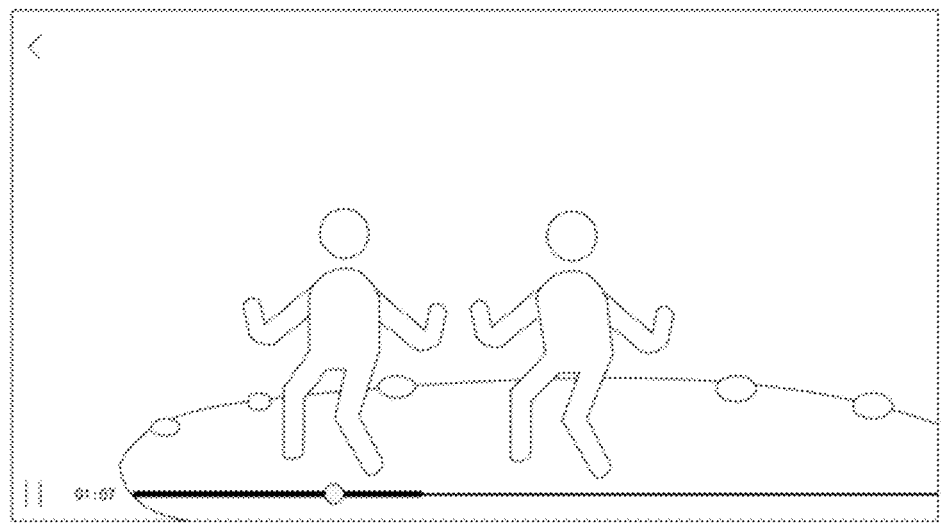
FIG. 49 is a schematic diagram illustrating an AR mode according to some embodiments of the present disclosure.

In some embodiments, in the exercising-while-watching mode, the user can switch the playback mode. For example, the user can invoke a mode switching interface by clicking the menu key on the remote control. Referring to FIG. 48, the user can reselect another mode to watch the fitness video. For example, the user can select the AR scenario mode shown in FIG. 49 to watch the fitness video.

In some embodiments, the user can also perform a fast-forward operation on the primary video by long pressing the right direction key, and perform a fast-rewind operation on the primary video by long pressing the left direction key.

Figure 50:
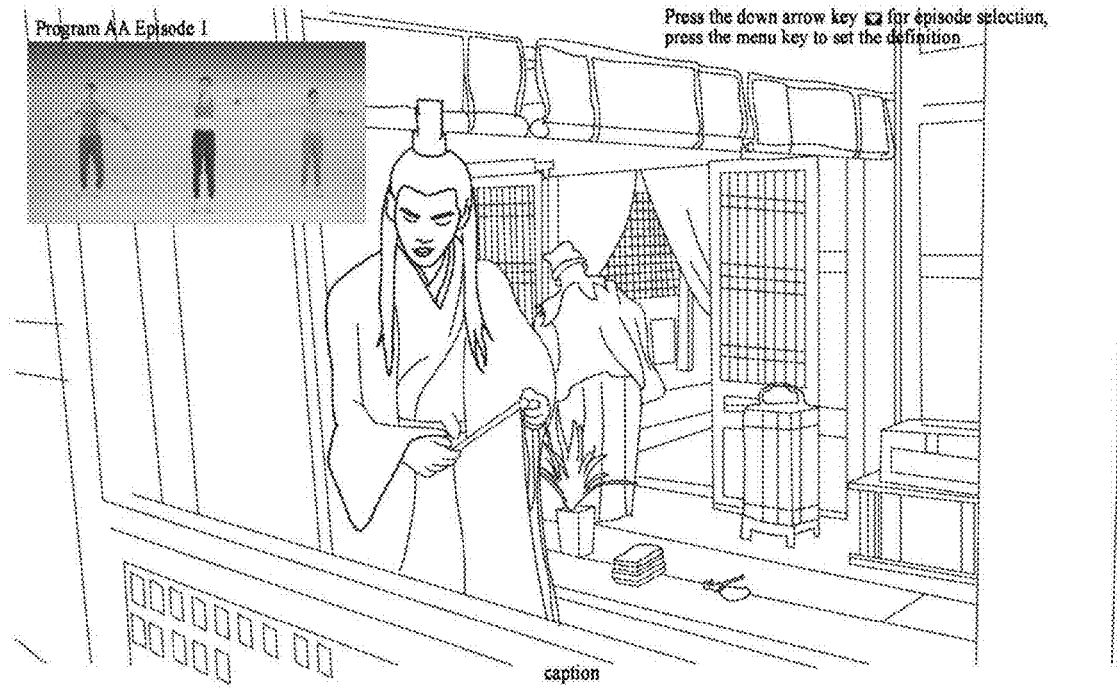
FIG. 50 is a schematic diagram illustrating a pause in the exercising-while-watching mode according to some embodiments of the present disclosure.

In some embodiments, the user can perform a linked operation on the pause and the start of the playback of the primary video and the secondary video. For example, referring to FIG. 50, the user can click the OK key to pause the primary video and the secondary video at the same time, and then click the OK key again to start the playback of the primary video and the secondary video at the same time.

Figure 51:
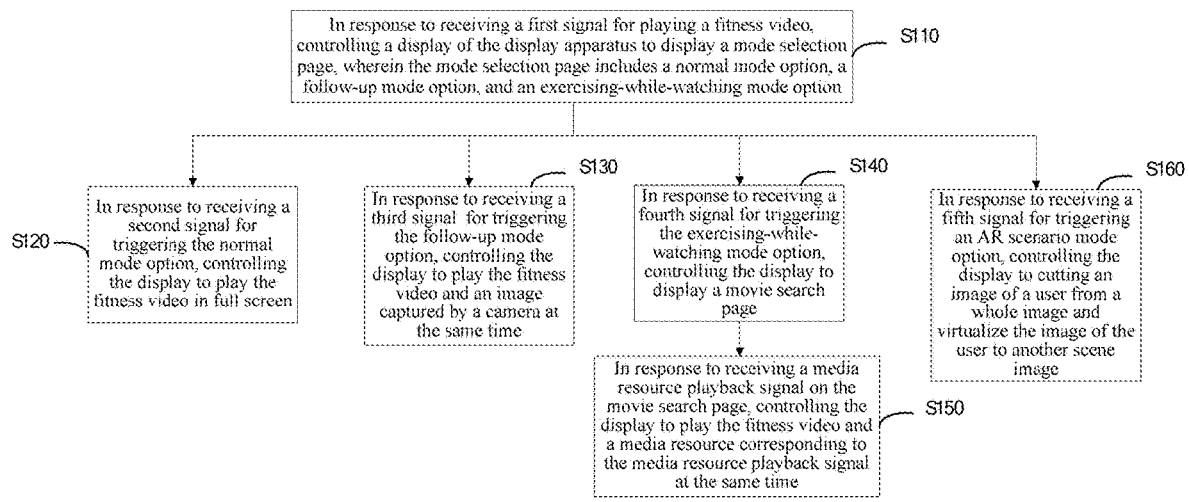
FIG. 51 is a schematic diagram illustrating a method flowchart for smart fitness according to some embodiments of the present disclosure.

It can be seen from the embodiments that the smart fitness method provided in the present disclosure has the following steps, as shown in FIG. 51.

Step S110: In response to receiving a first signal for playing a fitness video, controlling a display of the display apparatus to display a mode selection page, wherein the mode selection page includes a normal mode option, a follow-up mode option, and an exercising-while-watching mode option.

Step S120: In response to receiving a second signal for triggering the normal mode option, controlling the display to play the fitness video in full screen.

Step S130: In response to receiving a third signal for triggering the follow-up mode option, controlling the display to play the fitness video and an image captured by a camera at the same time.

Step S140: In response to receiving a fourth signal for triggering the exercising-while-watching mode option, controlling the display to display a movie search page.

Step S150: In response to receiving a media resource playback signal on the movie search page, controlling the display to play the fitness video and a media resource corresponding to the media resource playback signal at the same time.

Step S160: In response to receiving a fifth signal for triggering an AR scenario mode option, controlling the display to cutting an image of a user from a whole image and virtualize the image of the user to another scene image.

It can be seen from the foregoing embodiments that, the embodiments of the present disclosure provide a plurality of modes for watching the fitness video, so that the user can experience watching modes of watching the fitness video in full screen on the display apparatus, training while watching the fitness video, and watching the fitness video while watching the movie, thereby improving an intelligence level of fitness and fun in fitness. Moreover, when the primary video and the secondary video are played at the same time, the primary video and the secondary video are played according to the gain volume set at last time by the user, or the primary video and the secondary video are played according to the gain volume set by default. In this way, the problem that a simultaneous playback of the primary video and the secondary video may easily lead to sound mixing is resolved, thereby improving the user experience.

For ease of explanation, the foregoing descriptions are given in combination with specific implementations. However, the discussions in the foregoing embodiments are not intended to limit the implementations to the specific forms disclosed above. Various modifications and variations may be obtained according to the foregoing teachings. Selections and description of the foregoing implementations are intended to better explain the principles and practical applications, so that a person skilled in the art can better use the implementations and implementations of various different variations suitable for specific use.

What is claimed is:

1. A display apparatus, comprising:
a display configured to display video or an interface; and
a remote controller comprising a plurality of keys configured to move a focus on the interface or video;
a controller in connection with the display and the remote controller, wherein the controller is configured to:
receive a first command for fitness training from a user, cause the display to present one or more modes for selection, wherein the one or more modes comprises a follow-up mode and an exercising-while-watching mode;
in response to a selection of the follow-up mode, cause the display to show a first window and a second window disposed different from the first window on a first user interface, wherein the first user interface is configured to receive a focus move command via a key on the remote control, wherein the first window is configured to display a first video associated with the fitness training and the second window is configured to display a second video associated with image data from a camera;
while the first video is displaying in the first window and the second video is displaying in the second window, receive a volume adjustment command from the user;
in response to the focus of the display apparatus being on a volume control for the second video, adjust a volume of the second video in response to the volume adjustment command; and
in response to the focus being on a volume control of the first video, adjust a volume of the first video in response to the volume adjustment command;
wherein the controller is further configured to:
in response to receiving a second command for selecting a first video control and a second video control, determine the first video and the second video to be played; and
in response to a third command for playing the first video and the second video, play video data of the first video in the first window, play video data of the second video in the second window above the first window, and play audio data of the first video and audio data of the second video according to a preset volume at same time.

2. The display apparatus according to claim 1, wherein the controller is further configured to:
while the first video and the second video are playing at the same time, display a control list above the first window in response to a fourth command from a first direction key on the remote controller, wherein the control list comprises a control for volume control;
in response to a selection of the control for volume control, control the volume control of the first video and the volume control of the second video to adjust the volume of the first video and the volume of the second video.

3. The display apparatus according to claim 1, wherein the controller is further configured to:
while the first video and the second video are being played at the same time, display a control list in response to a fifth command from a first direction key on the remote controller, wherein the control list comprises a secondary-screen volume control; and
in response to a selection of the secondary-screen volume control, control the volume control of the second video on the display to adjust the volume of the second video.

4. The display apparatus according to claim 1, wherein the display apparatus comprises a sound output component, and the controller is further configured to:
while the first video and the second video are being played at the same time, superimpose second audio data of an audio stream of the second video and first audio data of an audio stream of the first video, and then output superimposed first audio data and second audio data to the sound output component.

5. The display apparatus according to claim 4, wherein the controller is further configured to:
perform gain adjustment for third audio data of the audio stream of the second video that is not yet superimposed based on the volume adjustment command.

6. The display apparatus according to claim 1, wherein the controller is further configured to:
in response to the focus being neither on the volume control of the second video nor on the volume control of the first video, adjust a system volume of the display apparatus in response to the volume adjustment command.

7. The display apparatus according to claim 4, wherein the controller is further configured to:
perform gain adjustment for the superposed first audio data and second audio data based on the volume adjustment command before output ting to the sound output component.

8. The display apparatus according to claim 1, wherein the controller is further configured to:
while the first video and the second video are being played at the same time, receive a mute command from the user; and
in response to the mute command, adjust a system volume of the display apparatus to mute.

9. The display apparatus according to claim 6, wherein the controller is further configured to:
adjust the system volume of the display apparatus based on a system-volume parameter and the volume adjustment command, wherein the system-volume parameter is generated when the focus is neither on the volume control of the second video nor on the volume control of the first video.

10. A method for controlling a display apparatus, wherein the display apparatus comprises a display configured to display video or an interface, and a remote controller comprising a plurality of keys configured to move a focus on the interface or video, the method comprising:
displaying a video or an interface on the display;
receiving a first command for fitness training from a user, causing the display to present one or more modes for selection, wherein the one or more modes comprises a follow-up mode and an exercising-while-watching mode;
in response to a selection of the follow-up mode, causing the display to show a first window and a second window disposed different from the first window on a first user interface, wherein the first user interface is configured to receive a focus move command via a key on the remote control, wherein the first window is configured to display a first video associated with fitness training and the second window is configured to display a second video associated with image data from a camera;

while the first video is displaying in the first window and the second video is displaying in the second window, receiving a volume adjustment command from the user;

in response to the focus of the display apparatus being on a volume control for the second video, adjusting a volume of the second video in response to the volume adjustment command; and in response to the focus being on a volume control of the first video, adjusting a volume of the first video in response to the volume adjustment command;

wherein the method further comprises:

in response to receiving a second command for selecting a first video control and a second video control, determining the first video and the second video to be played; and in response to a third command for playing the first video and the second video, playing video data of the first video in the first window, playing video data of the second video in the second window above the first window, and playing audio data of the first video and audio data of the second video according to a preset volume at same time.

11. The method according to claim 10, further comprising:

while the first video and the second video are playing at the same time, displaying a control list above the first window in response to a fourth command from a first direction key on the remote controller, wherein the control list comprises a control for volume control;

in response to a selection of the control for volume control, controlling the volume control of the first video and the volume control of the second video to adjust the volume of the first video and the volume of the second video.

12. The method according to claim 10, further comprising:

while the first video and the second video are being played at the same time, displaying a control list in response to a fifth command from a first direction key on the remote controller, wherein the control list comprises a secondary-screen volume control; and in response to a selection of the secondary-screen volume control, controlling the volume control of the second video on the display to adjust the volume of the second video.

13. The method according to claim 10, wherein the display apparatus comprises a sound output component, the method further comprising:

while the first video and the second video are being played at the same time, superimposing second audio data of an audio stream of the second video and first audio data of an audio stream of the first video, and then outputting superimposed first audio data and second audio data to the sound output component.

14. The method according to claim 13, further comprising:

performing gain adjustment for third audio data of the audio stream of the second video that is not yet superimposed based on the volume adjustment command.

15. The method according to claim 10, further comprising:

in response to the focus being neither on the volume control of the second video nor on the volume control of the first video, adjusting a system volume of the display apparatus in response to the volume adjustment command.

16. The method according to claim 13, further comprising:

performing gain adjustment for the superposed first audio data and second audio data based on the volume adjustment command before outputting to the sound output component.

17. The method according to claim 10, further comprising:

while the first video and the second video are being played at the same time, receiving a mute command from the user; and in response to the mute command, adjusting a system volume of the display apparatus to mute.

18. The method according to claim 15, further comprising:

adjusting the system volume of the display apparatus based on a system-volume parameter and the volume adjustment command, wherein the system-volume parameter is generated when the focus is neither on the volume control of the second video nor on the volume control of the first video.

* * * * *

UNITED STATES PATENT AND TRADEMARK OFFICE
CERTIFICATE OF CORRECTION

| | | |
|---|---|---|
| PATENT NO. | : 11,985,391 B2 | Page 1 of 1 |
| APPLICATION NO. | : 17/955482 | |
| DATED | : May 14, 2024 | |
| INVENTOR(S) | : Xiaokui Qu et al. | |

It is certified that error appears in the above-identified patent and that said Letters Patent is hereby corrected as shown below:

On the Title Page

Please add:
(30) Foreign Application Priority Data
Dec. 01, 2020 (CN)........................ 202011389672.8
Aug. 21, 2020 (CN)........................ 202010851417.4
Jan. 25, 2021 (CN)........................ 202110097107.2

Signed and Sealed this
Twenty-seventh Day of May, 2025

Coke Morgan Stewart
*Acting Director of the United States Patent and Trademark Office*